US010956825B1

(12) United States Patent
Chen et al.

(10) Patent No.: US 10,956,825 B1
(45) Date of Patent: Mar. 23, 2021

(54) DISTRIBUTABLE EVENT PREDICTION AND MACHINE LEARNING RECOGNITION SYSTEM

(71) Applicant: SAS Institute Inc., Cary, NC (US)

(72) Inventors: Xu Chen, Cary, NC (US); Jorge Manuel Gomes da Silva, Durham, NC (US); Brett Alan Wujek, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/904,818

(22) Filed: Jun. 18, 2020

Related U.S. Application Data

(60) Provisional application No. 62/991,973, filed on Mar. 19, 2020, provisional application No. 62/990,399, filed on Mar. 16, 2020.

(51) Int. Cl.
  *G06N 5/04* (2006.01)
  *G06N 20/00* (2019.01)

(52) U.S. Cl.
  CPC .............. *G06N 5/04* (2013.01); *G06N 20/00* (2019.01)

(58) Field of Classification Search
  CPC ................................. G06N 20/00; G06N 5/04
  USPC ......................................................... 706/12
  See application file for complete search history.

(56) References Cited

U.S. PATENT DOCUMENTS

| | | | |
|---|---|---|---|
| 8,838,508 B2 * | 9/2014 | Niculescu-Mizil | .... G06N 20/00 706/12 |
| 9,792,562 B1 | 10/2017 | Chen et al. | |
| 10,127,477 B2 | 11/2018 | Chen et al. | |
| 10,275,690 B2 | 4/2019 | Chen et al. | |
| 10,354,204 B2 | 7/2019 | Chen et al. | |
| 10,360,517 B2 | 7/2019 | Koch et al. | |
| 10,430,690 B1 | 10/2019 | Chen | |
| 10,521,734 B2 | 12/2019 | Chen et al. | |
| 10,546,246 B2 * | 1/2020 | Kisilev | .................. G06N 20/00 |

(Continued)

OTHER PUBLICATIONS

Wu et al., "A Quest for Structure: Jointly Learning the Graph Structure and Semi-Supervised Classification" Sep. 26, 2019. (Year: 2019).*

(Continued)

*Primary Examiner* — Miranda M Huang
*Assistant Examiner* — Chase P. Hinckley
(74) *Attorney, Agent, or Firm* — Bell & Manning, LLC

(57) ABSTRACT

Data is classified using semi-supervised data. A weight matrix is computed using a kernel function applied to observation vectors. A decomposition of the computed weight matrix is performed. A predefined number of eigenvectors is selected from the decomposed weight matrix to define a decomposition matrix. (A) A gradient value is computed as a function of the defined decomposition matrix, sparse coefficients, and a label vector. (B) A value of each coefficient of the sparse coefficients is updated based on the gradient value. (A) and (B) are repeated until a convergence parameter value indicates the sparse coefficients have converged. A classification matrix is defined using the converged sparse coefficients. The target variable value is determined and output for each observation vector based on the defined classification matrix to update the label vector and defined to represent the label for a respective unclassified observation vector.

30 Claims, 29 Drawing Sheets
(4 of 29 Drawing Sheet(s) Filed in Color)

(56) References Cited

U.S. PATENT DOCUMENTS

| | | | |
|---|---|---|---|
| 10,685,285 B2* | 6/2020 | Simard | G06N 3/0454 |
| 2007/0094180 A1* | 4/2007 | Rifkin | G06K 9/6215 |
| | | | 706/20 |
| 2011/0040711 A1* | 2/2011 | Perronnin | G06K 9/6247 |
| | | | 706/12 |
| 2013/0326625 A1* | 12/2013 | Anderson | G06F 21/566 |
| | | | 726/23 |
| 2015/0170055 A1* | 6/2015 | Beymer | G06N 20/00 |
| | | | 706/12 |
| 2018/0005086 A1* | 1/2018 | Jain | G06K 9/6255 |
| 2018/0053071 A1* | 2/2018 | Chen | G06N 5/003 |
| 2018/0235562 A1* | 8/2018 | Petschke | A61B 6/032 |
| 2018/0239966 A1* | 8/2018 | Xiao | G06F 17/18 |
| 2019/0034766 A1* | 1/2019 | Chen | G06N 5/003 |
| 2019/0156819 A1* | 5/2019 | Shafran | G06N 3/02 |
| 2019/0228309 A1* | 7/2019 | Yu | G06N 3/0454 |
| 2019/0278600 A1* | 9/2019 | Frumkin | G06F 9/3885 |
| 2019/0287515 A1* | 9/2019 | Li | G10L 15/063 |
| 2019/0311301 A1* | 10/2019 | Pyati | G06F 16/901 |
| 2019/0318256 A1* | 10/2019 | Wei | G06N 5/046 |
| 2019/0362809 A1* | 11/2019 | Okimoto | G06K 9/00127 |
| 2019/0378037 A1* | 12/2019 | Kale | G06F 17/17 |
| 2020/0104630 A1 | 4/2020 | Chen et al. | |
| 2020/0143236 A1* | 5/2020 | Liang | G06N 3/08 |
| 2020/0160177 A1* | 5/2020 | Durand | G06N 3/08 |
| 2020/0250304 A1* | 8/2020 | Kruus | G06N 3/04 |
| 2020/0250481 A1* | 8/2020 | Qian | G06K 9/6257 |

OTHER PUBLICATIONS

Berikov et Litvinenko, "Semi-Supervised Regression using Cluster Ensemble and Low-Rank Co-Association Decomposition Under Uncertainties" Jan. 13, 2019. (Year: 2019).*
Sindhwani, Vikas, "On Semi-Supervised Kernel Methods" Dec. 2007, Dissertation University of Chicago, pp. i-190. (Year: 2007).*
Lu et al., "Noise-Robust Semi-Supervised Learning by Large-Scale Sparse Coding" 2015. (Year: 2015).*
Jackson et Schulman, "Semi-Supervised Learning by Label Gradient Alignment" Feb. 6, 2019. (Year: 2019).*
Wang et al., "Backpropagation-Friendly Eigendecomposition" Jun. 27, 2019, pp. 1-11. (Year: 2019).*
Zhan et al., "Efficient Online Hyperparameter Optimization for Kernel Ridge Regression with Applications to Traffic Time Series Prediction" Nov. 1, 2018, pp. 1-19. (Year: 2018).*
Gong et al., "Learning with Inadequate and Incorrect Supervision" 2017, IEEE, pp. 889-894. (Year: 2017).*
Hou et al., "A Fast Hierarchically Preconditioned Eigensolver Based on Multiresolution Matrix Decomposition" Jun. 27, 2018, pp. 1-42. (Year: 2018).*
Han et al., "Beyond Majority Voting: A Coarse-to-Fine Label Filtration for Heavily Noisy Labels" Dec. 10, 2019, IEEE Transaction on Neural Networks and Learning Systems, vol. 30, No. 12: 3774-3787. (Year: 2019).*
Shabat et al., "Fast and Accurate Gaussian Kernel Ridge Regression Using Matrix Decomposition for Preconditioning" May 25, 2019, pp. 1-18. (Year: 2019).*
Jean et al., "Semi-supervised Deep Kernel Learning: Regression with Unlabeled Data by Minimizing Predictive Variance" Mar. 4, 2019, pp. 1-16. (Year: 2019).*
Li et al., "Implicit Kernel Learning" Feb. 26, 2019. (Year: 2019).*
Wenliang et al., "Learning Deep Kernels for Exponential Family Densities" May 24, 2019, International Conference on Machine Learning, pp. 6737-6746. (Year: 2019).*
Akiba et al., "Optuna: A Next-Generation Hyperparameter Optimization Framework" Jul. 25, 2019, pp. 1-10. (Year: 2019).*
Falkner et al., "BOHB: Robust and Efficient Hyperparameter Optimization at Scale" Jul. 4, 2018. (Year: 2018).*
Kim et al., "CHOPT: Automated Hyperparameter Optimization Framework for Cloud-Based Machine Learning Platforms" Oct. 16, 2018. (Year: 2018).*
Pedregosa et al., "Hyperparameter optimization with approximate gradient" Jun. 26, 2016. (Year: 2016).*
Li et al., "Massively Parallel Hyperparameter Tuning" Jan. 23, 2019, pp. 1-16. (Year: 2019).*
Liu et al., "Auptimizer—An Extensible, Open-Source Framework for Hyperparameter Tuning" Nov. 6, 2019. (Year: 2019).*
Sarigiannis et al., "Weighted Sampling for Combined Model Selection and Hyperparameter Tuning" Sep. 16, 2019, pp. 1-14. (Year: 2019).*
Trittenbach et al., "Active Learning of SVDD Hyperparameter Values" Dec. 4, 2019. (Year: 2019).*
Wang et al., "Laplacian Smoothing Stochastic Gradient Markov Chain Monte Carlo" Nov. 2, 2019, pp. 1-27. (Year: 2019).*
Gaw, Nathan, "Novel Semi-Supervised Learning Models to Balance Data Inclusivity and Usability in Healthcare Applications" Aug. 2019, Dissertation, Arizona State University, pp. i-152. (Year: 2019).*
Hoffman et al., "Consistency of Semi-Supervised Learning Algorithms on Graphs: Probit and One-Hot Methods" Mar. 9, 2020, pp. 1-47. (Year: 2020).*
Cheung et al., "Robust Semi-Supervised Graph Classifier Learning with Negative Edge Weights" Jul. 20, 2017, pp. 1-15. (Year: 2017).*
Wang et al., "End-to-End Graph-based Deep Semi-Supervised Learning" Feb. 23, 2020. (Year: 2020).*
Wang et Tanaka, "Sparse Kernel Principal Component Analysis Based on Elastic Net Regularization" 2016, IEEE. pp. 3703-3708. (Year: 2016).*
Luo et al., "Smooth Neighbors on Teacher Graphs for Semi-supervised Learning" Mar. 28, 2018. (Year: 2018).*
Kumar et al., "Factorized Graph Representations for Semi-Supervised Learning from Sparse Data" Mar. 5, 2020, pp. 1-21. (Year: 2020).*
Gao et al., "Exploring Structure-Adaptive Graph Learning for Robust Semi-Supervised Classification" Sep. 16, 2019. (Year: 2019).*
Li et al., "DivideMix: Learning with Noisy Labels as Semi-Supervised Learning" Feb. 18, 2020, pp. 1-14. (Year: 2020).*
Ng et al., "Bayesian Semi-supervised Learning with Graph Gaussian Processes" Oct. 12, 2018, pp. 1-12. (Year: 2018).*
Stretcu et al., "Graph Agreement Models for Semi-Supervised Learning" 2019, pp. 1-11. (Year: 2019).*
Zhang et al., "Graph Convolutional Auto-encoder with Bi-decoder and Adaptive-sharing Adjacency" Mar. 10, 2020. (Year: 2020).*
Chen et al., "Semi-supervised Learning Meets Factorization: Learning to Recommend with Chain Graph Model" Mar. 5, 2020, pp. 1-24. (Year: 2020).*
Calder et Slepcev, "Properly-Weighted Graph Laplacian for Semi-Supervised Learning" Apr. 2, 2019, pp. 1-38. (Year: 2019).*
Li et al., "Regularizing Semi-supervised Graph Convolutional Networks with a Manifold Smoothness Loss" Feb. 11, 2020, pp. 1-10. (Year: 2020).*
Li et al., "Learning to Learn from Noisy Labeled Data" Apr. 12, 2019. (Year: 2019).*
Jiang et Lin, "Graph Laplacian Regularized Graph Convolutional Networks for Semi-supervised Learning" Sep. 26, 2018, pp. 1-4. (Year: 2018).*
Avrachenkov et al., "Semi-supervised Learning with Regularized Laplacian" Jul. 2015. (Year: 2015).*
Alaoui et al., "Asymptotic behavior of lp-based Laplacian regularization in semi-supervised learning" Mar. 2, 2016, pp. 1-27. (Year: 2016).*
Beck et al., Siam J. Imaging Sciences, vol. 2, No. 1, pp. 183-202, 2009.
Zhou, Dengyong, et al. "Learning with local and global consistency." *Advances in neural information processing systems*. 2004, 8 pages.
Dong-Hyun Lee, Pseudo-Label: The Simple and Efficient Semi-Supervised Learning Method for Deep Neural Networks, ICML 2013 Workshop, Challenges in Representation Learning 2013, 6 pages.
Konyushkova et al., Learning Active Learning from Data, 31st Conference on Neural Information Processing, 2017, pp. 1-11.

(56) References Cited

OTHER PUBLICATIONS

Dempster, A.P.; Laird, N.M.; Rubin, D.B. (1977). "Maximum Likelihood from Incomplete Data via the EM Algorithm". Journal of the Royal Statistical Society, Series B. 39 (1): 1-38. JSTOR 2984875. MR 0501537.
1.14. SemiSupervised—scikit-learn 0.17.1 documentation, Apr. 27, 2016, pp. 1-2.
Scikit-learn: machine learning in Python—scikit-learn 0.17.1 documentation, Apr. 27, 2016, pp. 1-3.
S. Baluja ,Probabilistic modeling for face orientation discrimination: Learning from labeled and unlabeled data, Neural Information Processing Systems, 1998.
Bennett et al., Semi-supervised support vector machines, Advances in Neural Information Processing Systems, 1998, pp. 368-374.
Blum et al., Combining Labeled and Unlabeled Data witn Co-Training, Colt, 1998.
Castelli et al., On the exponential value of labeled samples, Pattern Recognition Letters 16, Jan. 1995, pp. 105-111.
Cozman et al., Semi-Supervised Learning of Mixture Models, Proceedings of the Twentieth International Conference on Machine Learning (ICML-2003), Washington DC, 2003.
Fergus et al., Semi-supervised Learning in Gigantic Image Collections, Advances in Neural Information Processing Systems, Jan. 2009.
Kullback et al., On Information and Sufficiency, Annals of Mathematical Statistics 22 (1), 1951, pp. 79-86.
T. Mitchell, The Role of Unlabeled Data in Supervised Learning, In Proceedings of the Sixth International Colloquium on Cognitive Science, San Sebastian, Spain, May 1999.
Nigam et al., Text Classification from Labeled and Unlabeled Documents using EM, Machine Learning 39, May 2000, pp. 103-134.
Pitelis et al., Semi-Supervised Learning Using an Unsupervised Atlas, Proceedings of the European Conference on Machine Learning , Sep. 2014, pp. 565-580.
Ranzato et al., Semi-supervised Learning of Compact Document Representations with Deep Networks, Proceedings of the 25 th International Conference on Machine Learning, Helsinki, Finland, 2008.
Rifai et al., The Manifold Tangent Classifier, Advances in Neural Information Processing Systems, 2011.
Riloff et al., Learning Subjective Nouns using Extraction Pattern Bootstrapping, Proceedings of the Seventh Conference on Natural Language Learning, 2003.
Rosenberg et al., Semi-Supervised Self-Training of Object Detection Models, Seventh IEEE Workshop on Applications of Computer Vision, Jan. 2005.
Vapnik, SV Machines for Pattern Recognition, Chapter 12 in Statistical Learning Theory, Wiley-Interscience, Sep. 1998.
Weston, Deep Learning via Semi-Supervised Embedding, Proceedings of the 25th International Conference on Machine Learning, Helsinki, Finland, 2008.
D. Yarowsky, Unsupervised word sense disambiguation rivaling supervised methods, Proceedings of the 33rd Annual Meeting of the Association for Computational Linguistics, 1995, pp. 189-196.
X. Zhu, Semi-Supervised Learning Literature Survey, Computer Sciences TR 1530, University of Wisconsin—Madison, 2005.
Fung et al., Semi-supervised support vector machines for unlabeled data classification, Optimization Methods and Software, 2001.
Mahapatra et al., Semi-Supervised and Active Learning for Automatic Segmentation of Crohn's Disease, Medical Image Computing and Computer-Assisted Intervention (MICCAI), 2013, pp. 214-221.
Mahapatra et al., Combining Multiple Expert Annotations Using Semi-Supervised Learning and Graph Cuts for Crohn's Disease Segmentation, Medical Image Computing and Computer-Assisted Intervention, 2014.
Badrinarayanan et al., Semi-Supervised Video Segmentation Using Tree Structured Graphical Models, IEEE Transactions on Pattern Analysis and Machine Intelligence, vol. 35, No. 11, 2013.
Su et al., Interactive Cell Segmentation based on Active and Semi-supervised Learning, IEEE Transactions on Medical Imaging, vol. 35, Issue 3, Mar. 2016.
Onofrey et al., Low-Dimensional Non-Rigid Image Registration Using Statistical Deformation Models From Semi-Supervised Training Data, IEEE Transactions on Medical Imaging, Feb. 16, 2015.
Meier et al., Patient-Specific Semi-Supervised Learning for Postoperative Brain Tumor Segmentation, Medical Image Computing and Computer-Assisted Intervention MICCAI, 2014, pp. 714-721.
Turian et al., Word representations: A simple and general method for semi-supervised learning , ACL Proceedings of the 48th Annual Meeting of the Association for Computational Linguistics, Jul. 2010, pp. 384-394.
Tur et al., Combining active and semi-supervised learning for spoken language understanding, Speech Communications 45, 2005, pp. 171-186.
Zhu et al., Combining Active Learning and Semi=Supervised Learning Using Gaussian Fields and Harmonic Functions, Proceedings of the ICML-2003 Workshop on the Continuum from Labeled to Unlabeled Data, 8 pages, 2003.
Kawano et al., "Semi-Supervised Logistic Discrimination via Graph-Based Regularization," Neural Process Lett (2012) 36, pp. 203-216.
Zhang et al., "Prototype Vector Machine for Large Scale Semi-Supervised Learning," Lawrence Berkeley National Laboratory, May 29, 2012, 9 pages.
Vaswani et al., "Principal Components Null Space Analysis for Image and Video Classification," IEEE Transactions on Image Processing, vol. 15, No. 7, Jul. 2006, pp. 1816-1830.
Balcan et al., Improved Distributed Principal Component Analysis, arXiv:1408.5823v3, Nov. 13, 2014, pp. 1-9.
Datta et al., Approximate Distributed K-Means Clustering, IEEE Transactions on Knowledge and Data Engineering, ol. 21, No. 10, Oct. 2009, pp. 1372-1388.
Bhat et al., On the derivation of the Bayesian Information Criterion, Nov. 8, 2010, pp. 1-8.
Xanthopoulos P., Pardalos P.M., Trafalis T.B. (2013) Linear Discriminant Analysis. In: Robust Data Mining. SpringerBriefs in Optimization. Springer, New York, NY.
Forero et al., Consensus-Based Distributed Support Vector Machines, Journal of Machine Learning Research 11, 2010, pp. 1663-1707.
Carpenter, Gail A., dARTMAP: A Neural Network for Fast Distributed Supervised Learning, Technical Reports, Neural Networks, Dec. 1997, pp. 1-46.
Balcan et al., Distributed k-means and K-median Clustering on General Topologies, arXiv:1306.0604 [cs.LG], Jun. 2013, pp. 1-9.
Silva et al., Distributed Text Classification With an Ensemble Kernel-Based Learning Approach, IEEE Transactions on Systems, Man, and Cybernetics—Part C: Applications and Reviews, 2009, pp. 1-11.
MacQueen, J. B. (1967). Some Methods for classification and Analysis of Multivariate Observations. Proceedings of 5th Berkeley Symposium on Mathematical Statistics and Probability. 1. University of California Press. pp. 281-297.
Chen et al., Combining Active Learning and Semi-supervised Learning by Using Selective Label Spreading, 2017 IEEE International Conference on Data Mining Workshops, 2017, pp. 850-857.
Lv et al., Positional Relevance Model for Pseudo-Relevance Feedback, SIGIR' 10, Jul. 19, 2010, pp. 1-8.
P. S. Bradley, O. L. Mangasarian, and W. N. Street, "Clustering via Concave Minimization," in Advances in Neural Information Processing Systems, vol. 9, 1997, pp. 368-374.
P.E.Black, "Manhattan Distance", in Dictionary of Algorithms and Data Structures, 2006.
Cheng, Yizong (Aug. 1995). "Mean Shift, Mode Seeking, and Clustering". IEEE Transactions on Pattern Analysis and Machine Intelligence. IEEE. 17 (8): 790-799.
Hamming, R. W. (Apr. 1950). "Error detecting and error correcting codes". The Bell System Technical Journal. 29 (2): 147-16.
Mackiewicz et al., Principal Components Analysis (PCA)*, Computers & Geosciences vol. 19, No. 3, 1993, pp. 303-342.
Jagannathan et al., Privacy-Preserving Distributed-Means Clustering over Arbitrarily Partitioned Data, KDD'05, Aug. 2005, pp. 593-599.

(56) References Cited

OTHER PUBLICATIONS

Van der Maaten et al., Visualizing Data using t-SNE, Journal of Machine Learning Research, 2008, pp. 2579-2605.

SAS Institute Inc. 2017. SAS® Visual Data Mining and Machine Learning 8.1: Data Mining and Machine Learning Procedures. Cary, NC: SAS Institute Inc., Mar. 2017.

SAS Institute Inc. 2016. SAS® Enterprise Miner 14.2: High-Performance Procedures. Cary, NC: SAS Institute Inc., Nov. 2016.

Lu et al., "Noise-Robust Semi-Supervised Learning by Large-Scale Sparse Coding," ResearchGate, Conference Paper, Jan. 2015.

Yi et al., "Semi-Supervised Ridge Regression with Adaptive Graph-Based Label Propagation," Appl. Scie. 2018, 8, 2636.

Norm (mathematics) Wikipedia, printed May 23, 2020.

P. Koch et al, "Autotune: A Derivative-free Optimization Framework for Hyperparameter Tuning", arXiv:804.07824v2 KDD 2018.

Wikipedia: Knapsack problem, https://en.wikipedia.org/w/index.php?title=Knapsack_problem&oldid=942139230, page last edited on Feb. 22, 2020.

Modeling Examples—Python-MIP documentation https://python-mip.readthedocs.io/en/latest/examples.html#the-0-1-knapsack-problem[Dec. 13, 2019 9:33:26 AM].

AutoDAL: Distributed Active Learning with Automatic Hyperparameter Selection, Anonymous Submission, Association for the Advancement of Artificial Intelligence, 2020.

C. Thornton et al "Auto-weka: Combined selection and hyperparameter optimization of classification algorithm", KDD 2013., arXiv:1208.3719v2 [cs.LG] Mar. 6, 2013.

M. Feurer et al "Efficient and Robust Automated Machine Learning", Neural Information Processing Systems (NIPS) 2015.

Y. Li, "Towards Automated Semi-supervised Learning". AAAI conference on Artificial Intelligence, 2019.

Y. Yang, "Multiclass active learning by uncertainty sampling with diversity maximization", International Journal of Computer Vision, Oct. 14, 2014.

W. Fu et al, Scalable Active Learning by Approximated Error Reduction, Research Track Paper, KDD 2018.

Deb, Kalyanmoy; Spears, William M. (1997). "C6.2: Speciation methods" from Handbook of Evolutionary Computation. Institute of Physics Publishing.

M. Wang, W. Fu, S. Hao, and D. Tao. 2016. Scalable Semi-Supervised Learning by Efficient Anchor Graph Regularization. IEEE Transactions on Knowledge and Data Engineering (TKDE), 2015.

Y.-F. Li, J. T. Kwok, and Z.-H. Zhou. 2009. Semi-supervised learning using label mean. ICML.

D. Wang, F. Nie, and H. Huang. ACM 2014. Large-Scale Adaptive Semi-supervised Learning via Unified Inductive and Transductive Model. KDD.

Chih-Chung Chang and Chih-Jen Lin, LIBSVM : a library for support vector machines. ACM Transactions on Intelligent Systems and Technology, 2:27:1—27:27, 2011. Software available at http://www.csie.ntu.edu.tw/~cjlin/libsvm.

M. Belkin, P. Niyogi, and V. Sindhwani. 2006. Manifold regularization: A geometric framework for learning from labeled and unlabeled examples. JMLR, 2399-2434.

Y.F.Li, J.T. Kwok, and Z.H.Zhou. 2010. Cost-sensitive semi-supervised support vector machine. Proceedings of the Twenty-Fourth AAAI Conference on Artificial Intelligence (AAAI-10), pp. 500-505.

M. Belkin, P. Niyogi, and V. Sindhwani. 2005. On manifold regularization. AISTATS.

Gustavo Camps-Valls et al., "Semi-Supervised Graph Based Hyperspectral Image Classification," IEEE Transactions on Geoscience and Remote Sensing, vol. 45, No. 10, Oct. 2007, pp. 3044-3054.

Wang et al., "Semi-supervised classification for hyperspectral imagery based on spatial-spectral Label Propagation," ISPRS Journal of Photogrammetry and Remote Sensing, 97 (2014) 123-137.

Kornai , A. et al., Answer to question on Quora message board, ,www.quora.com/In-binary-classification-which-is-the-better-output-for-each-class-1-1-or-0-1-Why-what-if-the-multi-class-classification-is-the-case., posted Sep. 7, 2018, 2 pp. (Year:2018).

\* cited by examiner

| Methods | Dataset 1 | Dataset 2 | Dataset 3 | Dataset 4 | Dataset 5 | Dataset 6 | Dataset 7 |
|---|---|---|---|---|---|---|---|
| Existing 3 | 79.87(± 1.37) | 82.86(± 2.56) | 84.78(± 1.52) | 64.40(±1.73) | 60.54(±0.64) | 74.45(±1.89) | 87.56(±0.09) |
| Existing 4 | 81.02(± 2.12) | 85.33(± 3.13) | 85.96(±1.42) | 63.43(±2.43) | 61.84(±1.31) | 74.93(±1.88) | 87.57(±0.12) |
| Existing 5 | 81.35(± 1.78) | 85.47(±2.12) | 85.84(±1.23) | 63.41(±1.63) | 60.72(±0.62) | 74.55(±0.61) | , |
| Existing 6 | 80.62(± 1.81) | 83.12(±3.57) | 85.04(±1.17) | , | , | , | , |
| Existing 7 | 81.72(± 2.06) | 84.93(±2.98) | 88.04(±1.12) | 62.04(±2.14) | , | , | , |
| Existing 8 | 83.25(± 1.73) | 82.61(±2.15) | 90.03(±0.98) | 60.83(±1.41) | 58.94(±1.19) | , | , |
| Existing 9 | 85.42(± 1.69) | 85.11(±2.42) | 88.50(± 1.91) | 67.89(±1.16) | 61.88(±1.34) | 79.22(±2.00) | 89.20(±0.15) |
| Existing 10 | 86.11(± 2.23) | 85.04(±3.14) | 88.52(± 1.54) | 68.20(±0.98) | 62.33(±0.90) | 78.77(±2.25) | 89.18(±0.11) |
| Existing 11 | 83.25(± 1.57) | 86.35(±2.78) | 88.45(±1.15) | 68.57(±1.12) | 64.12(±1.20) | 77.23(±1.52) | 88.33(±0.23) |
| Existing 2 | 85.31(± 1.65) | 85.63(±2.07) | 87.61(±1.32) | 65.11(±1.12) | 62.33(± 1.79) | 75.32 (±2.11) | , |
| Existing 12 | 87.61(± 1.76) | 86.47(±1.74) | 87.33(±1.45) | 68.31(±1.53) | 66.14(± 1.57) | 79.35 (±1.83) | 89.92(±0.17) |
| System 300 | 89.31(± 2.04) | 89.67(±2.57) | 89.76(±0.97) | 71.42(±1.37) | 65.93(±1.03) | 81.45(±1.65) | 91.25(±0.17) |

FIG. 13

| Datasets | Noise level | Existing 2 | Existing 13 | Existing 14 | Existing 15 | Existing 16 | Existing 12 | System 300 |
|---|---|---|---|---|---|---|---|---|
| Dataset 8 | 0% | 92.9(1.2) | 81.4(0.8) | 90.4(0.7) | 90.1(1.2) | 91.8(1.1) | 90.9(0.5) | 95.3(0.7) |
| Dataset 8 | 15% | 90.9(1.5) | 73.1(1.4) | 83.5(1.6) | 88.7(1.6) | 91.2(0.7) | 86.1(0.6) | 94.6(0.9) |
| Dataset 8 | 30% | 89.0(3.6) | 64.3(2.1) | 74.4(2.8) | 61.9(4.0) | 90.3(3.2) | 81.3(0.7) | 94.2(0.8) |
| Dataset 9 | 0% | 18.5(0.6) | 18.2(0.4) | 18.8(0.4) | 16.8(0.4) | 18.3(0.5) | 18.6(0.7) | 18.7(0.5) |
| Dataset 9 | 15% | 16.8(0.6) | 14.2(0.6) | 15.6(0.4) | 13.6(0.5) | 16.7(0.5) | 14.1(0.6) | 18.2(0.6) |
| Dataset 9 | 30% | 14.6(0.4) | 11.6(0.4) | 12.6(0.2) | 12.9(0.6) | 14.8(0.5) | 13.5(0.5) | 17.9(0.5) |

FIG. 15

DISTRIBUTABLE EVENT PREDICTION AND MACHINE LEARNING RECOGNITION SYSTEM

CROSS-REFERENCE TO RELATED APPLICATIONS

The present application claims the benefit of and priority based on 35 U.S.C. § 119(e) to U.S. Provisional Patent Application No. 62/991,973 filed Mar. 19, 2020, the entire contents of which are hereby incorporated by reference. The present application also claims the benefit of and priority based on 35 U.S.C. § 119(e) to U.S. Provisional Patent Application No. 62/990,399 filed Mar. 16, 2020, the entire contents of which are hereby incorporated by reference.

BACKGROUND

Facilitating effective decision making requires the transformation of relevant data to high-quality classification models. Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be classified in training data to indicate occurrence or non-occurrence of the event or to recognize/classify the object. An unsupervised learning system predicts the class, target variable y, in training data by defining a model that describes hidden structure in the training data. Supervised learning requires that the target (dependent) variable y be labeled in training data so that a model can be built to predict the label of new unlabeled data. A supervised learning system discards an observation in the training data that is not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the classification (data labeling) model.

Semi-supervised learning systems have many application areas such as image analysis tasks and microarray gene expression classification where measurements require expensive machinery and labels take significant time-consuming analysis and human effort. Due to the subjective nature of manual classification, human fatigue, and the difficulty of the classification task, class labels obtained from various sources such as crowdsourcing, synthetic labeling, and data programming inevitably contain noise. However, traditional learning techniques are not particularly designed for noise reduction. As a result, the semi-supervised classification performance is reduced dramatically when the class labels are inaccurate.

Determining hyperparameters associated with the classification model to determine the best model configuration is a complex optimization problem. Though the classification model solutions are influenced by the hyperparameters, there are typically no clear default values for the hyperparameters that generate a satisfactory classification model for a wide range of applications. Not only do the input values used for the hyperparameters dictate the performance of the training process, but more importantly they influence the quality of the resulting classification models. Even with expertise in setting the hyperparameters, the best values of these hyperparameters change with different data. As a result, it is difficult to define the hyperparameter values based on previous experience. However, there is an inherent expense in training numerous candidate models to evaluate various values and combinations of values for the hyperparameters in terms of computing resources, computing time, and user time.

SUMMARY

In an example embodiment, a non-transitory computer-readable medium is provided having stored thereon computer-readable instructions that when executed by a computing device, cause the computing device to predict occurrence of an event or to classify an object using semi-supervised data to label unlabeled data in a dataset. (A) A weight matrix is computed using a kernel function applied to a plurality of observation vectors. The plurality of observation vectors includes a plurality of unclassified observation vectors and a plurality of classified observation vectors. A target variable value is defined to represent a label for each respective observation vector of the plurality of classified observation vectors. The target variable value is not defined to represent the label for each respective observation vector of the plurality of unclassified observation vectors. (B) A decomposition of the computed weight matrix is performed. (C) A predefined number of eigenvectors is selected from the decomposed weight matrix to define a decomposition matrix. The predefined number of eigenvectors have smallest eigenvalues relative to other eigenvectors not selected from the decomposed weight matrix. (D) A gradient value is computed as a function of the defined decomposition matrix, a plurality of sparse coefficients, and a label vector defined from the plurality of observation vectors based on the target variable value. The gradient value includes an L2-norm term computed for the plurality of sparse coefficients. (E) A value of each coefficient of the plurality of sparse coefficients is updated based on the computed gradient value. (F) (D) and (E) are repeated until a convergence parameter value indicates the plurality of sparse coefficients have converged. (G) A classification matrix is defined using the converged plurality of sparse coefficients. (H) The target variable value is determined for each observation vector of the plurality of unclassified observation vectors based on the defined classification matrix to update the label vector. (I) The target variable value is output for each observation vector of the plurality of unclassified observation vectors. The target variable value selected for each observation vector of the plurality of unclassified observation vectors is defined to represent the label for a respective unclassified observation vector.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to predict occurrence of an event or to classify an object using semi-supervised data to label unlabeled data in a dataset.

In yet another example embodiment, a method of predicting occurrence of an event or of classifying an object using semi-supervised data to label unlabeled data in a dataset is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIG. 13 shows a comparison table of accuracy values computed for seven different datasets and using 12 different classification systems in accordance with an illustrative embodiment.

FIG. 15 shows a comparison table of accuracy values computed for two five different datasets with varying levels of label noise and using seven different classification systems in accordance with an illustrative embodiment.

DETAILED DESCRIPTION

Figure 1:
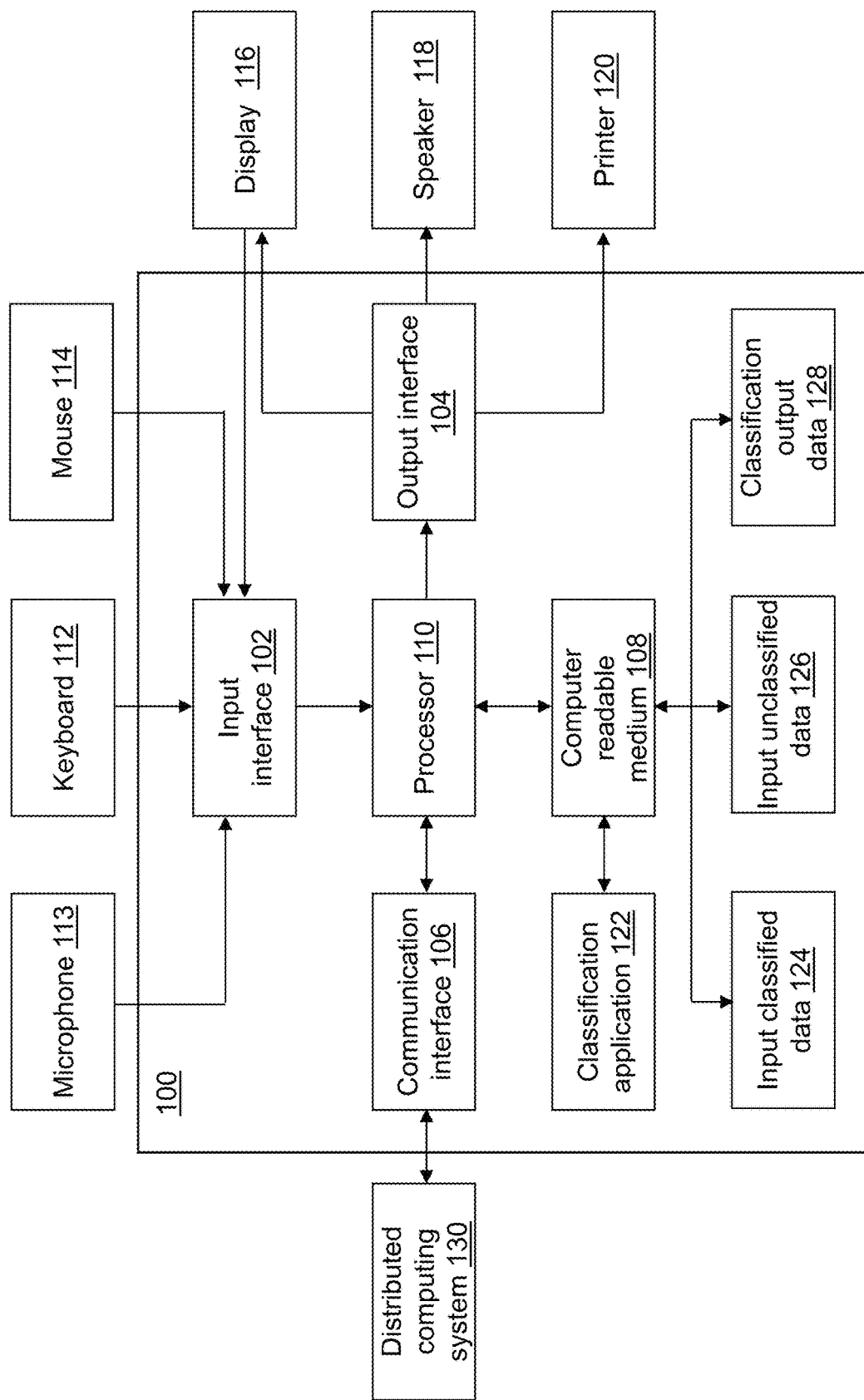
FIG. 1 depicts a block diagram of a classification device in accordance with an illustrative embodiment.

A classification application 122 more accurately classifies unclassified observation vectors using a relatively small number of classified observation vectors that may be noisy in comparison with previous methods such as the method described in Lu et al., *Noise-Robust Semi-Supervised Learning by Large-Scale Sparse Coding*, AAAI Conference on Artificial Intelligence (2015). Noisy labels indicate that some of the human classified observation vectors have been classified incorrectly. Existing classification methods are not designed to work effectively when some of the classified observation vectors have been classified incorrectly. These methods assume that the classifications provided as input are correct as a basis for training the method to classify unclassified observation vectors. The incorrect classifications have various causes including poorly trained, careless, tired, or irresponsible human classifiers. In some cases, even well-trained expert human classifiers can make mistakes when classifying data. For example, a trained radiologist may miss a cancer indicator that is present in an image thus incorrectly classifying the image as non-cancerous. As another example, it is often challenging to distinguish images such as classifying an image as including a wolf or a dog such as a German shepherd.

Through elastic net regularization and automation, classification application 122 and/or a classification model tuning application 422 (shown referring to FIG. 4) are capable of not only correcting corrupted labeled data but also of achieving a higher classification accuracy on unclassified data as shown in FIGS. 11C to 11F. The major contributions and desirable properties of classification application 122 and/or a classification model tuning application 422 include increased efficiency, the capability to automate hyperparameter selection, improved accuracy, and scalability based on application in a distributed computing system. Leveraging the elastic net graph to combine $L_1$-norm and $L_2$-norm penalties for graph Laplacian regularization, classification application 122 and/or a classification model tuning application 422 use a correlation between variables to enhance the robustness of the classification performance. By minimizing a total graph loss for semi-supervised learning, classification application 122 and/or a classification model tuning application 422 can further overcome the difficulty of hyperparameter selections in the process of obtaining optimal solutions. Classification application 122 and/or a classification model tuning application 422 can further exploit distributed computing resources for scalability to big data. In addition, classification application 122 and/or a classification model tuning application 422 have a linear time and space complexity with respect to the number of observations, which further enhances the scalability to large datasets. There are applications for classification application 122 in many areas such as process control and equipment health monitoring, image processing and classification, data segmentation, data analysis, etc.

Referring to FIG. 1, a block diagram of a classification device 100 is shown in accordance with an illustrative embodiment. Classification device 100 may include an input interface 102, an output interface 104, a communication interface 106, a non-transitory computer-readable medium 108, a processor 110, classification application 122, input classified data 124, input unclassified data 126, and classification output data 128. Fewer, different, and/or additional components may be incorporated into classification device 100.

Input interface 102 provides an interface for receiving information from the user or another device for entry into classification device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification device 100 or to make selections presented in a user interface displayed on display 116. The same interface may support both input interface 102 and output interface 104. For example, display 116 comprising a touch screen provides a mechanism for user input and for presentation of output to the user. Classification device 100 may have one or more input interfaces that use the same or a different input interface technology. The input interface technology further may be accessible by classification device 100 through communication interface 106.

Output interface 104 provides an interface for outputting information for review by a user of classification device 100 and/or for use by another application or device. For example, output interface 104 may interface with various output technologies including, but not limited to, display 116, a speaker 118, a printer 120, etc. Classification device 100 may have one or more output interfaces that use the same or a different output interface technology. The output interface technology further may be accessible by classification device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification device 100 may have one or more communication interfaces that use the same or a different communication interface technology. For example, classification device 100 may support communication using an Ethernet port, a Bluetooth antenna, a telephone jack, a USB port, etc. Data and/or messages may be transferred between classification device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification device 100 also may have one or more drives that support the loading of a memory media such as a CD, DVD, an external hard drive, etc. One or more external hard drives further may be connected to classification device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification application 122 performs operations associated with classifying each observation vector included in input unclassified data 126. Some or all of the operations described herein may be embodied in classification application 122. The operations may be implemented using hardware, firmware, software, or any combination of these methods.

Referring to the example embodiment of FIG. 1, classification application 122 is implemented in software (comprised of computer-readable and/or computer-executable instructions) stored in computer-readable medium 108 and accessible by processor 110 for execution of the instructions that embody the operations of classification application 122. Classification application 122 may be written using one or more programming languages, assembly languages, scripting languages, etc. Classification application 122 may be integrated with other analytic tools. As an example, classification application 122 may be part of an integrated data analytics software application and/or software architecture such as that offered by SAS Institute Inc. of Cary, N.C., USA. Merely for illustration, classification application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification application 122 may be implemented as a Web application. For example, classification application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input classified data 124 and input unclassified data 126 may include, for example, a plurality of rows and a plurality of columns. The plurality of rows may be referred to as observation vectors or records (observations), and the columns may be referred to as variables. In an alternative embodiment, input classified data 124 and input unclassified data 126 may be transposed. The plurality of variables define a vector $x_i$ for each observation vector $i=1, 2, \ldots, N$, where N is a number of the observation vectors included in input classified data 124 and input unclassified data 126. Input classified data 124 includes a target variable value $y_i$ for each observation vector that indicates a label or class or other characteristic defined for the respective observation vector $x_i$ for $i=1, 2, \ldots, l$, where l is a number of the observation vectors included in input classified data 124. Input classified data 124 includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

Input unclassified data 126 includes observation vectors $x_i$ that have not been labeled such that the $y_i$ value has not been determined though a value such as zero may be included in a column associated with the $y_i$ values. Input classified data 124 and input unclassified data 126 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefor, a classified observation vector.

Input classified data 124 and input unclassified data 126 may include additional variables that are not included in the plurality of variables. One or more variables of the plurality of variables may describe a characteristic of a physical object. For example, if input classified data 124 and input unclassified data 126 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 126 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition. Input classified data 124 and input unclassified data 126 may include a reference to image data that may be stored, for example, in an image file or in a video file, and the existence/non-existence label associated with each image file or video file. Input classified data 124 and input unclassified data 126 may include a plurality of such references. The existence/non-existence label or other label may be defined by a clinician or expert in the field to which data stored in input classified data 124 relates.

In data science, engineering, and statistical applications, data often consists of multiple measurements (across sensors, characteristics, responses, etc.) collected across multiple time instances (patients, test subjects, etc.). These measurements may be collected in input classified data 124 and input unclassified data 126 for analysis and processing or streamed to classification device 100 as it is generated. Input classified data 124 and input unclassified data 126 may include data captured as a function of time for one or more physical objects. The data stored in input classified data 124 and input unclassified data 126 may be captured at different time points periodically, intermittently, when an event occurs, etc. Input classified data 124 and input unclassified data 126 may include data captured at a high data rate such as 200 or more observation vectors per second for one or more physical objects. One or more columns of input classified data 124 and input unclassified data 126 may include a time and/or date value. Input classified data 124 and input unclassified data 126 may include data captured under normal and abnormal operating conditions of the physical object.

The data stored in input classified data 124 and input unclassified data 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 126 may be generated as part of the Internet of Things (IoT), where things (e.g., machines, devices, phones, sensors) can be connected to networks and the data from these things collected and processed within the things and/or external to the things before being stored in input classified data 124 and input unclassified data 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 126.

The data stored in input classified data 124 and input unclassified data 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 126 may be stored on computer-readable medium 108 or on one or more computer-readable media of distributed computing system 130 and accessed by classification device 100 using communication interface 106, input interface 102, and/or output interface 104. Input classified data 124 and input unclassified data 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 126 may be stored using various data structures as known to those skilled in the art including one or more files of a file system, a relational database, one or more tables of a system of tables, a structured query language database, etc. on classification device 100 or on distributed computing system 130. Classification device 100 may coordinate access to input classified data 124 and input unclassified data 126 that is distributed across distributed computing system 130 that may include one or more computing devices. For example, input classified data 124 and input unclassified data 126 may be stored in a cube distributed across a grid of computers as understood by a person of skill in the art. As another example, input classified data 124 and input unclassified data 126 may be stored in a multi-node Hadoop® class. For instance, Apache™ Hadoop® is an open-source software framework for distributed computing supported by the Apache Software Foundation. As another example, input classified data 124 and input unclassified data 126 may be stored in a cloud of computers and accessed using cloud computing technologies, as understood by a person of skill in the art. The SAS® LASR™ Analytic Server may be used as an analytic platform to enable multiple users to concurrently access data stored in input classified data 124 and input unclassified data 126. The SAS Viya open, cloud-ready, in-memory architecture also may be used as an analytic platform to enable multiple users to concurrently access data stored in input classified data 124 and input unclassified data 126. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
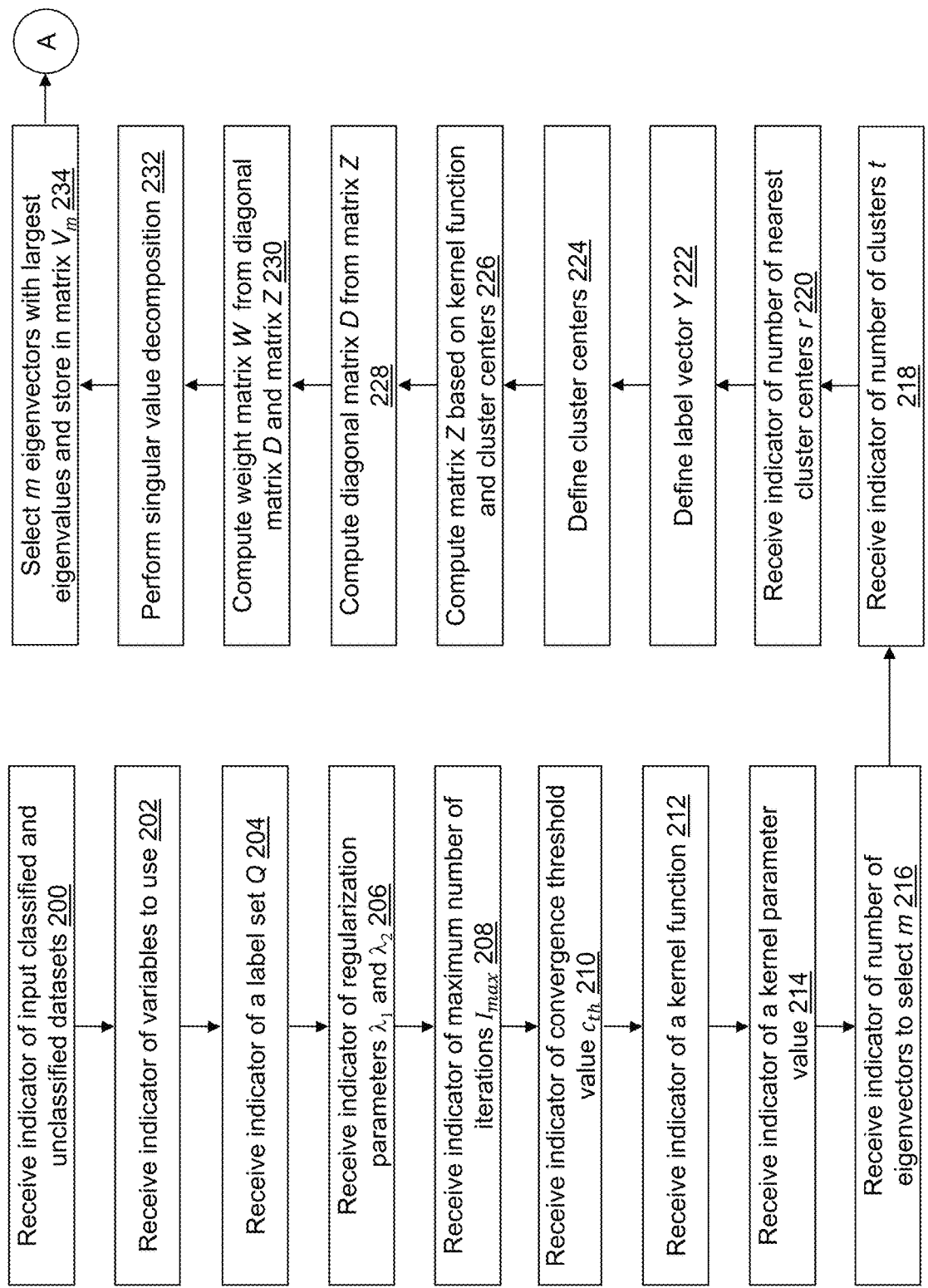
FIGS. 2A and 2B depict a flow diagram illustrating examples of operations performed by a classification application of the classification device of FIG. 1 in accordance with an illustrative embodiment.
Figure 2B:
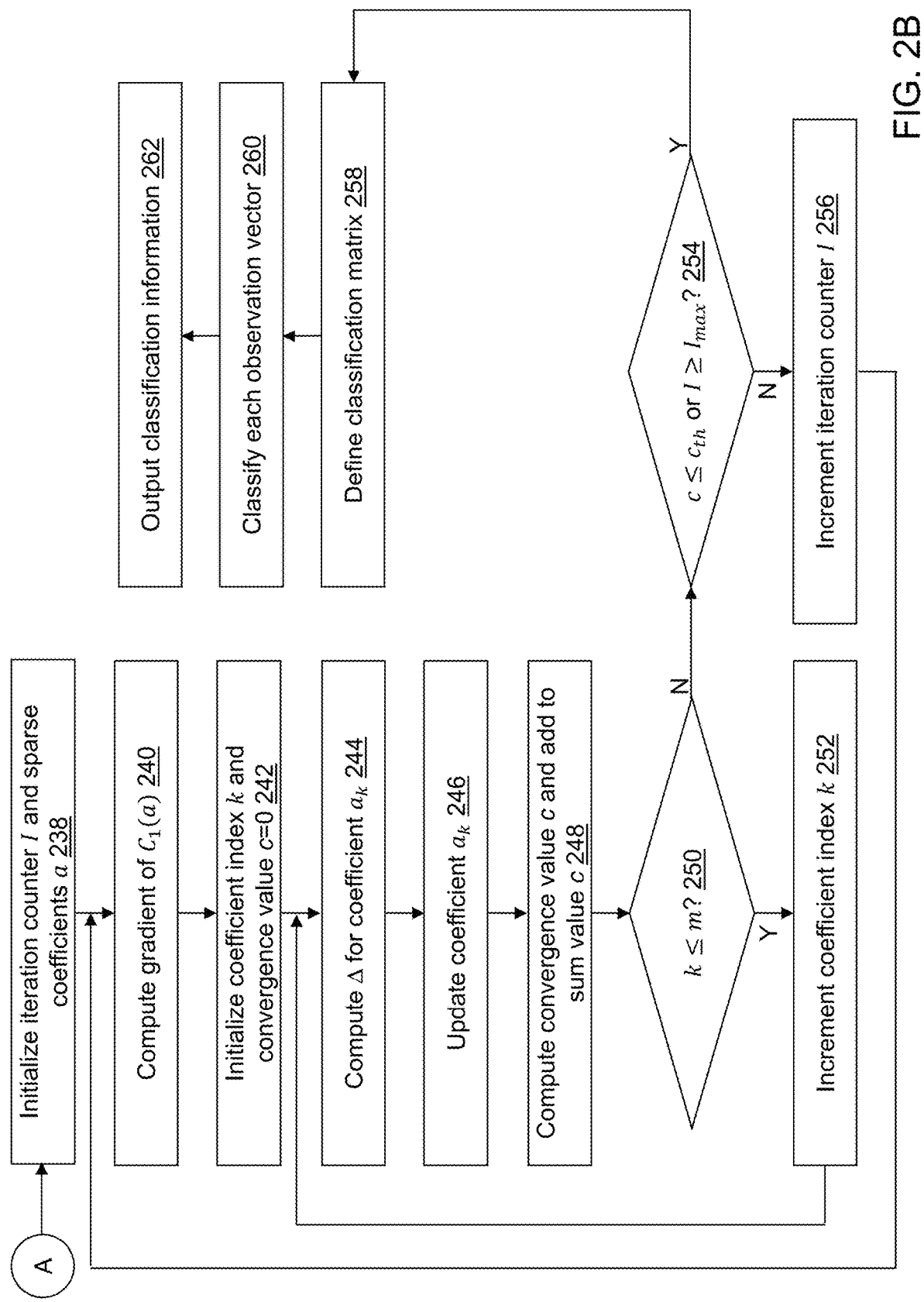

Referring to FIGS. 2A and 2B, example operations associated with classification application 122 are described when input classified data 124 and input unclassified data 126 are stored on classification device 100 and accessed by a single thread of classification device 100. Additional, fewer, or different operations may be performed depending on the embodiment of classification application 122. The order of presentation of the operations of FIGS. 2A and 2B is not intended to be limiting. Some of the operations may not be performed in some embodiments. Although some of the operational flows are presented in sequence, the various operations may be performed in various repetitions and/or in other orders than those that are illustrated. For example, a user may execute classification application 122, which causes presentation of a first user interface window, which may include a plurality of menus and selectors such as drop-down menus, buttons, text boxes, hyperlinks, etc. associated with classification application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122.

Referring to FIG. 2A, in an operation 200, a first indicator may be received that indicates input classified data 124 and input unclassified data 126. For example, the first indicator indicates a location and a name of input classified data 124 and input unclassified data 126 that may be stored together or separately though they are described herein as separate for simplicity. As an example, the first indicator may be received by classification application 122 after selection from a user interface window or after entry by a user into a user interface window. In an alternative embodiment, input classified data 124 and input unclassified data 126 may not be selectable. For example, a most recently created dataset may be used automatically.

In an operation 202, a second indicator may be received that indicates the plurality of variables to use from input classified data 124 and input unclassified data 126 to define observation vectors. For example, the second indicator may indicate one or more column numbers or one or more column names. As another option, all of the columns of input classified data 124 and input unclassified data 126 except a first or a last column may be assumed to be the plurality of variables. The plurality of variables are the variables that define each observation vector $x_i$. A number of the plurality of variables may be indicated by N. The second indicator may further indicate a column number or a column name that stores the value for $y_i$ in input classified data 124 and/or input unclassified data 126. As another option, the first or the last column may be assumed to include the value for $y_i$.

In an operation 204, a third indicator may be received that indicates a label set Q associated with input classified data 124 and input unclassified data 126. For example, the label set Q includes a list of permissible values that the $y_i$-variable (target) value of each observation vector $x_i$ may have. For illustration, if input classified data 124 and input unclassified data 126 include text images of numeric digits, the label set Q includes c=10 permissible values that may be indicated as Q={1, . . . , c}, where Q=1 may be associated with the digit "0", Q=2 may be associated with the digit "1", Q=3 may be associated with the digit "2", . . . , Q=10 may be associated with the digit "9". c is a number of classes in label set Q. No $y_i$-variable (target) value or a variable value of zero may indicate that the associated observation vector $x_i$ is not classified when input classified data 124 and input unclassified data 126 are stored together in memory or in a single dataset. The label set Q further may be a binary indicator that indicates the existence or non-existence of a characteristic of each observation vector. For example, a $y_i$-variable (target) value of −1 may indicate no fraud for a transaction, a $y_i$-variable (target) value of 1 may indicate that the transaction is fraudulent, and a $y_i$-variable (target) value of 0 may indicate that the transaction has not been classified.

When input classified data 124 and input unclassified data 126 are stored together in memory or in a single dataset, input classified data 124 may be extracted. Input classified data 124 and input unclassified data 126 together define a point set $\chi=\{x_1, \ldots, x_l, x_{l+1}, \ldots, x_N\}$, where N indicates a total number of data points or observation vectors $x_i$, where the observation vectors $x_i$ (i≤l) are labeled such that $y_i \in Q$, and the remaining observation vectors $x_i$ (l<i≤N) are unlabeled such that $y_i \notin Q$. Thus, l indicates a number of classified data points or observation vectors $x_i$ included in input classified data 124. For illustration, l may be a small percentage, such as less than 1% of the total number of observation vectors N.

In an operation 206, a fourth indicator of a first regularization parameter value $\lambda_1$ and a second regularization parameter value $\lambda_2$ may be received. In an alternative embodiment, the fourth indicator may not be received. For example, default values may be stored, for example, in computer-readable medium 108 and used automatically. In another alternative embodiment, the values of the first regularization parameter $\lambda_1$ and a second regularization parameter $\lambda_2$ may not be selectable. Instead, fixed, predefined values may be used. For illustration, a default value of the first regularization parameter $\lambda_1$ may be 0.7 and a default value of the second regularization parameter $\lambda_2$ may be 0.7 though other values may be used.

In an operation 208, a fifth indicator of a maximum number of iterations $I_{max}$ may be received. In an alternative embodiment, the fifth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 210, a sixth indicator of a convergence threshold value $c_{th}$ may be received. In an alternative embodiment, the sixth indicator may not be received. For example, a default value may be stored, for example, in computer-readable medium 108 and used automatically. In another alternative embodiment, the value of the convergence threshold value $c_{th}$ may not be selectable. Instead, a fixed, predefined value may be used. For illustration, a default value of the convergence threshold value $c_{th}$ may be 0.01 though other values may be used.

In an operation 212, a seventh indicator of a kernel function may be received. For example, the seventh indicator indicates a name of a kernel function. The seventh indicator may be received by classification application 122 after selection from a user interface window or after entry by a user into a user interface window. A default value for the kernel function may further be stored, for example, in computer-readable medium 108. As an example, a kernel function may be selected from "Gaussian", "Exponential", "Linear", "Polynomial", "Sigmoid", "Radial Basis", etc. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in classification application 122. For example, the Gaussian kernel function may be used by default or without allowing a selection. The Gaussian kernel function may be defined as:

$$\exp\frac{-\|x_i - x_j\|^2}{2s^2}$$

where s is a kernel parameter that is termed a Gaussian bandwidth parameter.

In an operation 214, an eighth indicator of a kernel parameter value to use with the kernel function may be received. For example, a value for s, the Gaussian bandwidth parameter, may be received for the Gaussian kernel function. In an alternative embodiment, the eighth indicator may not be received. For example, a default value for the kernel parameter value may be stored, for example, in computer-readable medium 108 and used automatically or the kernel parameter value may not be used. In another alternative embodiment, the value of the kernel parameter may not be selectable. Instead, a fixed, predefined value may be used.

In an operation 216, a ninth indicator of a number of eigenvectors to select m may be received. In an alternative embodiment, the number of eigenvectors to select m may not be received. For example, a default value for the number of eigenvectors to select m may be stored, for example, in computer-readable medium 108 and used automatically. In another alternative embodiment, the value of the number of eigenvectors to select m may not be selectable. Instead, a fixed, predefined value may be used.

In an operation 218, a tenth indicator of a number of clusters t may be received. In an alternative embodiment, the number of clusters t may not be received. For example, a default value for the number of clusters t may be stored, for example, in computer-readable medium 108 and used automatically. In another alternative embodiment, the value of the number of clusters t may not be selectable. Instead, a fixed, predefined value may be used.

In an operation 220, an eleventh indicator of a number of nearest cluster centers r may be received. In an alternative embodiment, the number of nearest cluster centers r may not be received. For example, a default value for the number of nearest cluster centers r may be stored, for example, in computer-readable medium 108 and used automatically. In another alternative embodiment, the value of the number of nearest cluster centers r may not be selectable. Instead, a fixed, predefined value may be used.

In an operation 222, a label vector Y is defined from input classified data 124 and input unclassified data 126. $Y_i$=k if $x_i$ is labeled as $y_i$=k. Otherwise, $Y_i$=0. As another option for binary data, $Y_i$=1 if $y_i$ indicates true; $Y_i$=−1 if $y_i$ indicates false; otherwise, $Y_i$=0.

In operation 224, t cluster centers $\{u_1, u_2, \ldots, u_t\}$ are defined by executing a k-means clustering algorithm with input classified data 124 and input unclassified data 126. In alternative embodiments, different clustering algorithms may be used to define the t cluster centers.

In an operation 226, a matrix Z is computed using the t cluster centers, the kernel function, the kernel parameter value s, and the number of nearest cluster centers r. For example, using the Gaussian kernel function, the matrix Z is computed using $$z_{i,j} = \frac{\exp\left(\frac{-\|x_i - u_j\|^2}{2s^2}\right)}{\sum_{k \in N_r(i)} \exp\left(\frac{-\|x_i - u_k\|^2}{2s^2}\right)}, \quad i = 1, 2, \ldots, N$$

and j=1, 2, ..., t,
where $N_r(i)$ is an index to a nearest cluster center to $x_i$ of the number of nearest cluster centers r, $x_i$ is an $i^{th}$ observation vector selected from input classified data 124 and input unclassified data 126, $u_j$ is a $j^{th}$ cluster center selected from the t cluster centers $\{u_1, u_2, \ldots, u_t\}$, and matrix Z is an N×t matrix.

In an operation 228, a diagonal matrix D is computed from the matrix Z. For example, the diagonal matrix D is a t×t matrix and is defined as $D_{jj} = \Sigma_{i=1}^{N} z_{ij}$, j=1, 2, ..., t and $D_{ij}$=0 if i≠j.

In an operation 230, a weight matrix W is computed using diagonal matrix D and the matrix Z as $W = ZD^{-0.5}D^{-0.5}Z^\top$, where $W = \hat{Z}\hat{Z}^\top$ and $^\top$ indicates a transpose.

In an operation 232, a singular value decomposition is applied to $\hat{Z}^\top\hat{Z}$ to obtain V based on $\hat{Z}^\top\hat{Z} = U\Sigma\Sigma U^\top$, where $\hat{Z} = V\Sigma U^\top$ where each column of U is an eigenvector of $\hat{Z}^\top\hat{Z}$, and each column of V is an eigenvector of W.

In an operation 234, m eigenvectors having the largest eigenvalues are selected from the singular value decomposition V and stored in a matrix $V_m$, where $V_m$ is an N×m matrix, and processing continues in operation 238.

An optimization is applied to define a classification matrix F using $F = V_m a$, where a is a plurality of sparse coefficients, where the plurality of sparse coefficients includes a coefficient value defined for each of the m eigenvectors. The optimization is defined to minimize $$Q(a) = 0.5\|V_m a - Y\|_2^2 + \lambda_1 \sum_{i=1}^{m} \sum_{ii}^{\frac{1}{2}} |a_i| + \lambda_2 \left(\sum_{i=1}^{m} \sum_{ii}^{\frac{1}{2}} a_i\right)^2 = C_1(a) + C_2(a),$$

where $$C_1(a) = 0.5\|V_m a - Y\|_2^2 + \lambda_2 \left(\sum_{i=1}^{m} \sum_{ii}^{\frac{1}{2}} a_i\right)^2$$

includes the differentiable terms from Q(a), and $$C_2(a) = \lambda_1 \sum_{i=1}^{m} \sum_{ii}^{\frac{1}{2}} |a_i|$$

includes the non-differentiable terms from Q(a). The first term, $0.5\|V_m a - Y\|_2^2$, defines a fitting constraint primarily to ensure the classification function is close enough to the initial classification labels defined by Y. The second term $$\lambda_1 \sum_{i=1}^{m} \sum_{ii}^{\frac{1}{2}} |a_i|,$$

provides an $L_1$-norm smoothness constraint for Laplacian regularization. The third term $$\lambda_2 \left(\sum_{i=1}^{m} \sum_{ii}^{\frac{1}{2}} a_i\right)^2,$$

provides an $L_2$-norm constraint for Laplacian regularization. The significance of the third term is two-fold. First, the third term characterizes correlations between variables to fully utilize the interdependency along different dimensions to enhance the classification performance. Second, it makes the loss function strongly convex, which ensures the unique solution to be Lipschitz with respect to classification matrix F.

Referring to FIG. 2B, in operation 238, the plurality of sparse coefficients a are each initialized, for example, to zero values, where a is an m×1 vector, and an iteration counter I is initialized, for example, as I=1.

In operation 240, a gradient of $C_1(a)$ is computed with respect to the plurality of sparse coefficients a. For example, the gradient of $C_1(a)$ is computed as $$\nabla_{a_i}(C_1(a_i)) = C_{3,i} + 2\lambda_2 \sum_{ii}^{\frac{1}{2}} \sum_{i=1}^{m} \sum_{ii}^{\frac{1}{2}} a_i,$$

where $C_3 = V_m^T (V_m a - Y)$ is an m×1 vector, $C_{3,i}$ is an $i^{th}$ element of $C_3$, and T indicates a transpose. $\nabla_{a_i}(C_i(a_i))$ is an m×1 vector for a binary label set or an m×c matrix for a label set having c classes.

In an operation 242, a coefficient index k is initialized, for example, as k=1, and a convergence value c is initialized, for example, as c=0.

In an operation 244, a difference value $\Delta_k$ is computed for coefficient $a_k$ using $$\Delta_k = a_k - \frac{\nabla_{a_k}(C_1(a_k))}{\|V_m\|_s^2},$$

where $\|V_m\|_s$ is a spectral norm of the matrix $V_m$.

In operation 246, coefficient $a_k$ is updated, for example, $$a_k = \max\left\{|\Delta_k| - \frac{\lambda_1}{\|V_m\|_s}, 0\right\}.$$

In operation 248, a convergence value c is computed, for example, using $c=c+a_k-a_k'$, where $a_k'$ is a value of $a_k$ prior to the update in operation 246. The convergence value c is a sum of a difference between the current $a_k$ and the previous $a_k$ for each coefficient of the sparse coefficients.

In an operation 250, a determination is made concerning whether there is another coefficient of the sparse coefficients to update, for example, using k≤m. If k≤m, processing continues in an operation 252. If k>m, processing continues in an operation 254.

In operation 252, the coefficient index k is incremented, for example, as k=k+1, and processing continues in operation 244 to process the next coefficient.

In operation 254, a determination is made concerning whether convergence has been achieved or the maximum number of iterations have been performed. If $c \leq c_{th}$ or $I \geq I_{max}$, processing continues in an operation 258. If $c > c_{th}$ and $I < I_{max}$, processing continues in an operation 256.

In operation 256, the iteration counter I is incremented, for example, as I=I+1, and processing continues in operation 240.

In operation 258, the classification matrix F is defined using $F=V_m a$, where classification matrix F is an N×1 vector for a binary label set or an N×c matrix for a label set having c classes.

In an operation 260, each of the unclassified observation vectors in input unclassified data 126 is classified and updated in label vector Y. For example, for a binary label set, if $F_i > 0$, the $y_i$-variable (target) value or class of the $i^{th}$ observation vector of input unclassified data 126 is predicted to be 1; whereas, if $F_i < 0$, the $y_i$-variable (target) value or class of the $i^{th}$ observation vector of input unclassified data 126 is predicted to be −1. For a label set having c classes, $y_i$ is selected for each observation vector $x_i$ based on $$y_i = \underset{j \leq c}{\mathrm{argmax}} F_{i,j}.$$

As a result, a label with a highest classification value as indicated by $$\underset{j \leq c}{\mathrm{argmax}} F_{ij}$$

is selected as the $y_i$-variable (target) value or class for the $i^{th}$ observation vector $x_i$ of input unclassified data 126. The classification or label for each observation vector $x_i$ of input unclassified data 126 may be extracted from label set Q using the value of $y_i$ as an index into label set Q, and label vector Y may be updated with these values.

In an operation 262, the class or label identified for each observation vector $x_i$ included in input unclassified data 126 may be stored in classification output data 128 possibly with the respective observation vector $x_i$.

Figure 3:
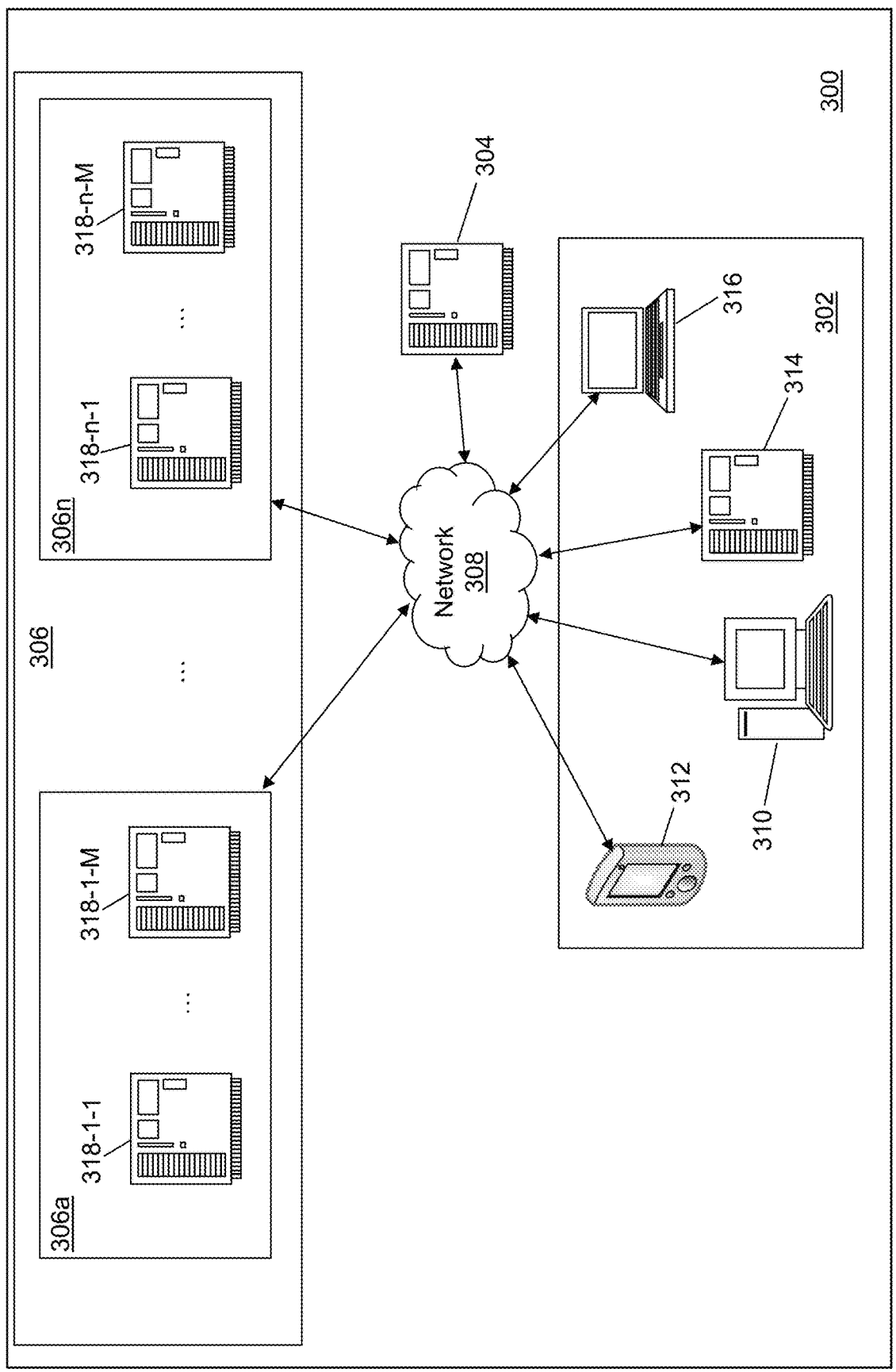
FIG. 3 depicts a block diagram of a classification system in accordance with an illustrative embodiment.

Referring to FIG. 3, a block diagram of a distributed classification system 300 is shown in accordance with an illustrative embodiment. Distributed classification system 300 provides an automated, distributed active machine learning system that jointly minimizes a loss value allowing users to select hyperparameters such as s, m, $\lambda_1$, $\lambda_2$, t, and/or r automatically.

In an illustrative embodiment, distributed classification system 300 may include a user system 302, a selection manager device 304, a worker system 306, and a network 308. Each of user system 302, selection manager device 304, and worker system 306 may be composed of one or more discrete computing devices in communication through network 308. Alternatively, user system 302, selection manager device 304, and worker system 306 may be integrated into a single computing device capable of computing using a plurality of different threads.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of user system 302 may include computing devices of any form factor such as a desktop 310, a smart phone 312, a server computer 314, a laptop 316, a personal digital assistant, an integrated messaging device, a tablet computer, etc. User system 302 can include any number and any combination of form factors of computing devices that may be organized into subnets. In general, a "server" computer may include faster processors, additional processors, more disk memory, and/or more RAM than another computer form factor and support multi-threading as understood by a person of skill in the art. The computing devices of user system 302 may send and receive signals through network 308 to/from another of the one or more computing devices of user system 302 and/or to/from selection manager device 304. The one or more computing devices of user system 302 may communicate using various transmission media that may be wired and/or wireless as understood by those skilled in the art. The one or more computing devices of user system 302 may be geographically dispersed from each other and/or co-located.

Figure 4:
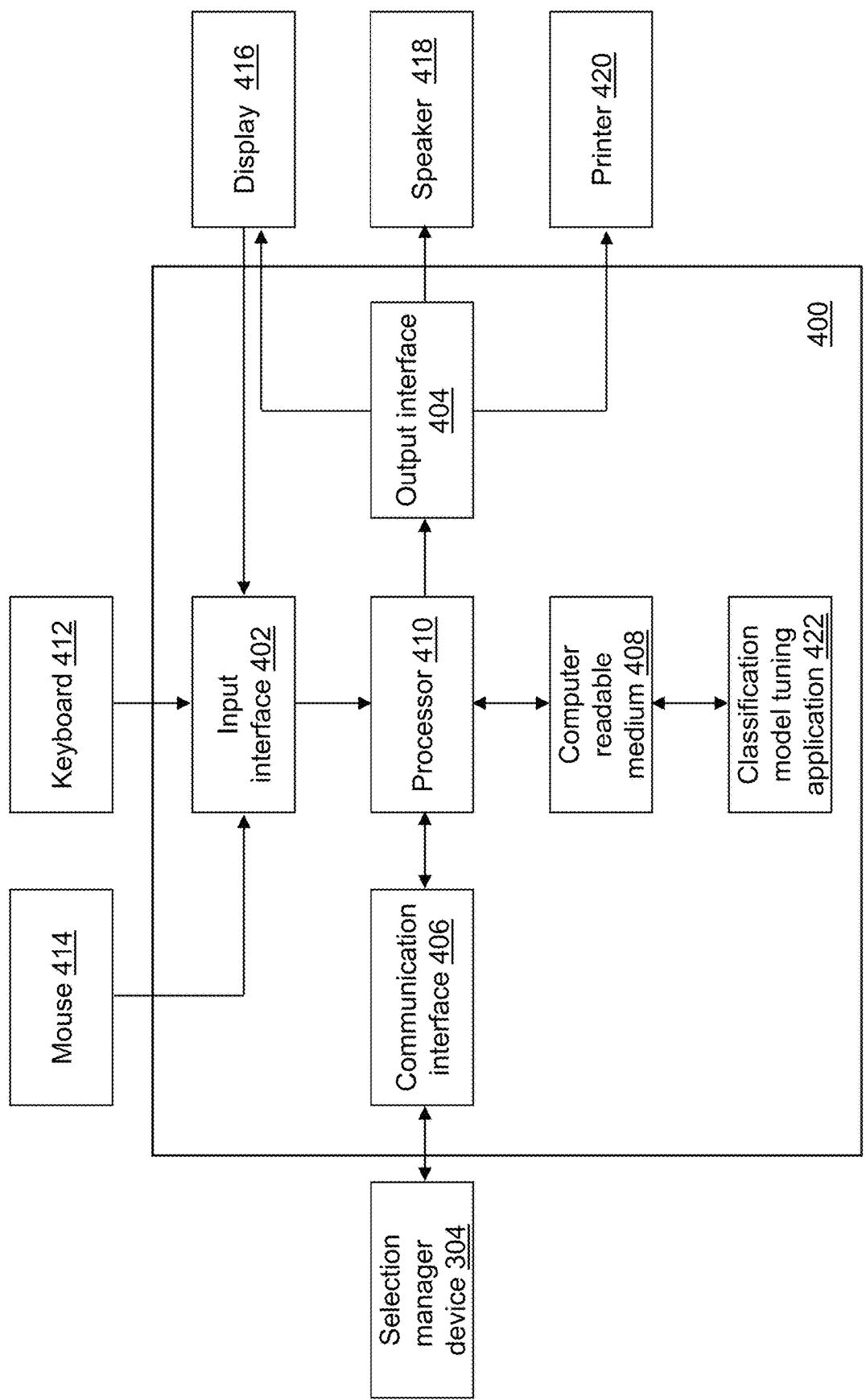
FIG. 4 depicts a block diagram of a user device of the classification system of FIG. 3 in accordance with an illustrative embodiment.

For illustration, referring to FIG. 4, a block diagram of a user device 400 is shown in accordance with an example embodiment. User device 400 is an example computing device of user system 302. For example, each of desktop 310, smart phone 312, server computer 314, and laptop 316 may be an instance of user device 400. User device 400 may include a second input interface 402, a second output interface 404, a second communication interface 406, a second computer-readable medium 608, a second processor 410, and a classification model tuning application 422. Each computing device of user system 302 may be executing classification model tuning application 422 of the same or different type.

Referring again to FIG. 3, selection manager device 304 can include any form factor of computing device. For illustration, FIG. 3 represents selection manager device 304 as a server computer. Selection manager device 304 may send and receive signals through network 308 to/from user system 302 and/or to/from worker system 306. Selection manager device 304 may communicate using various transmission media that may be wired and/or wireless as understood by those skilled in the art. Selection manager device 304 may be implemented on a plurality of computing devices of the same or different type. Distributed classification system 300 further may include a plurality of selection manager devices.

Figure 5:
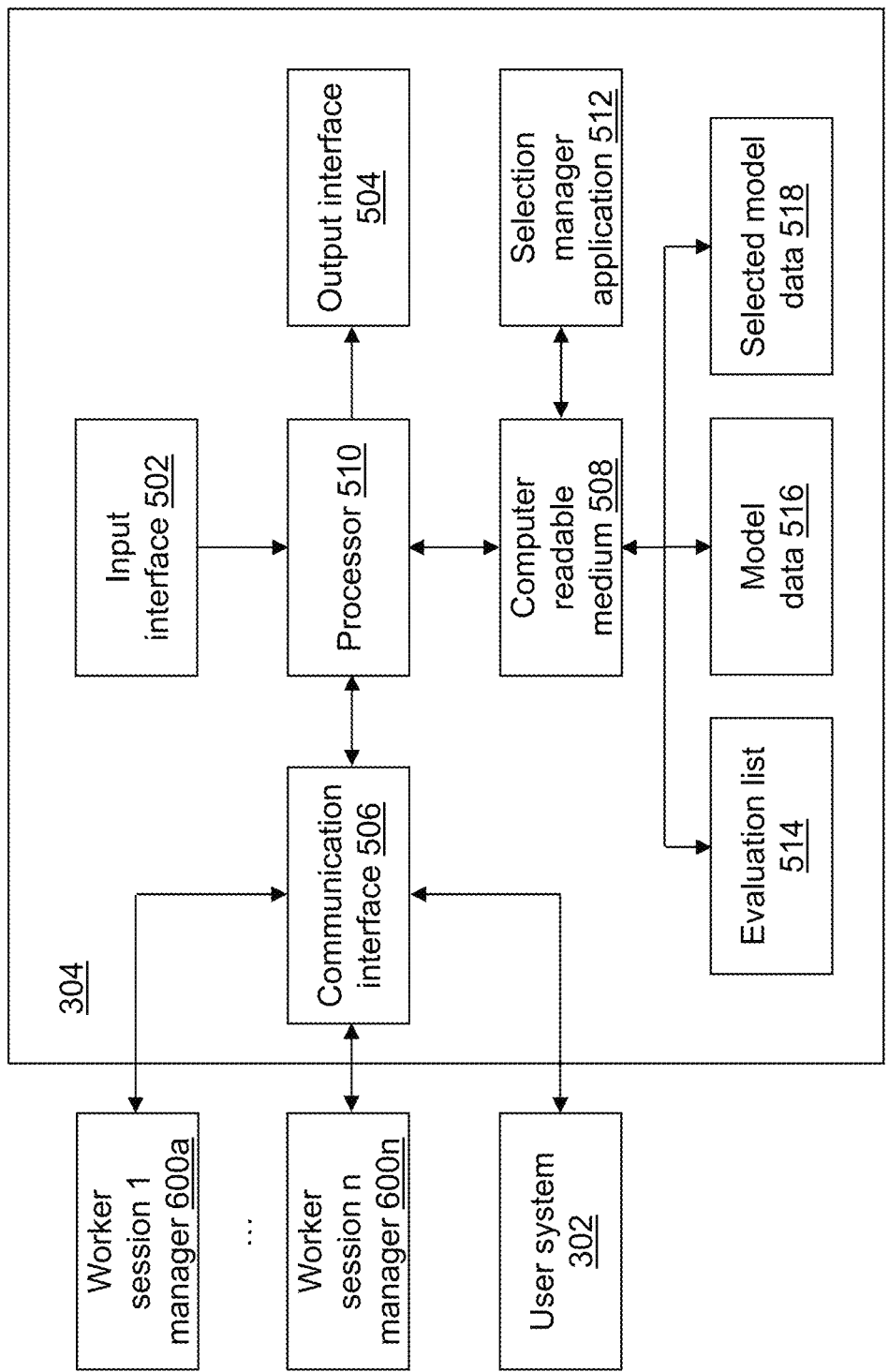
FIG. 5 depicts a block diagram of a selection manager device of the classification system of FIG. 3 in accordance with an illustrative embodiment.

For illustration, referring to FIG. 5, a block diagram of selection manager device 304 is shown in accordance with an illustrative embodiment. Selection manager device 304 may include a third input interface 502, a third output interface 504, a third communication interface 506, a third computer-readable medium 508, a third processor 510, a selection manager application 512, an evaluation list 514, model data 516, and selected model data 518. Evaluation list 514, model data 516, and selected model data 518 are created from results generated by worker system 306. Evaluation list 514 allows the hyperparameter tuning process to remain efficient by only evaluating "close" points once. Evaluation list 514 may be stored in memory using various data structures such as a list, an array, a tree, etc. For example, evaluation list 514 may be stored as a splay tree so that the points that are most recently added are near the root of the tree for faster searching.

Referring again to FIG. 3, the one or more computing devices of worker system 306 may include computers of any form factor that may be organized into one or more sessions, where a number of the one or more sessions is indicated by $N_s$. Worker system 306 may include a number of computing devices indicated by $N_w$. Worker system 306 may include computers of other form factors such as a desktop or a laptop, etc. Worker system 306 can include any number and any combination of form factors of computing devices organized into any number of sessions. For example, in the illustrative embodiment, worker system 306 includes a first worker session 306a, . . . , and an $N_s^{th}$ worker session 306n. Each session may include one or more computing devices, where a number of session computing devices in each session is indicated by M. In the illustrative embodiment, first worker session 306a may include a first computing device 318-1-1, . . . , and an $M^{th}$ computing device 318-1-M, and $N_s^{th}$ worker session 306n may include a first computing device 318-n-1, . . . , and an $M^{th}$ computing device 318-n-M. The number of computing devices indicated by $N_w$ may or may not also include selection manager device 304. A number of threads may be associated with each computing device of worker system 306.

The computing devices of worker system 306 may send and receive signals through network 308 to/from selection manager device 304 and/or to/from user system 302 and/or to/from another computing device of worker system 306. The one or more computing devices of worker system 306 may be geographically dispersed from each other and/or co-located. The one or more computing devices of worker system 306 may communicate using various transmission media that may be wired and/or wireless as understood by those skilled in the art.

Figure 6A:
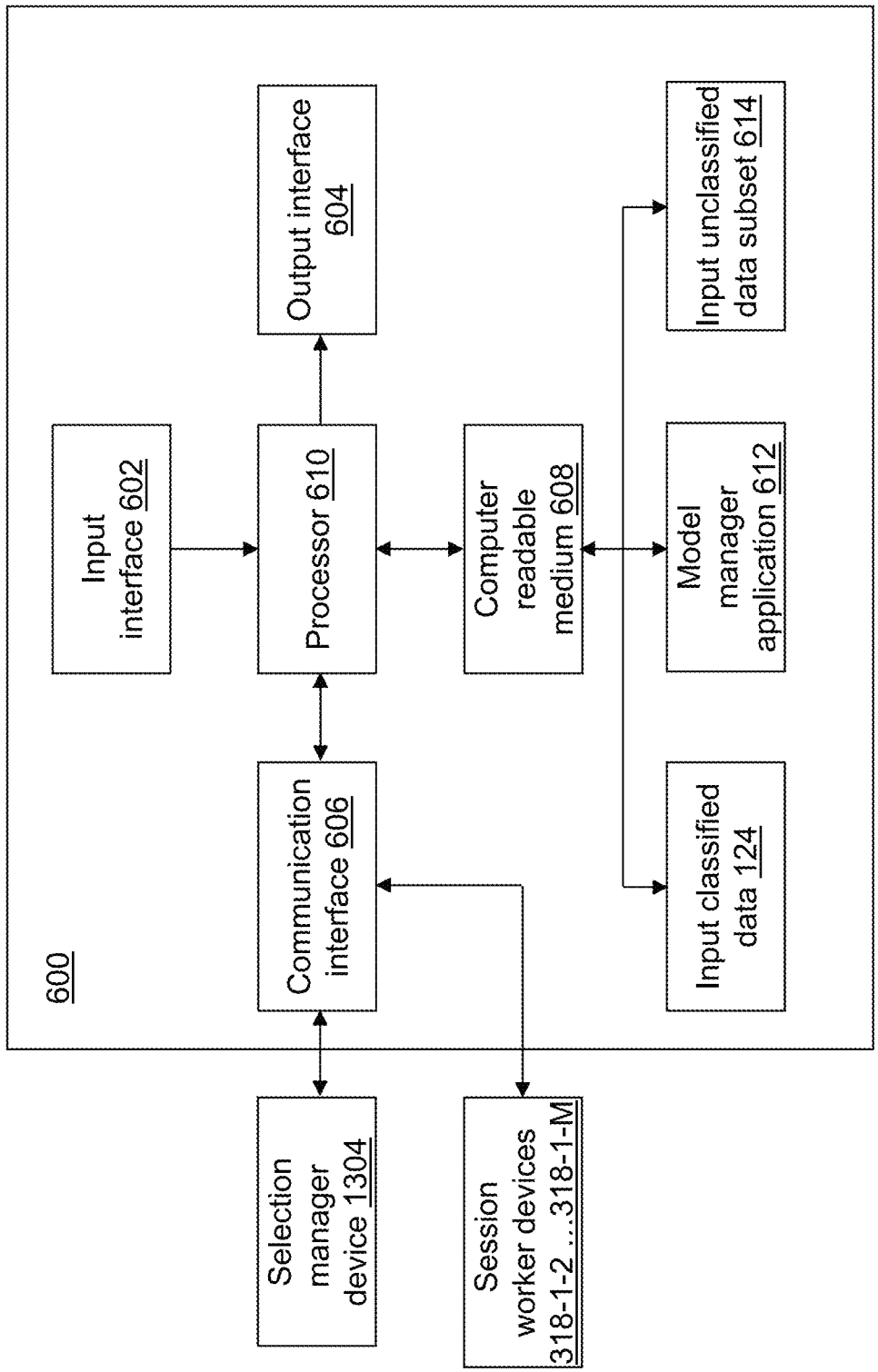
FIG. 6A depicts a block diagram of a session manager device of the classification system of FIG. 3 in accordance with an illustrative embodiment.

For illustration, referring to FIG. 6A, a block diagram of a session manager device 600 is shown in accordance with an example embodiment. Session manager device 600 is an example computing device selected from each session of worker system 306. For example, a first computing device of each session, such as first computing device 318-1-1 of first worker session 306a and first computing device 318-n-1 of $N_s^{th}$ worker session 306n may be an instance of session manager device 600. In the illustrative embodiment of FIG. 6A, session manager device 600 is the session manager device for first worker session 306a and may be referred to as first computing device 318-1-1 that communicates with second computing device 318-1-2, . . . , and $M^{th}$ computing device 318-1-M. Session manager device 600 may include a fourth input interface 602, a fourth output interface 604, a fourth communication interface 606, a fourth computer-readable medium 608, a fourth processor 610, a model manager application 612, input classified data 124, an input unclassified data subset 614.

Figure 6B:
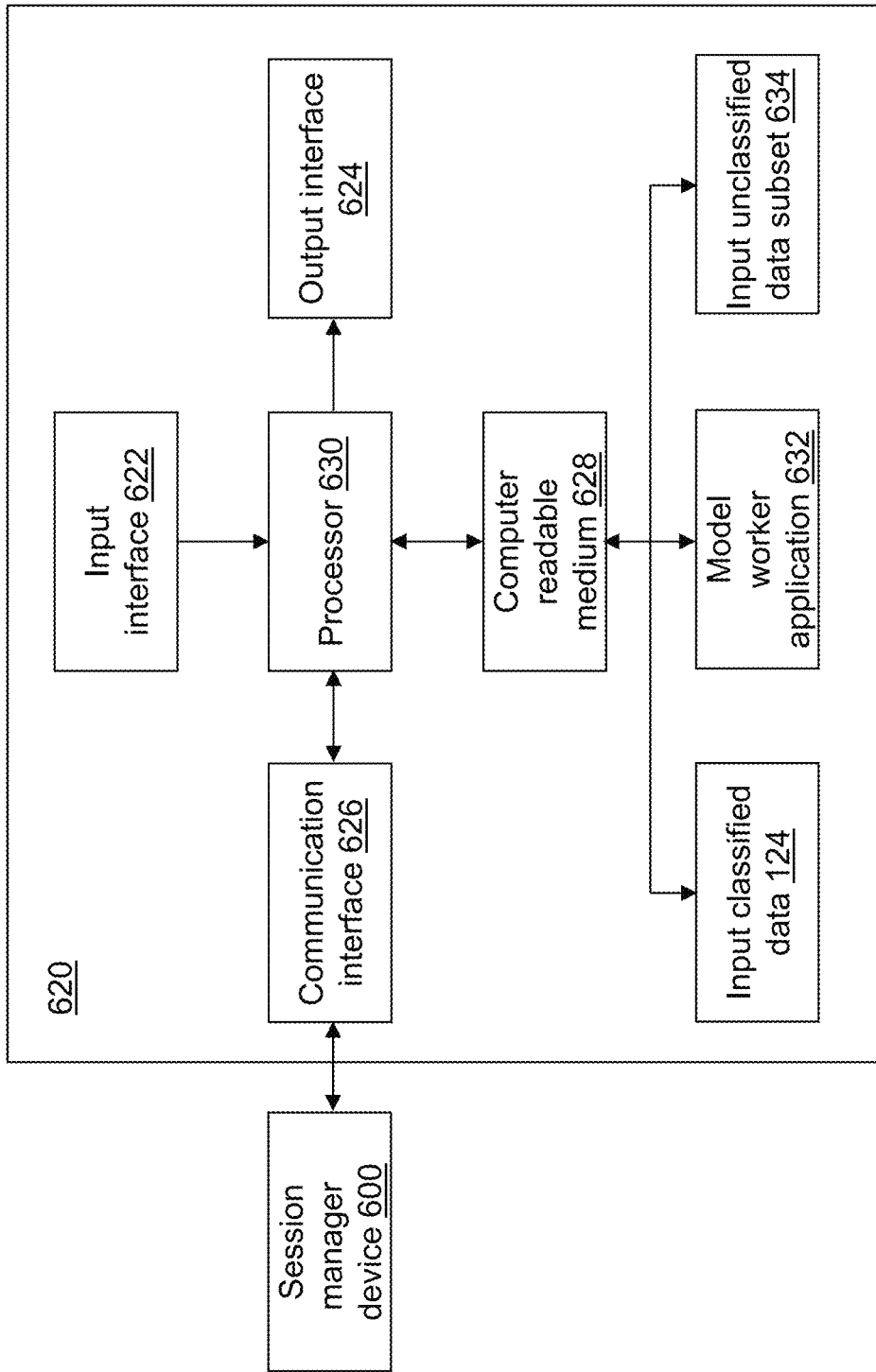
FIG. 6B depicts a block diagram of a session worker device of the classification system of FIG. 3 in accordance with an illustrative embodiment.

For illustration, referring to FIG. 6B, a block diagram of a session worker device 620 is shown in accordance with an example embodiment. Session worker device 620 is an example worker computing device of each session of worker system 306 excluding each session manager device 600. For example, remaining computing devices of each session, such as second computing device 318-1-2, . . . , and $M^{th}$ computing device 318-1-M of first worker session 306a and second computing device 318-n-2, . . . , and $M^{th}$ computing device 318-n-M of $N_s^{th}$ worker session 306n, may each be an instance of session worker device 620. Session worker device 620 may include a fifth input interface 622, a fifth output interface 624, a fifth communication interface 626, a fifth computer-readable medium 628, a fifth processor 630, a model worker application 632, input classified data 124, and an input unclassified data subset 634.

In some implementations, a distributed solution allows applications of big data. For example, scalability is provided with a distributed solution. A copy of input classified data 124 may be sent to each computing device of worker system 306. Because input unclassified data 126 may need to be distributed across a plurality of computing devices, each session may include a plurality of computing devices with one of the computing devices acting as the session manager and referred to as session manager device 600. Input unclassified data 126 first may be distributed into data subsets at each computing device included in a respective session, with each session distributing input unclassified data 126 in a similar manner among its computing devices. For example, if first worker session 306a includes three computing devices, input unclassified data 126 is distributed to each computing device of first worker session 306a that may or may not include a first session manager device 600a of first worker session 306a. $N_s^{th}$ worker session 306n similarly distributes input unclassified data 126 among the computing devices of nth worker session 306n.

Evaluation list 514, model data 516, and selected model data 518 are created from results generated by worker system 306 executing model manager application 612 with input classified data 124 and input unclassified data subset 634. Model manager application 612 may coordinate generation of the classification model using model worker application 632 executing at the one or more session worker devices 620 assigned to the session with input classified data 124 and their allocated subset of input unclassified data 126 designated as input unclassified data subset 634. Session manager device 600 may or may not include input classified data 124 and a portion of input unclassified data 126 divided into input unclassified data subset 614. For example, session manager device 600 may coordinate the distribution of input unclassified data 126 with or without storing a portion of input unclassified data 126 on fourth computer-readable medium 608.

Referring again to FIG. 4, each user device 400 of user system 302 may include the same or different components and combination of components. Fewer, different, and additional components may be incorporated into user device 400. Second input interface 402 provides the same or similar functionality as that described with reference to input interface 102 of classification device 100 though referring to user device 400. Second output interface 404 provides the same or similar functionality as that described with reference to output interface 104 of classification device 100 though referring to user device 400. Second communication interface 406 provides the same or similar functionality as that described with reference to communication interface 106 of classification device 100 though referring to user device 400. Data and messages may be transferred between selection manager device 304 and user device 400 using second communication interface 406. Second computer-readable medium 408 provides the same or similar functionality as that described with reference to computer-readable medium 108 of classification device 100 though referring to user device 400. Second processor 410 provides the same or similar functionality as that described with reference to processor 110 of classification device 100 though referring to user device 400

Classification model tuning application 422 performs operations associated with selecting a hyperparameter configuration for a classification model where the hyperparameter configuration defines a value for each hyperparameter used to train the classification model. The operations may be implemented using hardware, firmware, software, or any combination of these methods. Referring to the example embodiment of FIG. 4, classification model tuning application 422 is implemented in software (comprised of computer-readable and/or computer-executable instructions) stored in second computer-readable medium 408 and accessible by second processor 410 for execution of the instructions that embody the operations of classification model tuning application 422. Classification model tuning application 422 may be written using one or more programming languages, assembly languages, scripting languages, etc. Classification model tuning application 422 may be implemented as a Web application.

Referring again to FIG. 5, fewer, different, or additional components may be incorporated into selection manager device 304. Third input interface 502 provides the same or similar functionality as that described with reference to input interface 102 of classification device 100 though referring to selection manager device 304. Third output interface 504 provides the same or similar functionality as that described with reference to output interface 104 of classification device 100 though referring to selection manager device 304. Third communication interface 506 provides the same or similar functionality as that described with reference to communication interface 106 of classification device 100 though referring to selection manager device 304. Data and messages may be transferred between selection manager device 304 and/or user device 400 and session manager device 600 using third communication interface 506. Third computer-readable medium 508 provides the same or similar functionality as that described with reference to computer-readable medium 108 of classification device 100 though referring to selection manager device 304. Third processor 510 provides the same or similar functionality as that described with reference to processor 110 of classification device 100 though referring to selection manager device 304.

Selection manager application 512 performs operations associated with selecting sets of hyperparameter configurations to evaluate based on inputs provided by user device 400. Selection manager application 512 requests that the computing devices of worker system 306 generate a trained classification model for each hyperparameter configuration in the selected sets of hyperparameter configurations. The operations may be implemented using hardware, firmware, software, or any combination of these methods. Referring to the example embodiment of FIG. 5, selection manager application 512 is implemented in software (comprised of computer-readable and/or computer-executable instructions) stored in third computer-readable medium 508 and accessible by third processor 510 for execution of the instructions that embody the operations of selection manager application 512. Selection manager application 512 may be written using one or more programming languages, assembly languages, scripting languages, etc. Selection manager application 512 may be implemented as a Web application.

Referring again to FIG. 6A, fewer, different, and additional components may be incorporated into session manager device 600. Each session manager device 600 of each session of worker system 306 may include the same or different components or combination of components.

Fourth input interface 602 provides the same or similar functionality as that described with reference to input interface 102 of classification device 100 though referring to session manager device 600. Fourth output interface 604 provides the same or similar functionality as that described with reference to output interface 104 of classification device 100 though referring to session manager device 600. Fourth communication interface 606 provides the same or similar functionality as that described with reference to communication interface 106 of classification device 100 though referring to session manager device 600. Data and messages may be transferred between session manager device 600 and session worker device 620 using fourth communication interface 606. Fourth computer-readable medium 608 provides the same or similar functionality as that described with reference to computer-readable medium 108 of classification device 100 though referring to session manager device 600. Fourth processor 610 provides the same or similar functionality as that described with reference to processor 110 of classification device 100 though referring to session manager device 600.

Referring again to FIG. 6B, fewer, different, and additional components may be incorporated into session worker device 620. Each session worker device 620 of each session of worker system 306 may include the same or different components or combination of components.

Fifth input interface 622 provides the same or similar functionality as that described with reference to input interface 102 of classification device 100 though referring to session worker device 620. Fifth output interface 624 provides the same or similar functionality as that described with reference to output interface 104 of classification device 100 though referring to session worker device 620. Fifth communication interface 626 provides the same or similar functionality as that described with reference to communication interface 106 of classification device 100 though referring to session worker device 620. Data and messages may be transferred between session manager device 600 and session worker device 620 using fifth communication interface 626. Fifth computer-readable medium 628 provides the same or similar functionality as that described with reference to computer-readable medium 108 of classification device 100 though referring to session worker device 620. Fifth processor 630 provides the same or similar functionality as that described with reference to processor 110 of classification device 100 though referring to session worker device 620.

Model worker application 632 may be integrated with other analytic tools and may be integrated with model manager application 612 to generate a classification model using input classified data 124 and input unclassified data 126 distributed across the worker computing devices of each session. Classification model tuning application 422, selection manager application 512, model manager application 612, and/or model worker application 632 may be the same or different applications that are integrated in various manners to select a hyperparameter configuration for a classification model using input classified data 124 and input unclassified data 126 in a single computing device or a plurality of distributed computing devices. As an example, classification model tuning application 422, selection manager application 512, model manager application 612, and/or model worker application 632 may be integrated in a single computing device such as classification device 100. Classification model tuning application 422, selection manager application 512, model manager application 612, and/or model worker application 632 further may be part of an integrated data analytics software application and/or software architecture such as that offered by SAS Institute Inc. of Cary, N.C., USA. For example, classification model tuning application 422, selection manager application 512, model manager application 612, and/or model worker application 632 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, classification model tuning application 422, selection manager application 512, model manager application 612, and/or model worker application 632 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA. Data mining is applicable in a wide variety of industries.

Classification model tuning application 422, selection manager application 512, model manager application 612, and/or model worker application 632 may be used in a variety of industries. For example, a classification model trained using classification model tuning application 422, selection manager application 512, model manager application 612, and/or model worker application 632 may be used to recognize text, text meaning, a voice, speech, to recognize characteristics of images such as medical images, equipment diagnostic images, terrain images, etc., to recognize types of web pages, to predict whether or not an event has occurred, such as an equipment failure, to classify a microarray gene expression, etc. Classification model tuning application 422, selection manager application 512, model manager application 612, and/or model worker application 632 may automatically process data generated as part of operation of an enterprise, facility, system, device, etc., to classify the data and possibly provide a warning or alert associated with the classification using, for example, second input interface 402, second output interface 404, and/or second communication interface 406 so that appropriate action can be initiated in response to the labeling, recognition, or classification. For example, medical images that include a tumor may be recognized in input unclassified data 126 that triggers the sending of a notification message to a clinician that a tumor has been identified based on a "tumor" label determined for the image data.

Figure 7:
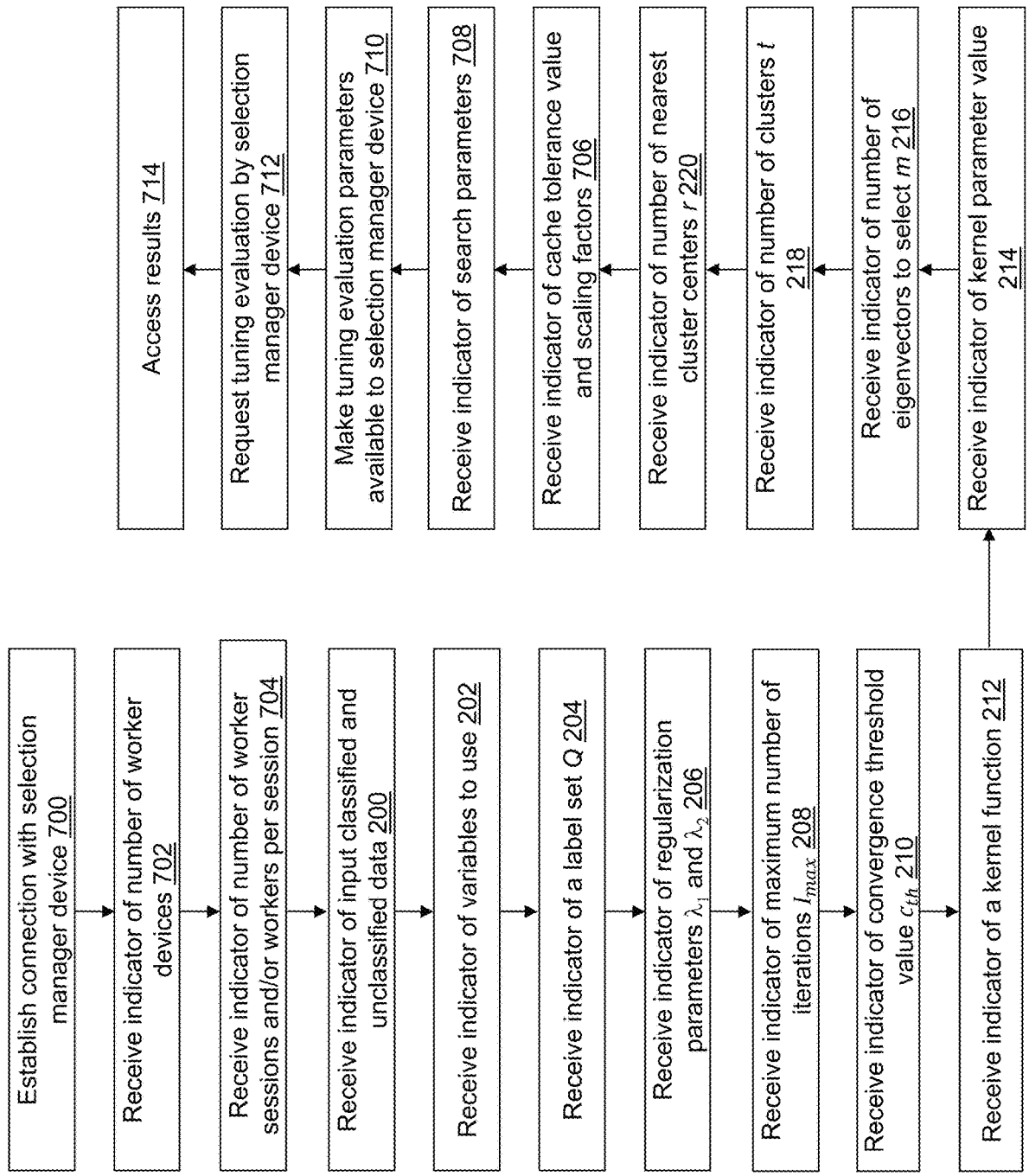
FIG. 7 depicts a flow diagram illustrating examples of operations performed by the user device of FIG. 4 in accordance with an illustrative embodiment.

Referring to FIG. 7, example operations associated with classification model tuning application 422 are described. Additional, fewer, or different operations may be performed depending on the embodiment. The order of presentation of the operations of FIG. 7 is not intended to be limiting. A user can interact with one or more user interface windows presented to the user in display 416 under control of classification model tuning application 422 independently or through a browser application in an order selectable by the user. Although some of the operational flows are presented in sequence, the various operations may be performed in various repetitions, concurrently, and/or in other orders than those that are illustrated. For example, a user may execute classification model tuning application 422, which causes presentation of a first user interface window, which may include a plurality of menus and selectors such as drop-down menus, buttons, text boxes, hyperlinks, etc. associated with classification model tuning application 422 as understood by a person of skill in the art.

In an operation 700, a connection is established with selection manager device 304. User device 400 accepts commands from a user and relays necessary instructions to selection manager device 304.

In an operation 702, a twelfth indicator may be received that indicates a value of $N_w$ the number of computing devices or nodes of worker system 306 that may include selection manager device 304 (for example, the same or another indicator may indicate whether or not to include selection manager device 304 or it may or may not be included by default). The twelfth indicator may further indicate whether selection manager device 304 is configured in a single-machine mode or a distributed mode. In an alternative embodiment, the twelfth indicator may not be received. For example, a default value may be stored, for example, in computer-readable medium 408 and used automatically. In another alternative embodiment, $N_w$ may not be selectable. Instead, a fixed, predefined value may be used. The value further may be automatically determined based on a number of computing devices connected to selection manager device 304.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on selection manager device 304. More simply, single-machine mode means multithreading on selection manager device 304. Single-machine mode uses the number of CPUs (cores) on selection manager device 304 to determine the number of concurrent threads. For example, one thread per core may be used though a number of threads on any computing device may be changed under control of the user. A grid host may be specified for a distributed mode and identify a domain name system (DNS) or IP address of selection manager device 304, when selection manager device 304 is a separate device from user device 400.

In an operation 704, a thirteenth indicator may be received that indicates the value of $N_s$ the number of the one or more sessions and/or the value of M the number of computing devices included in each session. Within each session, each computing device of that session may also use multiple threads. In an alternative embodiment, the thirteenth indicator may not be received. For example, default values may be stored, for example, in computer-readable medium 608 and used automatically. In another alternative embodiment, M or $N_s$ may not be selectable. Instead, a fixed, predefined value may be used. The value(s) further may be automatically determined based on W and other criteria as described further below such that the user does not specify either or only one of $N_s$ the number of the one or more sessions and M the number of computing devices included in each session.

In an operation 706, a fourteenth indicator may be received that indicates input classified data 124 and input unclassified data 126. For example, the first indicator indicates a location and a name of input classified data 124 and input unclassified data 126. As an example, the first indicator may be received by classification model tuning application 422 after selection from a user interface window or after entry by a user into a user interface window.

Similar to classification device 100, user device 400 may request values to define the various input parameters/hyperparameters of operations 200 through 220. One or more values may be input for each hyperparameter such as the Gaussian bandwidth parameter s, the number of eigenvectors to select m, first regularization parameter $\lambda_1$, second regularization parameter $\lambda_2$, the number of clusters t, and the number of nearest cluster centers r. The one or more values for each hyperparameter may be used to search for optimum hyperparameter values by selection manager device 304. For example, one or more values for s may be received. Alternatively, one or more default values for s may be stored, for example, in second computer-readable medium 408 and used automatically. In another alternative embodiment, the one or more values of s may not be selectable. Instead, one or more fixed, predefined values may be used. The one or more values of s may be defined in various manners such as using a list of possible values or using a minimum s value, a maximum s value, and an s step value. For example, a list of s values may be defined that includes the minimum s value and each subsequent value adding the s step value up to and including the maximum s value.

In an operation 706, a fifteenth indicator may be received that defines a cache tolerance value and a scaling factor value for each hyperparameter. The cache tolerance value is used to determine when a subsequent hyperparameter configuration is "close enough" to a previously executed configuration to not repeat execution with the subsequent hyperparameter configuration. The scaling factor value for each hyperparameter is used to scale the hyperparameters relative to each other. In an alternative embodiment, the fifteenth indicator may not be received. For example, default value may be stored, for example, in second computer-readable medium 408 and used automatically. An illustrative default value for the cache tolerance value is 1.0e-9. An illustrative default value for the scaling factor value for each hyperparameter is one. In another alternative embodiment, the cache tolerance value and the scaling factor value for each hyperparameter may not be selectable. Instead, fixed, predefined values may be used.

In an operation 708, a sixteenth indicator may be received that defines values for one or more search parameters associated with a tuning search method. For example, a maximum number of configuration evaluations $n_b$, a population size $n_p$, a number of centers $n_c < n_p$, an initial step size value A, and/or a decrease criterion value $\beta \in (0,1)$, etc. may be defined by the sixteenth indicator. The tuning search method may be "LHS+GA/GSS" in which a Latin hypercube sampling (LHS) search method is used to generate a first set of hyperparameter configurations that are each executed to generate a cost function value. The cost function values and the hyperparameter configuration associated with each are used to initialize a genetic algorithm (GA). Each population of the GA search method may be enhanced with a "growth step" in which a genetic set search (GSS) search method is used to locally improve some of the more promising members of the GA population.

For illustration, the LHS search method generates uniform hyperparameter values across the range of each the one or more values of each hyperparameter and randomly combines them across hyperparameters. If the hyperparameter is continuous or discrete with more levels than a requested sample size, a uniform set of samples is taken across the hyperparameter range including a lower and an upper bound. If the hyperparameter is discrete with fewer levels than the requested sample size, each level is repeated an equal number of times across the set of hyperparameter configurations determined by the LHS search method. If a last set of hyperparameter configurations is less than the number of levels, the last set of values for the hyperparameter is uniformly sampled across the set of levels given the remaining set size. The samples for each hyperparameter are randomly shuffled so that the combination of hyperparameters is random—the first values for each hyperparameter are combined, followed by all the second values, etc. This LHS search method ensures that the lower and upper bounds of the hyperparameter tuning range are included, and for discrete hyperparameters with a number of levels less than the requested sample size, the levels are sampled evenly with the possible exception of the last set of values when the number of samples is not evenly divisible by the number of levels. Otherwise, with random selection from n bins, when the number of levels is much less than the requested sample size, the level values are likely to not be sampled uniformly.

For illustration, the GA search method defines a family of local search algorithms that seek optimal solutions to problems by applying the principles of natural selection and evolution. Members of a current generation that have passed a selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability.

For illustration, the GSS search method is designed for problems that have continuous variables and have the advantage that, in practice, they often require significantly fewer evaluations to converge than does a GA search method. Furthermore, a GSS search method can provide a measure of local optimality that is very useful in performing multimodal optimization. The GSS search method may add additional "growth steps" to the GA search method whenever the hyperparameter is a continuous variable. For example, a local search selection may include a small subset of hyperparameter values selected based on their fitness score and distance to other hyperparameter values and on pre-existing locally optimal hyperparameter values. A local search optimization may be applied such that the lower and upper bounds of the hyperparameter are modified to temporarily fix integer hyperparameters to their current setting. These additional growth steps may be performed each iteration to permit selected hyperparameter configurations of the population (based on diversity and fitness) to benefit from local optimization over the continuous variables.

In an operation 710, the tuning evaluation parameters that may include the parameters indicated in operations 702 through 708 and 200 through 220 are made available to selection manager device 304. For example, the values of any of the parameters that are not default values may be sent to selection manager device 304. As another option, a location of the values of any of the parameters that are not default values may be sent to selection manager device 304. As still another option, a location of the values of any of the parameters that are not default values may be provided to selection manager device 304 in a computer memory location that is known to selection manager device 304.

In an operation 712, a tuning evaluation to select hyperparameters is requested of selection manager device 304 using the tuning evaluation parameters.

In an operation 714, tuning evaluation results are accessed. For example, an indicator may be received that indicates that the tuning process is complete. For example, one or more output tables may be presented on second display 416 when the tuning process is complete. As another option, second display 416 may present a statement indicating that the tuning process is complete. The user can access the output tables in the specified location. For example, the user can select the hyperparameters included in a "Best Configuration" output table.

Figure 8A:
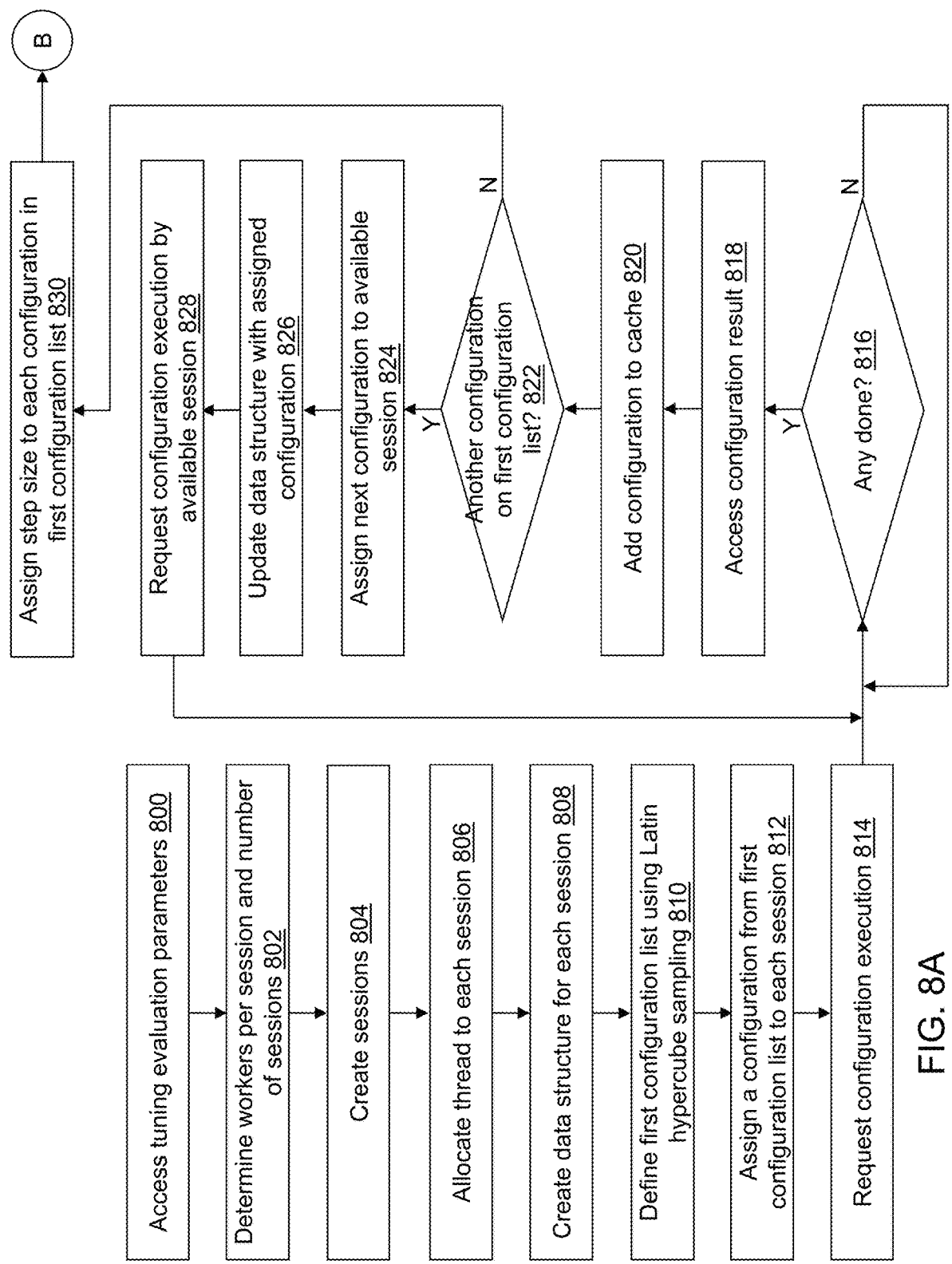
FIGS. 8A to 8C depict a flow diagram illustrating examples of operations performed by the selection manager device of FIG. 5 in accordance with an illustrative embodiment.
Figure 8B:
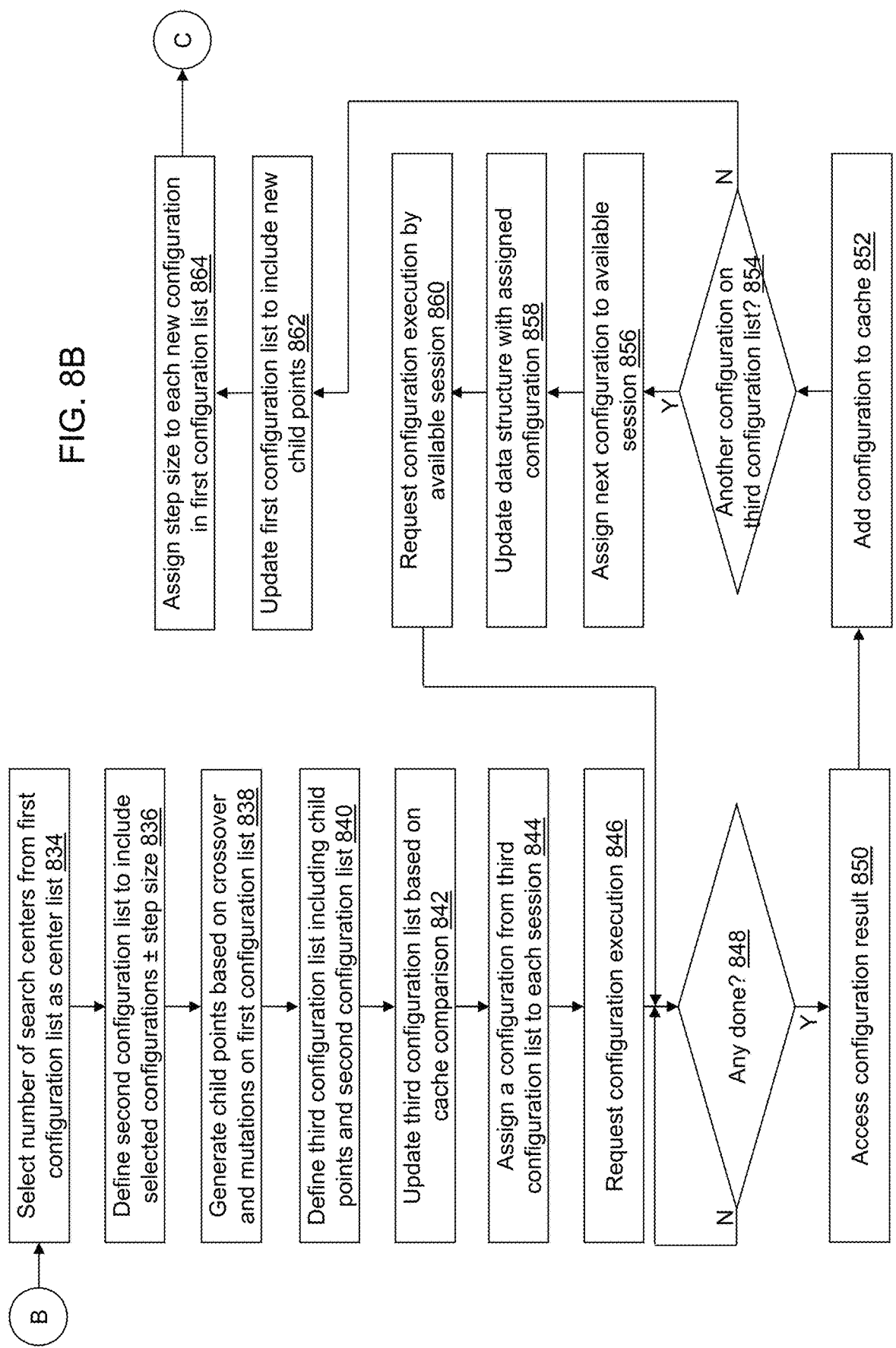
Figure 8C:
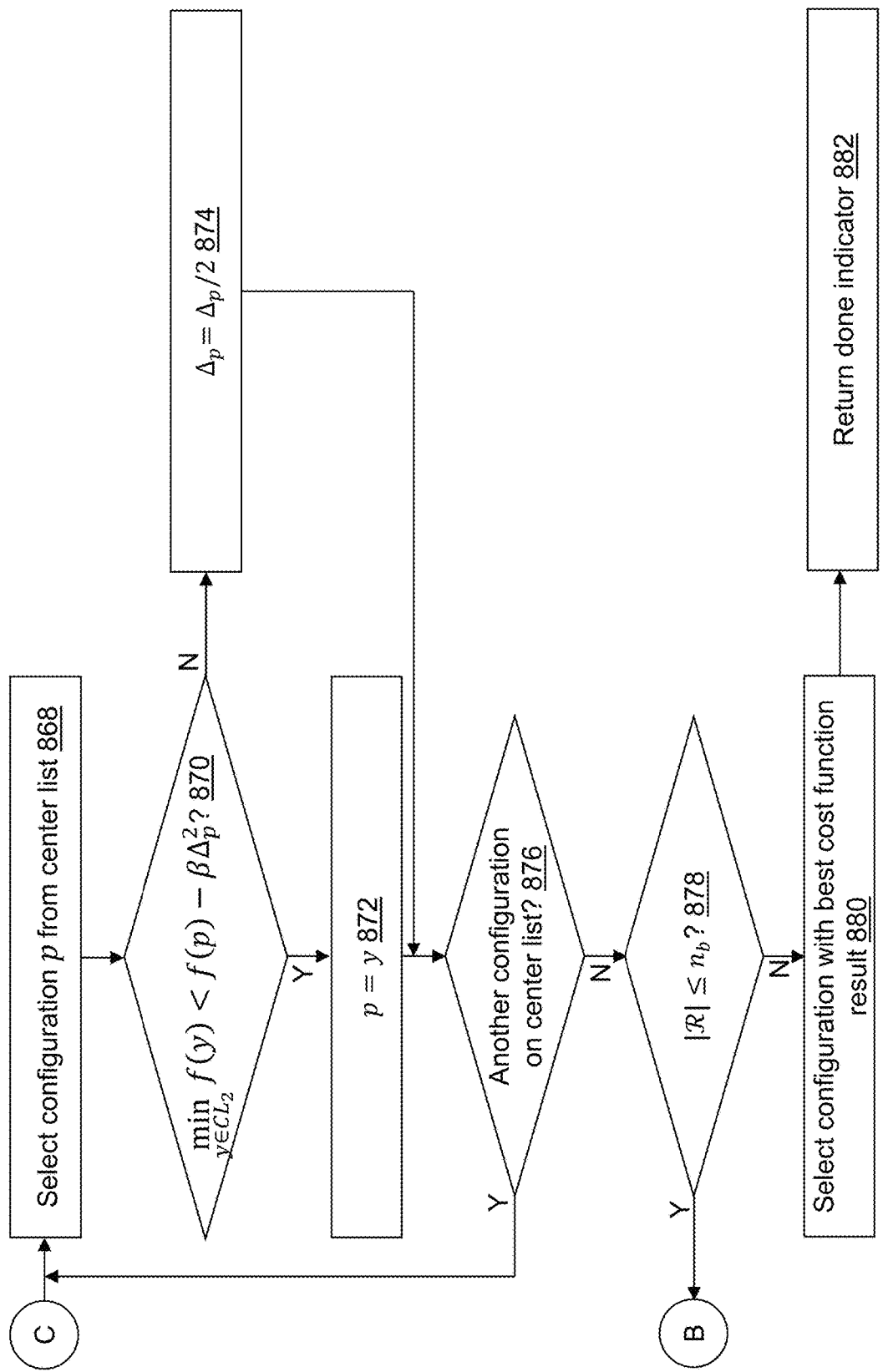

Referring to FIGS. 8A, 8B, and 8C, example operations associated with selection manager application 512 are described. Additional, fewer, or different operations may be performed depending on the embodiment. The order of presentation of the operations of FIGS. 8A, 8B, and 8C is not intended to be limiting. Selection manager device 304 establishes communication with the computing devices of worker system 306, sends instructions to each session manager device 600 associated with each session established by selection manager device 304, collects and aggregates the results of computations from each session, and communicates final results to user device 400. Selection manager device 304 may utilize itself as a worker computing device of worker system 306. The computing devices of worker system 306 receive instructions from selection manager device 304, store and process data, and send the results of computations back to selection manager device 304 under control of session manager device 600 associated with each session. The worker computing devices of each session may also communicate to each other directly to complete tasks.

In an operation 800, tuning evaluation parameters obtained by classification model tuning application 422 are accessed. For example, values for parameters indicated in operations 702 through 708 and 200 through 220 and made available to selection manager device 304 in operation 710 are accessed.

In an operation 802, the number of workers per session M and the number of sessions $N_s$ are determined. For example, when the second indicator specifies $N_s$, that value is used for the number of sessions, or when the second indicator specifies M, that value is used for the number of workers per session. If $N_w$ is equal to all of the workers that are connected to selection manager device 304 and there are at least 16 worker computing devices included in worker system 306, $N_s$ may be limited to eight so that the number of workers per session M is at least two.

Optionally, the thirteenth indicator may indicate that M is set based on a size of input classified data 124 and input unclassified data 126. For example, M may be set based on a number of rows r and a number of columns c of input classified data 124 and input unclassified data 126 and a distribution factor d. For illustration, M=1+rcd. An illustrative value of $d=2e^{-8}$ may be used so that another session worker device 620 is added to each session for every 50 million data values. The value of d may be selected by a user of user device 400. The number of columns c further may be the number of variables to use instead of a total number of columns. The number of rows r further may be the number of rows to include in input unclassified data 126.

$N_s$ may be determined as either one less than a population size specified for the GA tuning search method because one hyperparameter configuration is carried forward each iteration. The best point is carried forward so that if the next iteration does not find an improvement, the returned set of evaluations still includes the current best for consideration in generating the next iteration of hyperparameter configurations. For the GSS tuning search method, twice the number of hyperparameters is added to the value of N. For the LHS tuning search method, M is determined as one less than a sample size. $N_s$ may then be limited by a configuration of selection manager device 304. When selection manager device 304 is configured in single-machine mode and $N_s$ is greater than four and not specified by the thirteenth indicator, $N_s$ is limited to four. When selection manager device 304 is configured in single-machine mode and $N_s$ is specified by the thirteenth indicator, $N_s$ may be limited to 32 or a number of threads of selection manager device 304. When selection manager device 304 is configured in distributed mode, and $N_s$ is not specified by the thirteenth indicator, $N_s \leq N_w/M$ may be used. When selection manager device 304 is configured in distributed mode and M is specified by the thirteenth indicator, $N_s < 2N_w/M$ may be applied.

For illustration, if a population size specified for a GA search method is ten, even if $N_w=100$ and M=2 based on a size of input classified data 124 and input unclassified data 126, $N_s=10$ instead of $N_s=50$ because the GA population size (number of hyperparameter configurations created each iteration by the GA search method) limits the number of hyperparameter configurations created each iteration.

When $N_s$ is greater than one and M is equal to one, selection manager application 512 is executed in a model parallel mode; when M is greater than one and $N_s$ is equal to one, selection manager application 512 is executed in a data parallel mode; and when both M and $N_s$ are greater than one, selection manager application 512 is executed in a data and model parallel mode. In an automatic mode, $N_s$ may be selected to be as large as possible with M as small as possible subject to the size of input classified data 124 and input unclassified data 126 because model parallel is more efficient than data parallel.

In an operation 804, the number of sessions $N_s$ are created to include the number of workers per session M with session manager device 600 selected for each created session. Input unclassified data 126 is randomly allocated to each session to define input unclassified data subset 614 and/or input unclassified data subset 634. A copy of input classified data 124 is provided to each session as well.

In an operation 806, a thread is allocated from an available thread pool to each created session. The allocated threads each manage the communications between selection manager device 304 and each session manager device 600.

In an operation 808, a data structure is created for each session through which each session is notified of the hyperparameter values for the assigned hyperparameter configuration, etc. A hyperparameter configuration includes a value for each hyperparameter such as a value for each of the Gaussian bandwidth parameter s, the number of eigenvectors to select m, first regularization parameter $\lambda_1$, second regularization parameter $\lambda_2$, the number of clusters t, and the number of nearest cluster centers r. An illustrative data structure includes a thread identifier that links the data structure to each thread, a session handle for the thread, a parameter list, the hyperparameter configuration assigned to the thread, a completion indicator, etc. The session handle contains information about the session that was started in a new process to run actions.

In an operation 810, the first configuration list is defined using LHS and its associated parameters. The first configuration list includes a plurality of hyperparameter configurations where each hyperparameter configuration includes a value for each hyperparameter to evaluate $\{s, m, \lambda_1, \lambda_2, t, r\}$. A set of hyperparameter configurations includes a plurality of hyperparameter configurations selected for evaluation before a next set of hyperparameter configurations is selected for evaluation based on the tuning search method and the cost function values computed for each hyperparameter configuration.

In an operation 812, a single configuration is selected from the first configuration list and assigned to each created session by loading the values in the data structure associated with the selected session. Depending on the number of created sessions $N_s$ relative to the number of configurations included on the first configuration list, all of the configurations defined in the first configuration list may be assigned or less than all of the configurations may be assigned.

Figure 9:
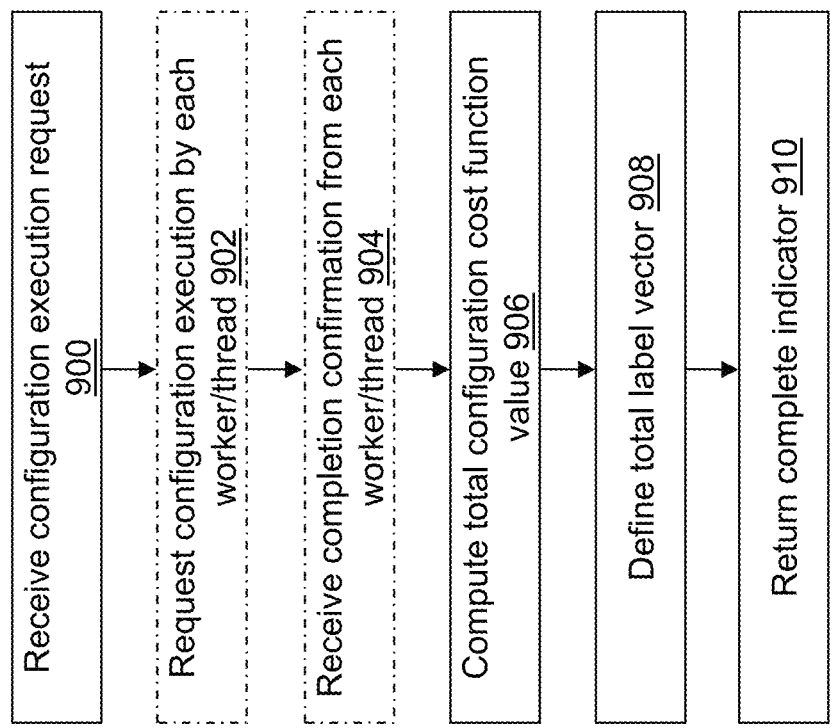
FIG. 9 depicts a flow diagram illustrating examples of operations performed by the session manager device of FIG. 6A in accordance with an illustrative embodiment.

In an operation 814, each session is requested to execute its assigned hyperparameter configuration based on the parameter values in the data structure. The handle to the session process stored in the data structure associated with the selected session may be used to make this request or call. FIG. 9 describes the operations performed by each session in response to the request configuration execution request.

In an operation 816, a determination is made concerning whether or not any execution is done. For example, session manager device 600 may set the completion indicator to indicate done in the data structure associated with it. If no execution is done, processing continues in operation 816 until indication that a session is done is received. If any execution is done, processing continues in an operation 818. For illustration, selection manager device 304 loops through each of its thread handles, checking to see if that particular thread is busy or free. When a session finishes evaluating its assigned hyperparameter configuration, session manager device 600 returns the computed values back to selection manager device 304 and sets its completion indicator indicating that it is free to receive a new hyperparameter configuration for evaluation.

In operation 818, results from the configuration execution are accessed in association with the set of hyperparameter values defined in the configuration assigned to the session that has completed its computations. For example, a cost function value C and label vector Y may be accessed using the data structure.

In an operation 820, the results including the cost function value and set of hyperparameter values defined for the assigned hyperparameter configuration may be stored in evaluation list 514. The cost function value and label vector Y may be stored in model data 516 in association with the set of hyperparameter values.

In an operation 822, a determination is made concerning whether or not the first configuration list includes another hyperparameter configuration to evaluate that has not been assigned to a session. If the first configuration list includes another hyperparameter configuration to evaluate, processing continues in an operation 824. If the first configuration list does not include another hyperparameter configuration to evaluate, processing continues in an operation 830.

In operation 824, a next hyperparameter configuration is selected from the first configuration list and assigned to the now free session.

In an operation 826, the data structure associated with the now free session is updated to include the next assigned hyperparameter configuration.

In an operation 828, a request is sent to session manager device 600 associated with the now free session to execute model manager application 612 with the hyperparameter configuration included in the data structure, and processing continues in operation 816 to continue to monitor for sessions that have completed their assigned hyperparameter configuration evaluation.

In operation 830, a step size is assigned to each configuration included in the first configuration list using the initial step size value A, and processing continues in an operation 834 shown referring to FIG. 8B.

In operation 834, a number of search centers n, is selected from the first configuration list to define a center list. Similar to the first configuration list, the center list includes a plurality of hyperparameter configurations where each hyperparameter configuration includes a value for each hyperparameter to evaluate such as $\{s, m, \lambda_1, \lambda_2, t, r\}$. The center list includes n, number of configurations randomly selected from first configuration list.

In an operation 836, a second configuration list is defined that includes $p+\Delta_p e_i$ and $p-\Delta_p e_i$, where p is each configuration on the center list, $\Delta_p$ is the step size value assigned to the $p^{th}$ configuration, and $e_i$ is a predefined decay parameter used in machine learning for optimization. An illustrative value for $e_i=0.95$ such that, as the iteration increases, the search step size becomes smaller to identify an optimal solution.

In an operation 838, child points are generated based on crossover and mutations of the configurations of the configurations on the first configuration list using the GA search method and its associated parameters and a cost function value computed from each configuration execution. For example, a paper by Koch et al., *Autotune: A Derivative-free Optimization Framework for Hyperparameter Tuning* KDD 2018 (Aug. 2, 2018) describes a process for generating child points. Each child point is a new configuration of hyperparameter values that includes a value for each hyperparameter to evaluate $\{s, m, \lambda_1, \lambda_2, t, r\}$.

In an operation 840, a third configuration list is defined that includes the configurations defined by the child points and included in the second configuration list.

In an operation 842, the third configuration list is updated based on a comparison of each hyperparameter configuration included in the third configuration list with each hyperparameter configuration included in evaluation list 514. For example, each hyperparameter configuration in the third configuration list is compared to previously evaluated hyperparameter configurations to determine if they are "close enough" to hyperparameter configuration values that have already been evaluated, where "close enough" is evaluated based on the cache tolerance value. If so, the hyperparameter configuration is removed from the first configuration list to avoid expending computing resources reevaluating a too similar hyperparameter configuration. The cost function value of the "close" point may be defined as the cost function value of the point removed from the first configuration list in evaluation list 514.

Similar to operation 812, in an operation 844, a single configuration is selected from the third configuration list and assigned to each created session by loading the values in the data structure associated with the selected session.

Similar to operation 814, in an operation 846, each session is requested to execute its assigned hyperparameter configuration based on the parameter values in the data structure. The handle to the session process stored in the data structure associated with the selected session may be used to make this request or call.

Similar to operation 816, in an operation 848, a determination is made concerning whether or not any execution is done. If no execution is done, processing continues in operation 848 until indication that a session is done is received. If any execution is done, processing continues in an operation 850.

Similar to operation 818, in operation 850, results including the cost function value and label vector Y computed from the hyperparameter configuration execution are accessed in association with the set of hyperparameter values defined in the configuration assigned to the session that has completed its computations.

Similar to operation 820, in an operation 852, the results including the cost function value and set of hyperparameter values defined for the assigned hyperparameter configuration may be stored in evaluation list 514. The cost function value and label vector Y may be stored in model data 516 in association with the set of hyperparameter values.

Similar to operation 822, in an operation 854, a determination is made concerning whether or not the third configuration list includes another hyperparameter configuration to evaluate that has not been assigned to a session. If the third configuration list includes another hyperparameter configuration to evaluate, processing continues in an operation 856. If the third configuration list does not include another hyperparameter configuration to evaluate, processing continues in an operation 862.

Similar to operation 824, in operation 856, a next hyperparameter configuration is selected from the third configuration list and assigned to the now free session.

Similar to operation 826, in operation 858, the data structure associated with the now free session is updated to include the next assigned hyperparameter configuration.

Similar to operation 828, in an operation 860, a request is sent to session manager device 600 associated with the now free session to execute model manager application 612 with the hyperparameter configuration included in the data structure, and processing continues in operation 848 to continue to monitor for sessions that have completed their assigned hyperparameter configuration evaluation.

In operation 862, child points are generated based on crossover and mutations of the configurations on the first configuration list using the GA/GSS search method and its associated parameters. The first configuration list is updated to include the generated child points.

Similar to operation 830, in an operation 864, a step size is assigned to each configuration included in the first configuration list using the initial step size value A, and processing continues in an operation 868 shown referring to FIG. 8C.

In operation 868, a hyperparameter configuration p is selected from the center list.

In an operation 870, a determination is made concerning whether $$\min_{y \in \mathcal{T}_p} f(y) < f(p) - \beta \Delta_p^2,$$

where y is a hyperparameter configuration selected from the second configuration list indicated by $\mathcal{T}_{p,p}$, and β is the decrease criterion value. If $$\min_{y \in \mathcal{T}_p} f(y) < f(p) - \beta \Delta_p^2,$$

processing continues in an operation 872. If $$\min_{y \in \mathcal{T}_p} f(y) \geq f(p) - \beta \Delta_p^2,$$

processing continues in an operation 874.

In operation 872, the pattern search about hyperparameter configuration p has been successful, and p=y such that the hyperparameter configuration p is replaced with hyperparameter configuration y in the center list.

In operation 874, the pattern search about hyperparameter configuration p was unsuccessful, and $\Delta_p = \Delta_p/2$ such that the step size for hyperparameter configuration p is reduced by half.

In an operation 876, a determination is made concerning whether or not the center list includes another hyperparameter configuration. If the center list includes another hyperparameter configuration, processing continues in operation 868. If the center list does not include another hyperparameter configuration, processing continues in an operation 878.

In operation 878, a determination is made concerning whether $|\mathcal{R}| \leq n_b$, where $|\mathcal{R}|$ indicates a number of hyperparameter configurations included on evaluation list 514, and $n_b$ is a number of hyperparameter configurations budgeted for processing. If $|\mathcal{R}| \leq n_b$, processing continues in operation 834 to process additional hyperparameter configurations. If $|\mathcal{R}| > n_b$, processing continues in an operation 880.

In operation 880, the hyperparameter configuration that resulted in the smallest cost function value is selected from evaluation list 514 and is indicated as an optimized hyperparameter configuration $\{s^o, m^o, \lambda_1^o, \lambda_2^o, t^o, r^o\}$ that may be stored in selected model data 518 or returned to user device 400 in some other manner. The optimized label vector $Y^o$ may be extracted from model data 516 based on identification of the label vector Y associated with the optimized hyperparameter configuration $\{s^o, m^o, \lambda_1^o, \lambda_2^o, t^o, r^o\}$ and stored in selected model data 518 or returned to user device 400 in some other manner.

The observation vectors in input classified data 124 and/or input unclassified data subset 614 and/or input unclassified data subset 634 may further be stored in selected model data 518 in association with a respective value for the target variable included in the optimized label vector $Y^o$. The optimized label vector $Y^o$ includes a label or class defined for each observation vector included in input unclassified data 126. $\{s^o, m^o, \lambda_1^o, \lambda_2^o, t^o, r^o\}$ are the selected hyperparameters for classifying input unclassified data subset 614 and/or input unclassified data subset 634.

In an alternative embodiment, the label vector Y may not be stored in association with each hyperparameter configuration. Instead, a session may be requested to execute with the optimized hyperparameter configuration $\{s^o, m^o, \lambda_1^o, \lambda_2^o, t^o, r^o\}$ and return or store its computed label vector Y as the optimized label vector $Y^o$.

In an operation 882, an indicator that processing is complete may be returned to user device 400.

Referring to FIG. 9, example operations associated with model manager application 612 that are performed by session manager device 600 in executing a hyperparameter configuration to compute the cost function value and label vector Y are described. Additional, fewer, or different operations may be performed depending on the embodiment. The order of presentation of the operations of FIG. 9 is not intended to be limiting.

In an operation 900, a request for execution is received from selection manager device 304. The data describing the process including the hyperparameter configuration assigned is accessed. For example, data in the data structure associated with the thread is accessed. Alternatively, the values may be included with the request or provided in other manners to the session. The request may be received as a result of execution of any of operations 814, 828, 846, or 860.

In an operation 902, each session worker device 620 associated with the respective session manager device 600 is requested to execute the assigned hyperparameter configuration based on the parameter values in the data structure and the observations stored in input classified data 124 and input unclassified data subset 634 distributed to each session worker device 620 of the respective session. As discussed above, session manager device 600 may also act as a session worker device 620 and execute the assigned hyperparameter configuration and the observations stored in input classified data 124 and input unclassified data subset 614.

In operation 904, results from the configuration execution at each session worker device 620 are received. For example, a cost function value $C_{sw}$ and a label vector $Y_{sw}$ may be received from each session worker device 620 that may include session manager device 600.

In an operation 906, a total cost function value is computed using $$C = \sum_{i=1}^{M} C_{sw,i}.$$

In an operation 908, each of the unclassified observation vectors in input unclassified data 126 is classified by concatenating each label vector $Y_{sw}$ received from session worker devices 620 to define label vector Y in the original order stored in input unclassified data 126.

In an operation 910, a completion indicator of the data structure is set to notify selection manager device 304 that processing of the hyperparameter configuration is complete. The total cost function value and/or defined label vector Y are made available to selection manager device 304, for example, by including them in the data structure and/or updating a globally accessible table.

Figure 10A:
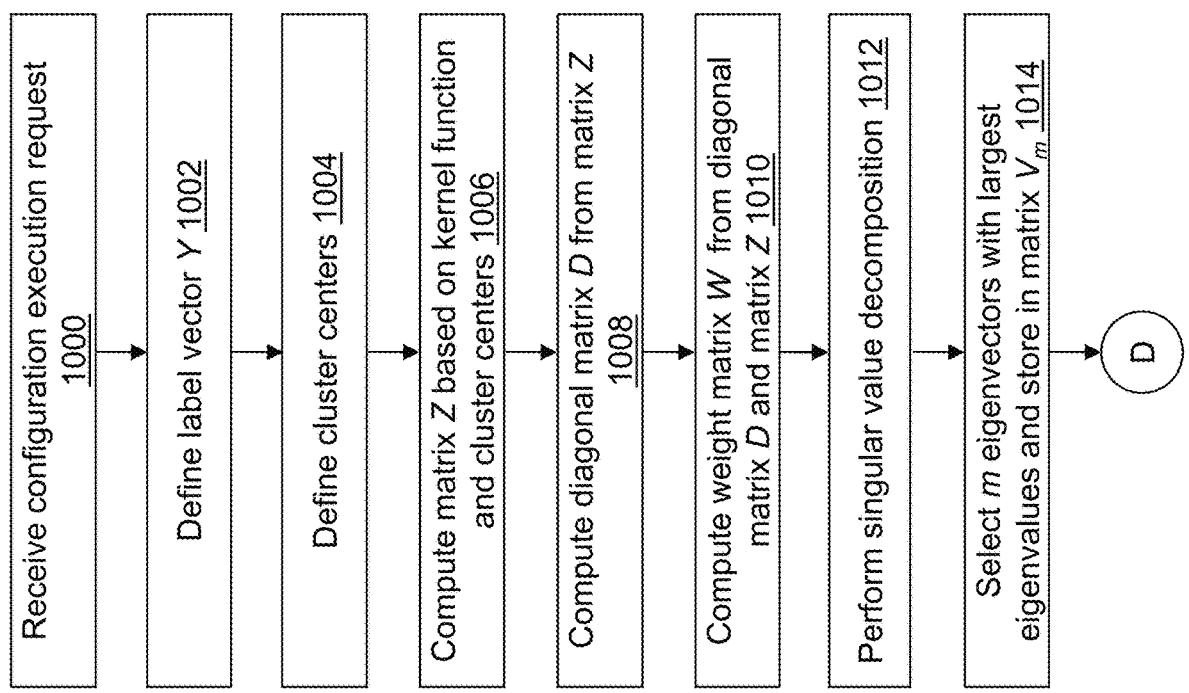
FIGS. 10A and 10B depict a flow diagram illustrating examples of operations performed by the session worker device of FIG. 6B in accordance with an illustrative embodiment.
Figure 10B:
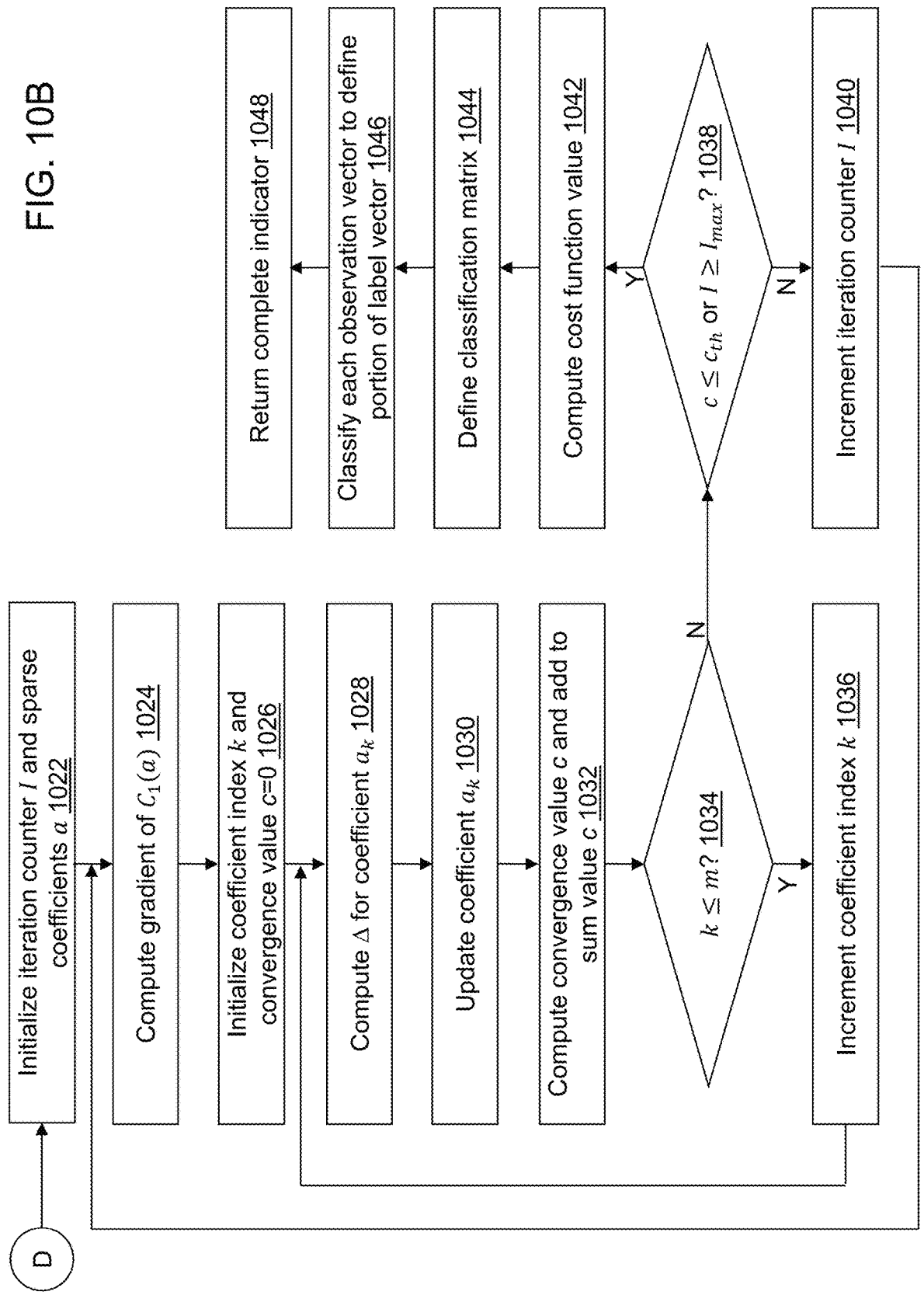

Referring to FIGS. 10A and 10B, example operations associated with model worker application 632 in executing a hyperparameter configuration to compute the cost function value $C_{sw}$ and label vector $Y_{sw}$ are described. Additional, fewer, or different operations may be performed depending on the embodiment. The order of presentation of the operations of FIGS. 10A and 10B is not intended to be limiting.

In an operation 1000, a request for execution is received from session manager device 600. The data describing the process including the hyperparameter configuration may be received with the request or accessed in another manner such as in a known memory location.

Similar to operation 222, in an operation 1002, label vector $Y_{sw}$ is defined from input classified data 124 and input unclassified data subset 614 or input unclassified data subset 634. Label vector $Y_{sw}$ is defined from input classified data 124 and input unclassified data subset 614 or input unclassified data subset 634. $Y_i$=k if $x_i$ is labeled as $y_i$=k. Otherwise, $Y_i$=0. As another option for binary data, $Y_i$=1 if $y_i$ indicates true; $Y_i$=−1 if $y_i$ indicates false; otherwise, $Y_i$=0.

Similar to operation 224, in an operation 1004, t cluster centers $\{u_1, u_2, \ldots, u_t\}$ are defined by executing a k-means clustering algorithm with input classified data 124 and input unclassified data subset 614 or input unclassified data subset 634. In alternative embodiments, different clustering algorithms may be used to define the t cluster centers.

Similar to operation 226, in an operation 1006, a matrix Z is computed using the t cluster centers, the kernel function, the kernel parameter value, and the number of nearest cluster centers r. For example, using the Gaussian kernel function, the matrix Z is computed using $$z_{ij} = \frac{\exp\left(\frac{-\|x_i - u_j\|^2}{2s^2}\right)}{\sum_{k \in N_r(i)} \exp\left(\frac{-\|x_i - u_k\|^2}{2s^2}\right)}, i = 1, 2, \ldots, n$$

and j=1, 2, . . . , t,
where $N_r(i)$ is an index to the number of nearest cluster centers r to $x_i$, s is the kernel parameter value, $x_i$ is an $i^{th}$ observation vector selected from input classified data 124 and input unclassified data subset 614 or input unclassified data subset 634, $u_1$ is a $j^{th}$ cluster center selected from the t cluster centers $\{u_1, u_2, \ldots, u_t\}$, and matrix Z is an n×t matrix.

Similar to operation 228, in an operation 1008, a diagonal matrix D is computed based on the matrix Z. For example, the diagonal matrix D is a t×t matrix and is defined as $$D_{jj} = \sum_{i=1}^{N} z_{ij}, j = 1, 2, \ldots, t$$

and $D_{ij}$=0 if i≠j.

Similar to operation 230, in an operation 1010, a weight matrix W is computed using diagonal matrix D and the matrix Z as W=ZD$^{-0.5}$D$^{-0.5}$Z$^\top$, where W=$\hat{Z}\hat{Z}^\top$.

Similar to operation 232, in an operation 1012, a singular value decomposition is applied to $\hat{Z}^\top \hat{Z}$ to obtain Z=VΣU$^\top$.

Similar to operation 234, in an operation 1014, m eigenvectors having the largest eigenvalues are selected from the singular value decomposition V and stored in a matrix $V_m$, and processing continues in an operation 1022.

Referring to FIG. 10B, similar to operation 238, in operation 1022, sparse coefficients a are each initialized, for example, to zero values, where a is an m×1 vector, and an iteration counter I is initialized, for example, as I=1.

Similar to operation 240, in an operation 1024, a gradient of $C_1(a)$ is computed with respect to the plurality of sparse coefficients a.

Similar to operation 242, in an operation 1026, a coefficient index k is initialized, for example, as k=1, and a convergence value c is initialized, for example, as c=0.

Similar to operation 244, in an operation 1028, a difference value $\Delta_k$ is computed for coefficient $a_k$ using $$\Delta_k = a_k - \frac{\nabla_{a_k}(c_1(a_k))}{\|V_m\|_s^2},$$

where $\|V_m\|_s$ is a spectral norm of the matrix $V_m$.

Similar to operation 246, in an operation 1030, coefficient $a_k$ is updated, for example, using $$a_k = \max\left\{|\Delta_k| - \frac{\lambda_1}{\|V_m\|_s}, 0\right\}.$$

Similar to operation 248, in an operation 1032, a convergence value c is computed, for example, using $c=c+a_k-a_k'$, where $a_k'$ is a value of $a_k'$ prior to the update in operation 246. The convergence value c is a sum of a difference between the current $a_k$ and the previous $a_k$ for each coefficient of the sparse coefficients.

Similar to operation 250, in an operation 1034, a determination is made concerning whether there is another coefficient of the sparse coefficients to update, for example, using k≤m. If k≤m, processing continues in an operation 1036. If k>m, processing continues in an operation 1038.

Similar to operation 252, in operation 1036, the coefficient index k is incremented, for example, as k=k+1, and processing continues in operation 1028 to process the next coefficient.

Similar to operation 254, in an operation 1038, a determination is made concerning whether convergence has been achieved or the maximum number of iterations have been performed. If $c<c_{th}$ or $I>I_{max}$, processing continues in an operation 1040. If $c>c_{th}$ and $I<I_{max}$, processing continues in an operation 1042.

Similar to operation 256, in operation 1040, the iteration counter I is incremented, for example, as I=I+1, and processing continues in operation 1024.

In operation 1042, a cost function value is computed using $$C_{sw} = 0.5\|V_m a - Y\|_2^2 + \lambda_1 \sum_{i=1}^{m} \sum_{ii}^{\frac{1}{2}} |a_i| + \lambda_2 \left(\sum_{i=1}^{m} \sum_{ii}^{\frac{1}{2}} a_i\right)^2.$$

Similar to operation 258, in an operation 1044, a classification matrix F is defined, for example, using $F=V_m a$, where classification matrix F is an n×1 vector for a binary label set or an n×c matrix for a label set having c classes.

Similar to operation 260, in an operation 1046, each of the unclassified observation vectors in input unclassified data subset 614 or input unclassified data subset 634 is classified. For example, for a binary label set, if $F_i>0$, the $y_{sw,i}$-variable (target) value or class of the $i^{th}$ observation vector of input unclassified data subset 614 or input unclassified data subset 634 is predicted to be 1; whereas, if $F_i\leq 0$, the $y_{sw,i}$-variable (target) value or class of the $i^{th}$ observation vector of input unclassified data subset 614 or input unclassified data subset 634 is predicted to be −1. For a label set having c classes, $y_{sw,i}$ is selected for each observation vector $x_i$ based on $$y_{sw,i} = \underset{j\leq c}{\mathrm{argmax}} F_{ij}.$$

As a result, a label with a highest classification value as indicated by $$\underset{j\leq c}{\mathrm{argmax}} F_{ij}$$

is selected as the $y_{sw,i}$-variable (target) value or class for the $i^{th}$ observation vector $x_i$ of input unclassified data subset 614 or input unclassified data subset 634. The classification or label for each observation vector $x_i$ of input unclassified data subset 614 or input unclassified data subset 634 may be extracted from label set Q using the value of $y_{sw,i}$ as an index into label set Q and label vector $Y_{sw}$ may be updated with these values.

In an operation 1048, a completion indicator is sent to session manager device 600 that processing of the hyperparameter configuration on input unclassified data subset 614 or input unclassified data subset 634 is complete. The cost function value $C_{sw}$ and/or updated label vector $Y_{sw}$ are returned or otherwise made available to session manager device 600, for example, by updating a table accessible by session manager device 600.

Distributed classification system 300 predicts the label/class, target variable y, for unclassified observation vectors in input unclassified data subset 614 and/or input unclassified data subset 634, where unclassified observation vectors were not labeled by an expert process or a human while determining the optimum values for the hyperparameters. Distributed classification system 300 supports improved classification accuracy performance in a faster manner using the plurality of worker computing devices of worker system 306 that perform operations on their portion of input unclassified data subset 614 or input unclassified data subset 634. Input classified data 124 is used at all of the computing devices of worker system 306. Selection manager device 304 controls the execution using different values of the hyperparameters by the plurality of worker computing devices of worker system 306. Distributed classification system 300 can be applied to computer vision, machine learning, pattern recognition, etc. In the application of medical imaging diagnosis, there may be a large number of unlabeled medical images that are distributed due to their geographic locations.

Supervised learning requires that the target (dependent) variable y be classified or labeled in training data so that a model can be built to predict the class of new unclassified data. Currently, supervised learning systems discard observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset of sufficient size to develop an accurate predictive model. Distributed classification system 300 solves this problem by providing a cost effective, accurate, and fast process for classifying unclassified data while improving the accuracy of the classification by identifying optimum values for the hyperparameters. The now classified observations of input unclassified data subset 614 and/or input unclassified data subset 634 provide observation vectors for training a predictive model that previously would have been discarded resulting in improved models and more accurate predictions as shown in the results presented below.

Experimental results were generated using the operations of classification application 122 with a 2-dimensional (2-D) synthetic two moon dataset. Worker system 306 included 139 machines where each machine used 32 threads. Input unclassified data 126 included 1500 observation vectors shown in FIG. 11A with their correct labels. The circles show the observation vectors in class 1. The triangles show the observation vectors in class 2.

Input classified data 124 included 20 classified observation vectors where 5 of the 20 classified observation vectors were noisy meaning the classification was incorrect. Input classified data 124 is shown in FIG. 11B where the observation vectors 1100 were the noisy observation vectors that were deliberately classified incorrectly. As a result, the noise level was 25 percent.

Figure 11A:
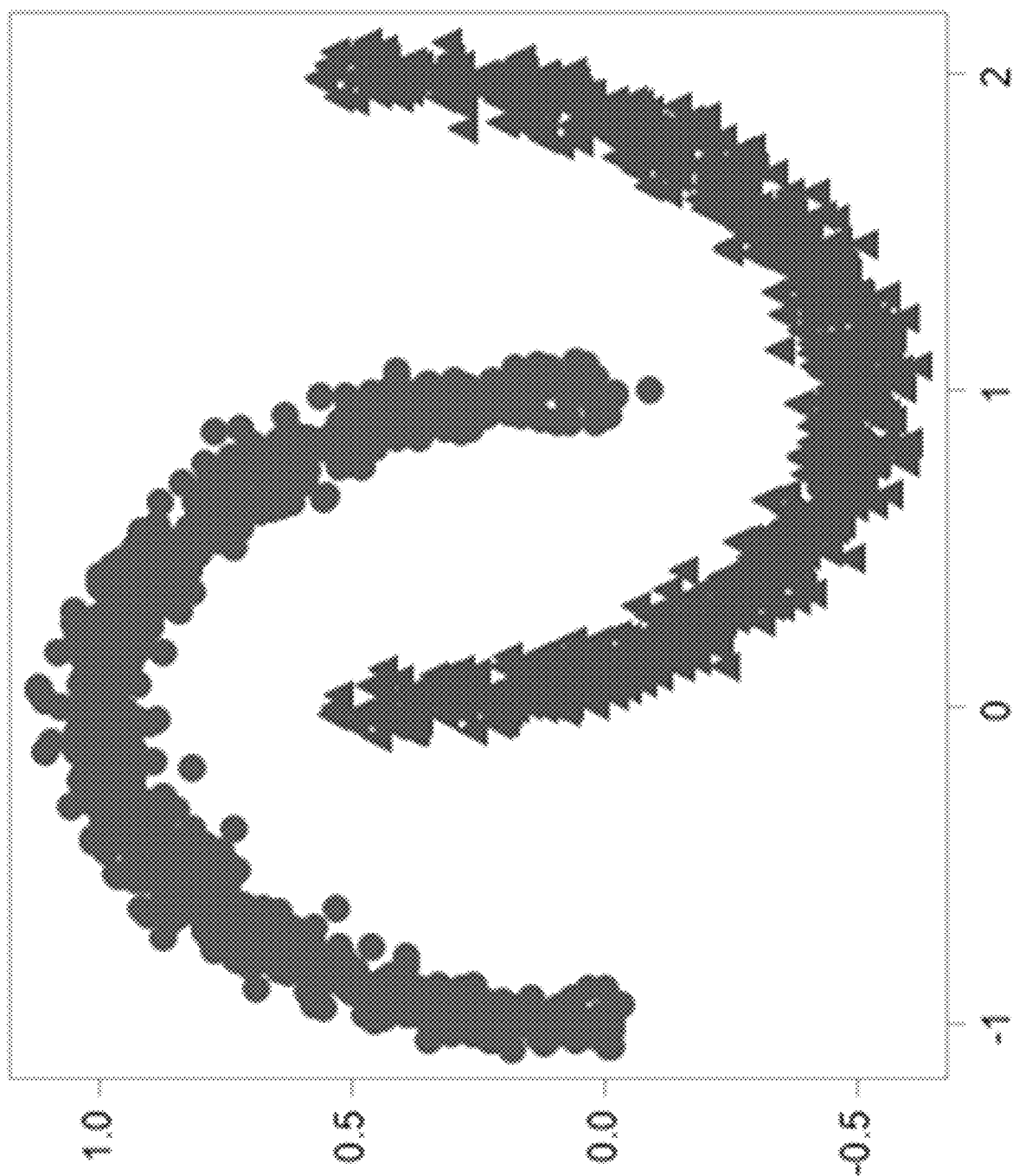
FIG. 11A shows input unclassified data in accordance with an illustrative embodiment.
Figure 11B:
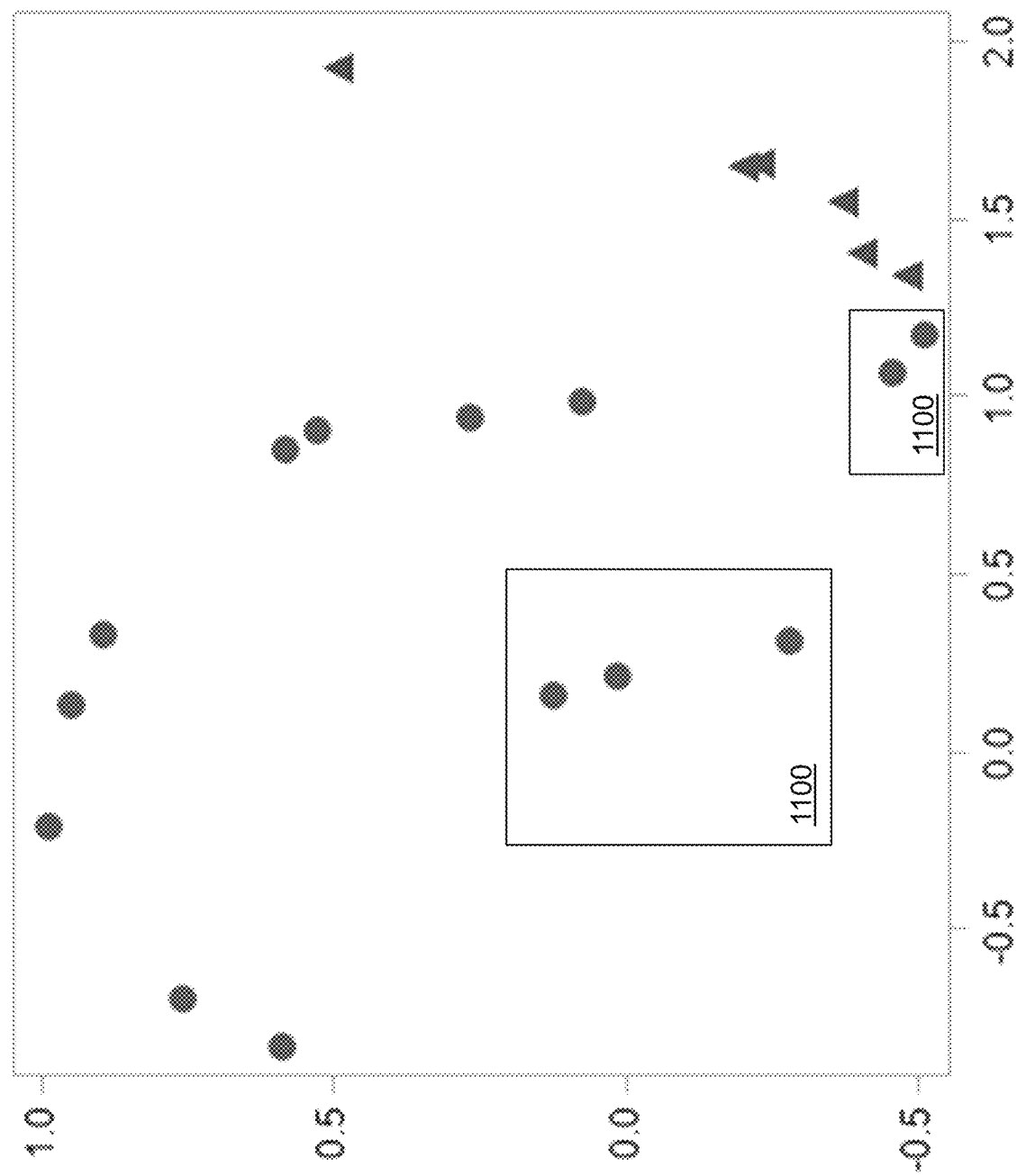
FIG. 11B shows input noisy classified data in accordance with an illustrative embodiment.
Figure 11C:
FIG. 11C shows a classification computed by a first existing classification system with input unclassified data 126 of FIG. 11A and with the input noisy classified data of FIG. 11B in accordance with an illustrative embodiment.

Referring to FIG. 11C, a classification computed by a first existing classification system with input unclassified data 126 described by FIG. 11A and with the input noisy classified data of FIG. 11B is shown in accordance with an illustrative embodiment. The first existing classification system uses the method described in Zhou et al., *Learning with Local and Global Consistency*, Proceedings of the 16th International Conference on Neural Information Processing Systems, 321-328 (2003). Red triangles show the correctly classified observation vectors assigned to class 1; blue squares show the correctly classified observation vectors assigned to class 2; and green squares show the incorrectly classified observation vectors.

Figure 11D:
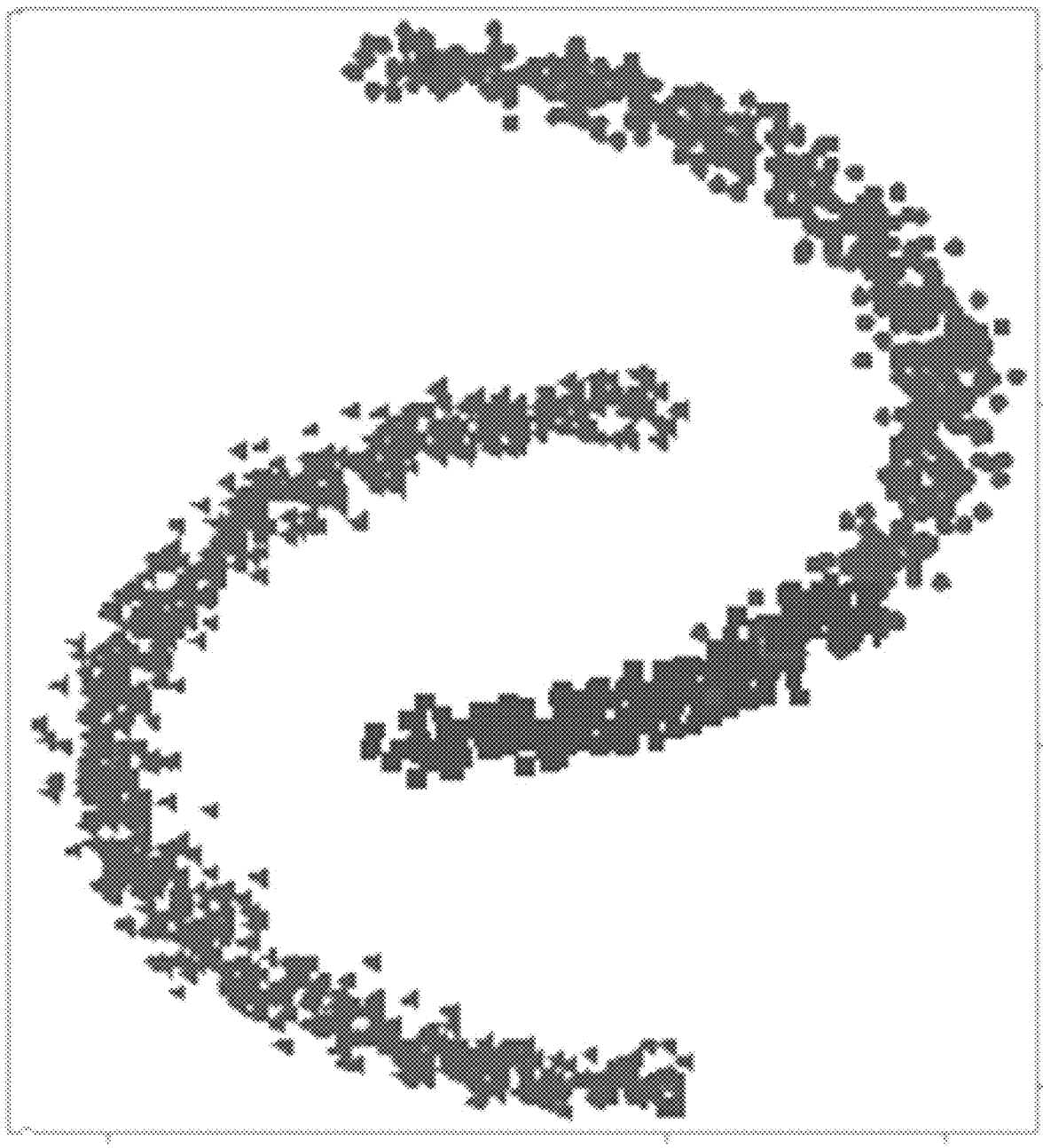
FIG. 11D shows a classification computed by a second existing classification system with input unclassified data 126 of FIG. 11A and with the input noisy classified data of FIG. 11B in accordance with an illustrative embodiment.

Referring to FIG. 11D, a classification computed by a second existing classification system with input unclassified data 126 described by FIG. 11A and with the input noisy classified data of FIG. 11B is shown in accordance with an illustrative embodiment. The second existing classification system applies an $L_1$-norm formulation of Laplacian regularization based on a manifold structure of the data for noise reduction of the noisy labeled data. The second existing classification system uses the method described in Lu et al., *Noise-Robust Semi-Supervised Learning by Large-Scale Sparse Coding*, AAAI Conference on Artificial Intelligence (2015). Red triangles show the correctly classified observation vectors assigned to class 1; blue squares show the correctly classified observation vectors assigned to class 2; and green squares show the incorrectly classified observation vectors.

Figure 11E:
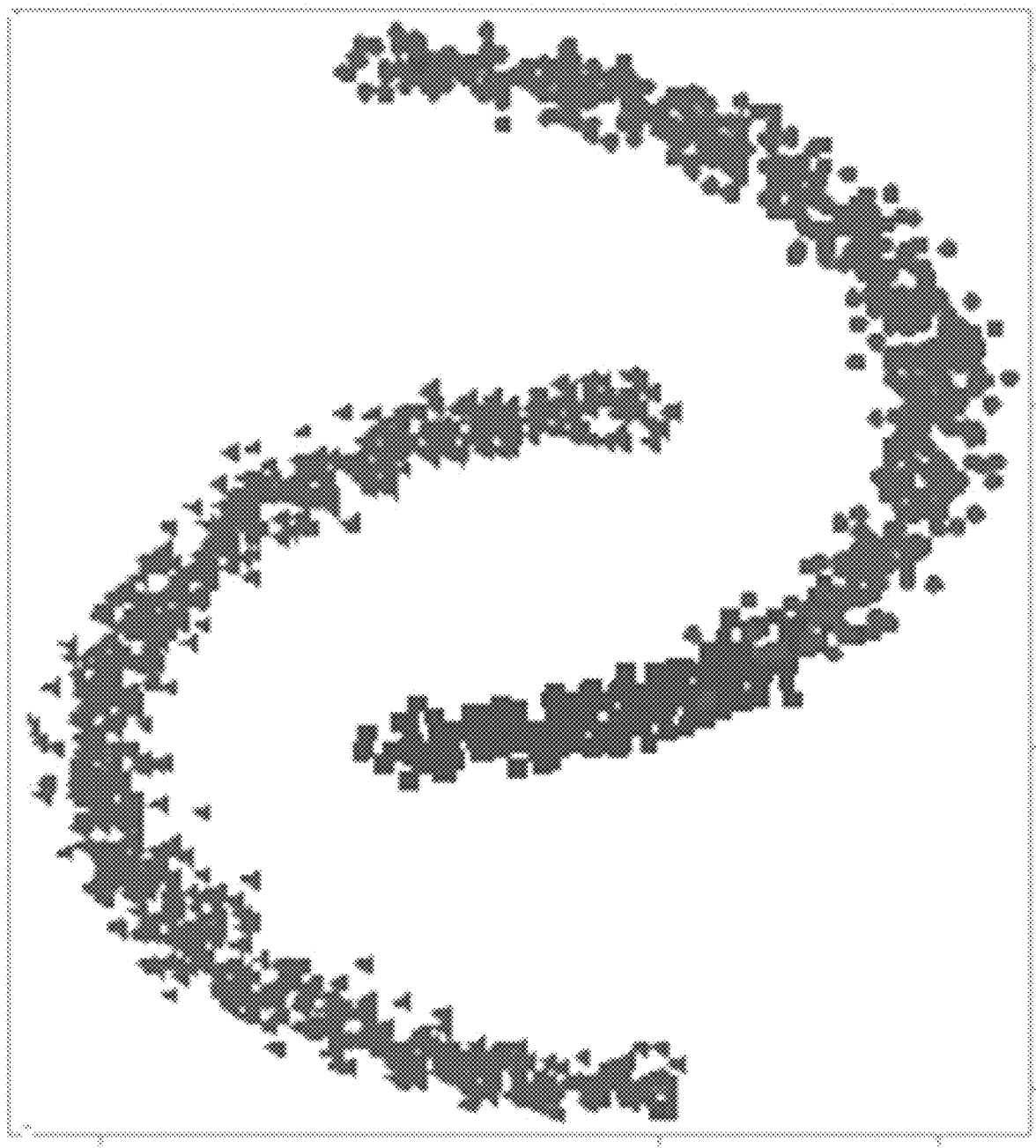
FIG. 11E shows a classification computed by the classification system of FIG. 1 with input unclassified data 126 of FIG. 11A and with the input noisy classified data of FIG. 11B in accordance with an illustrative embodiment.

Referring to FIG. 11E, a classification computed by classification device 100 with input unclassified data 126 described by FIG. 11A and with the input noisy classified data of FIG. 11B is shown in accordance with an illustrative embodiment. The Gaussian kernel function was used, $I_{max}=200$, $c_{th}=0.1$, the Gaussian bandwidth parameter $s=20$, the number of eigenvectors to select $m=0.1n$, first regularization parameter $\lambda_1=0.7$, second regularization parameter $\lambda_2=0.5$, the number of clusters $t=50$, and the number of nearest cluster centers $r=6$. Red triangles show the correctly classified observation vectors assigned to class 1; blue squares show the correctly classified observation vectors assigned to class 2; and green squares show the incorrectly classified observation vectors.

Figure 11F:
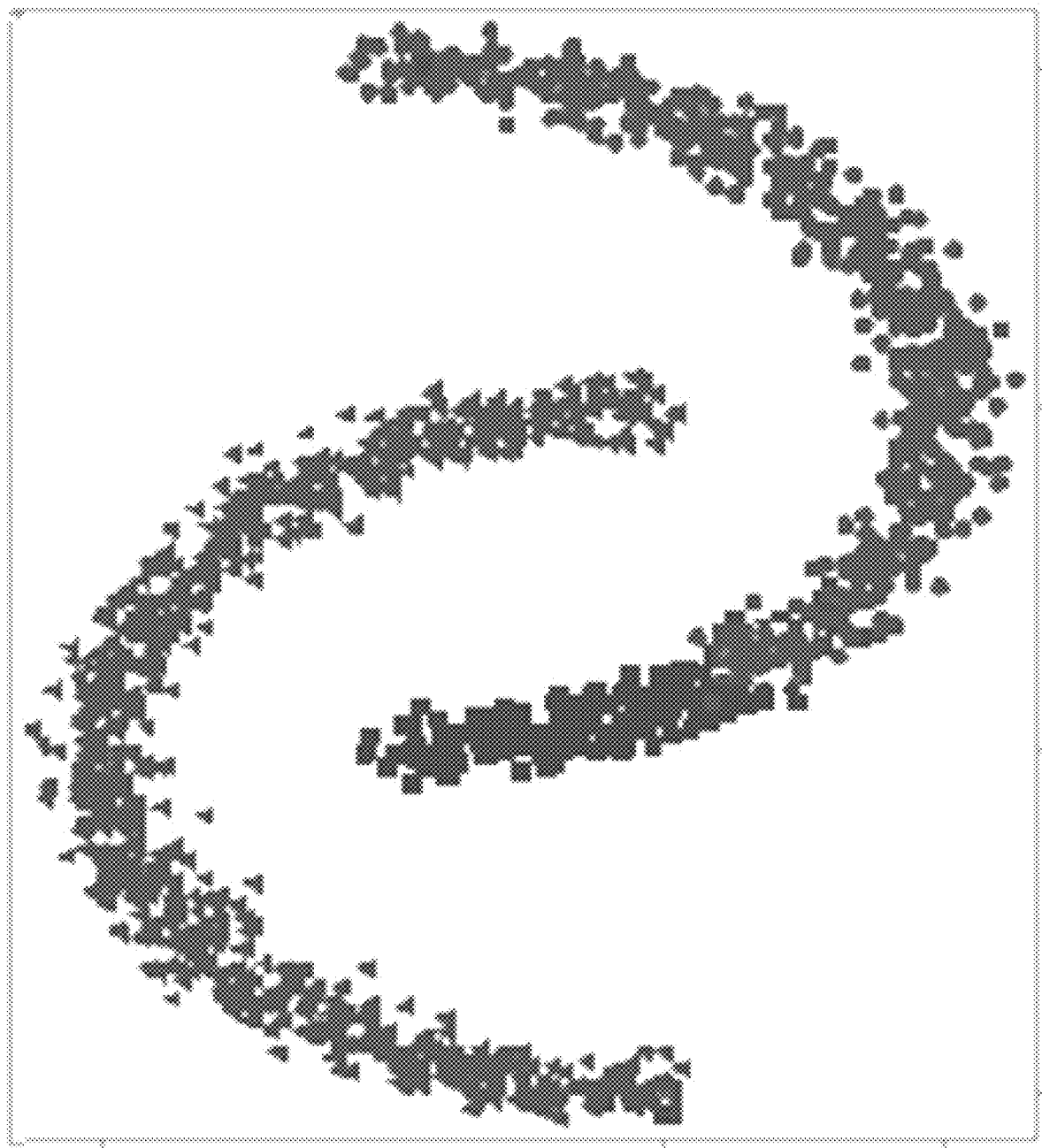
FIG. 11F shows a classification computed by the classification system of FIG. 3 with input unclassified data 126 of FIG. 11A and with the input noisy classified data of FIG. 11B in accordance with an illustrative embodiment.

Referring to FIG. 11F, a classification computed by classification system 300 with input unclassified data 126 described by FIG. 11A and with the input noisy classified data of FIG. 11B is shown in accordance with an illustrative embodiment. The Gaussian kernel function was used, $I_{max}=200$, $c_{th}=0.1$ and the input hyperparameters were $s=[0.001, 1000, 10]$, $m=[0.001n, 0.1n, 0.01]$, $\lambda_1=[0, 1, 0.05]$, $\lambda_2=[0, 1, 0.05]$, $t=[0.01n, 0.1n, 0.01n]$, and $r=[0.1t, t, 0.1t]$, where the first value is a minimum value, the second value is a maximum value, and the third value is a step size value to search. Red triangles show the correctly classified observation vectors assigned to class 1; blue squares show the correctly classified observation vectors assigned to class 2; and green squares show the incorrectly classified observation vectors. The distributed computing environment included $N_w=136$ machines where each machine was executing with 64 threads.

The accuracy using the first existing classification system was 76.5%, the accuracy using the second existing classification system was 81.2%, the accuracy using classification device 100 was 83.6%, and the accuracy using classification system 300 was 86.2%. As a result, both classification device 100 and classification system 300 show improved accuracy relative to the two existing systems. Based on a comparison between FIGS. 11C to 11F, the region of incorrectly classified observation vectors shrinks with the improved accuracy.

Among various robust semi-supervised learning system, the second existing classification system based on the $L_1$-norm formulation of graph Laplacian regularization has achieved some success in the presence of noise and has been widely used. The second existing classification system selects one predictor to represent a full set of predictors for correlated feature variables thereby limiting the performance gains based on information residing in the correlated features such as in gene microarray expression and imaging analysis. Classification device 100 and classification system 300 leverage an elastic net regularization on the graph Laplacian, offering a beneficial trade-off between lasso regression and ridge regression to account for the group effects. Therefore, by adapting elastic nets for noise-robust semi-supervised learning, the learning process and the accuracy are improved by preserving the structure of correlated features.

Figure 12A:
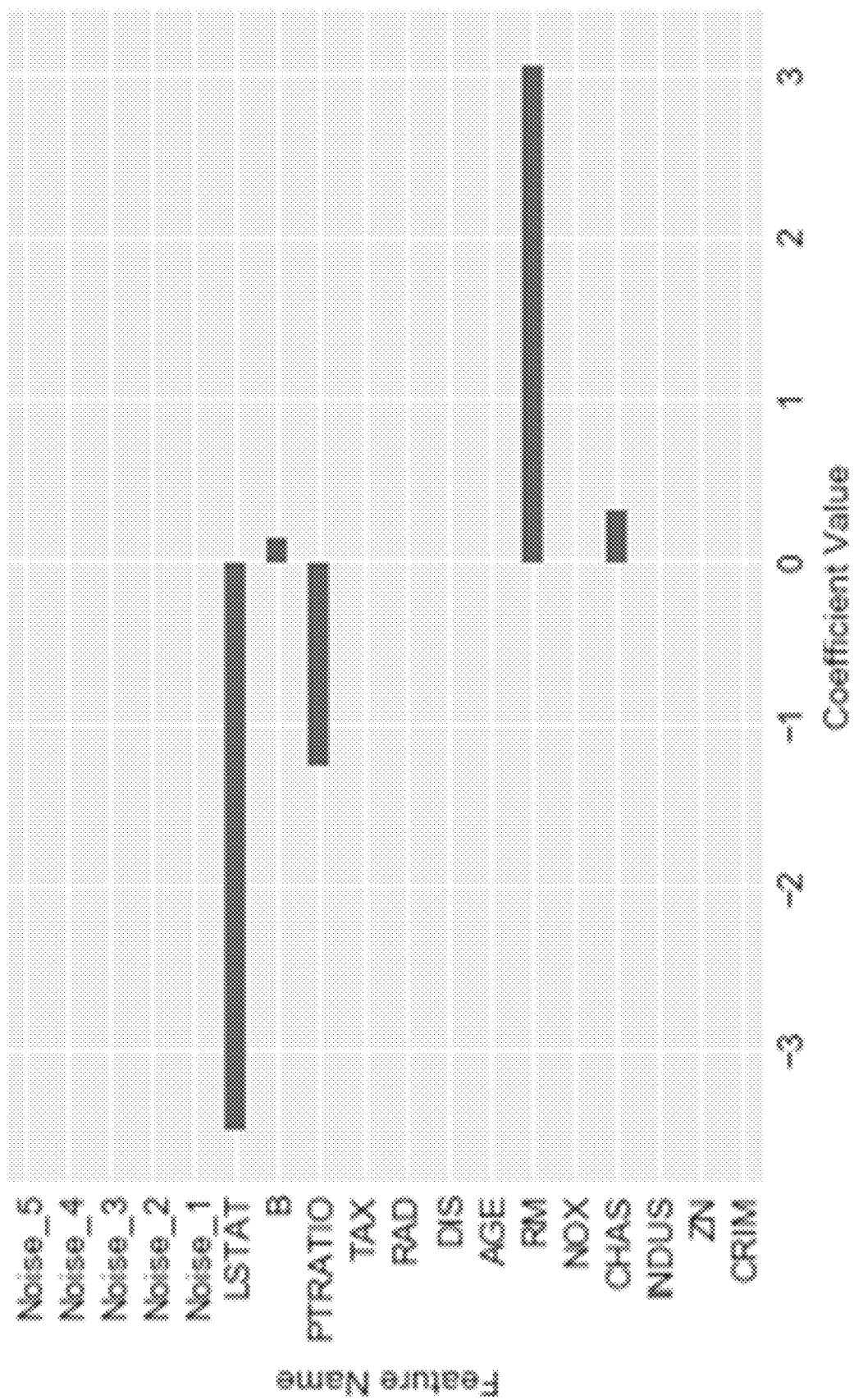
FIG. 12A shows selected coefficient values computed for a first dataset by the second existing classification system in accordance with an illustrative embodiment.
Figure 12B:
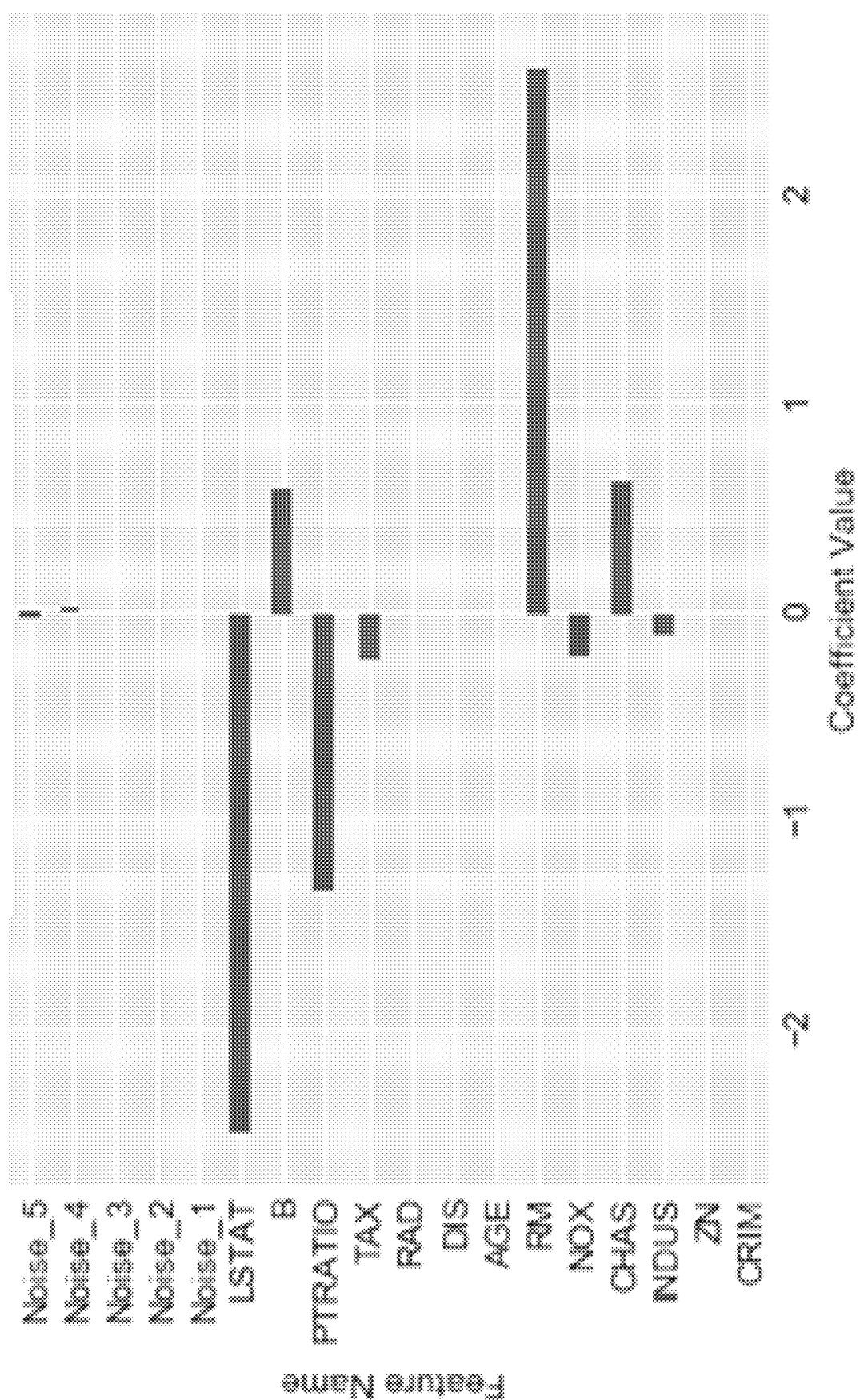
FIG. 12B shows selected coefficient values computed by the classification system of FIG. 1 with the first dataset in accordance with an illustrative embodiment.
Figure 12C:
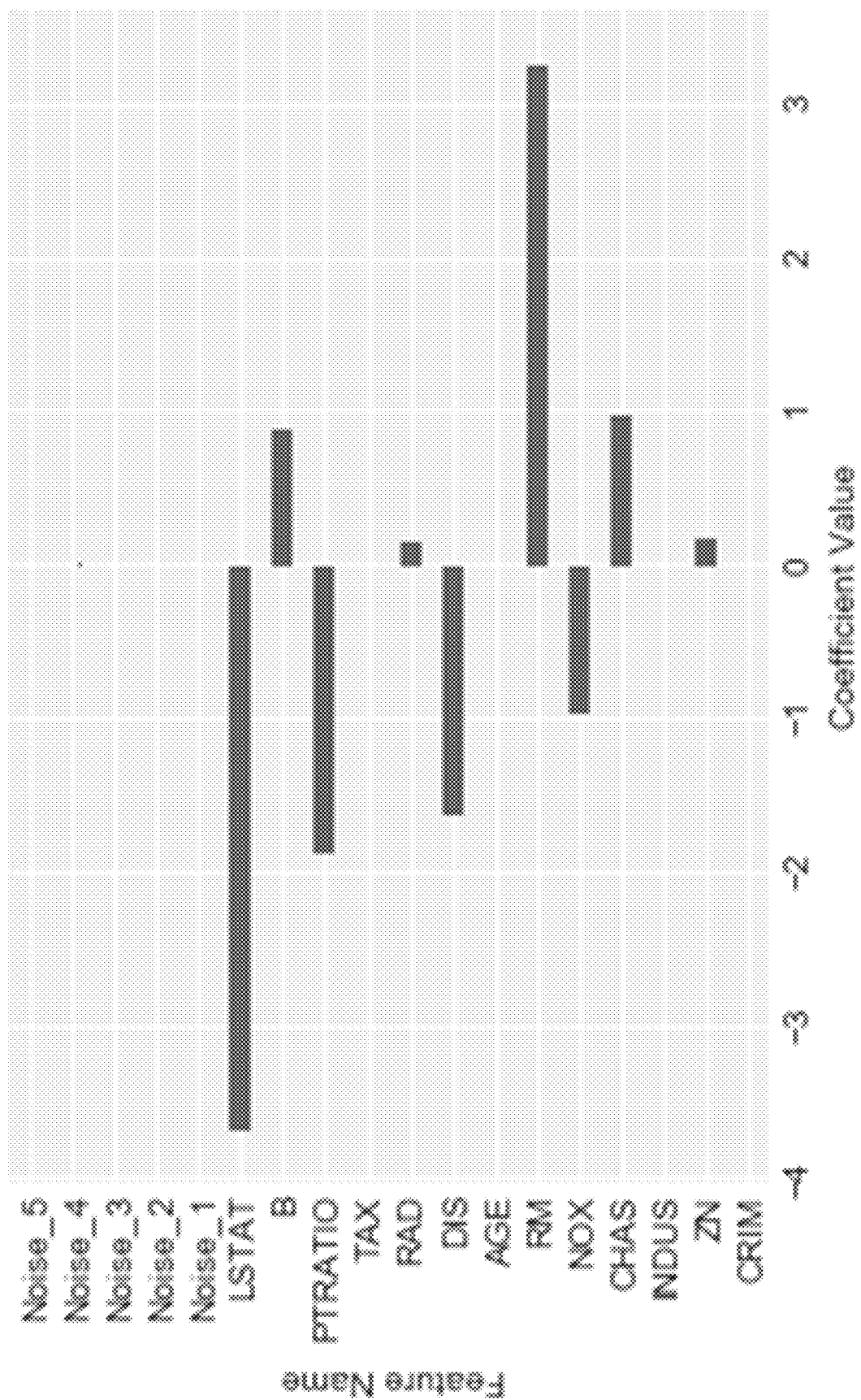
FIG. 12C shows selected coefficient values computed by the classification system of FIG. 3 with the first dataset in accordance with an illustrative embodiment.

In a qualitative study, the selected sparse coefficients were compared using the second existing classification system, classification device 100, and classification system 300 with a first dataset. The comparative results are shown in FIGS. 12A, 12B, and 12C, respectively, in accordance with an illustrative embodiment. The first dataset is known as the Boston Housing dataset that was originally posed as a regression problem. It was selected to reveal the performance in terms of variable selection. The first dataset originally included 13 variables, but five noise variables were added to evaluate the robustness of the second existing classification system, classification application 122, and classification model tuning application 422. The first dataset was randomly sampled and divided into three disjoint subsets including input classified data 124 that included 5% of the observation vectors, input unclassified data 126 that included 75% of the observation vectors, and a test dataset that included 20% of the observation vectors.

Referring to FIG. 12A, selected coefficient values computed for the first dataset by the second existing classification system are shown in accordance with an illustrative embodiment. Referring to FIG. 12B, selected coefficient values computed by classification application 122 with the first dataset are shown in accordance with an illustrative embodiment. The Gaussian kernel function was used, $I_{max}=200$, $c_{th}=0.1$, the Gaussian bandwidth parameter $s=20$, the number of eigenvectors to select $m=0.1n$, first regularization parameter $\lambda_1=0.7$, second regularization parameter $\lambda_2=0.5$, the number of clusters $t=50$, and the number of nearest cluster centers $r=6$. The LHS sampling followed by GA+GSS based searching was used given the defined ranges of values for the hyperparameters. Referring to FIG. 12C, selected coefficient values computed by classification model tuning application 422 with the first dataset are shown in accordance with an illustrative embodiment. The input hyperparameters were $s=[0.001, 1000, 10]$, $m=[0.001n, 0.1n, 0.01]$, $\lambda_1=[0, 1, 0.05]$, $\lambda_2=[0, 1, 0.05]$, $t=[0.01n, 0.1n, 0.01n]$, and $r=[0.1t, t, 0.1t]$. The LHS sampling followed by GA+GSS based searching was used given the defined ranges of values for the hyperparameters.

The continuous target variable represented a median of house values that was quantized to define two classification levels where the cutoff between the two levels was the mean of the target variable values computed from all of the observations. A mean square error was evaluated for regression and an average accuracy was evaluated for classification based on quantizing the median of the house values. The mean square error and the accuracy using the second existing classification system were 24.91% and 83.2%, respectively. The mean square error and the accuracy using classification application 122 were 24.63% and 86.7%, respectively. The mean square error and the accuracy using classification model tuning application 422 were 24.22% and 89.3%, respectively. Thus, both classification application 122 and classification model tuning application 422 resulted in less error and a higher accuracy in comparison with the second existing classification system. As shown in FIG. 12C, classification model tuning application 422 in comparison with classification application 122 provided an improved denoising effect by finding a better tradeoff between the weights on $L_1$-norm and $L_2$-norm using the automated hyperparameter selections resulting in a classification accuracy improvement of 2.6%. The average accuracy using classification model tuning application 422 was found to increase with a number of worker devices before stabilizing when the number of worker devices was greater than 30.

All of the second existing classification system, classification application 122, and classification model tuning application 422 identified variables LSTAT (lower status of the population (percent)), B $(1000(B_k-0.63)^2$ where $B_k$ is a proportion of blacks by town), PTRATIO (pupil-teacher ratio by town), RM (average number of rooms per dwelling), and CHAS (Charles River dummy variable 1 if tract bounds river, 0 otherwise) as dependent variables. As shown in FIG. 12C, classification model tuning application 422 identified additional dependent variables in the feature selection process such as "RAD" (index of accessibility to radial highways), "DIS" (weighted mean of distances to five Boston employment centers), "NOX" (nitrogen oxides concentration), and "ZN" (proportion of residential land zoned for lots over 25,000 square feet) that are related to geographic location. In contrast, as shown in FIG. 12A, the second existing classification system identified an isolated variable in the correlated features and ignored the other correlated variables. As shown in FIG. 12B, classification application 122 identified additional dependent variables in the feature selection process such as "TAX" (full-value property-tax rate per \$10,000) "NOX", and "INDUS" (proportion of non-retail business acres per town).

The robustness and accuracy performance of classification application 122 and classification model tuning application 422 were determined by comparing them with multiple baseline and state-of-the-art methods that are referred to as existing classification systems. A third existing classification system was a supervised non-linear SVM baseline method, where various kernels are tuned and one-vs-all strategy is applied for all experiments. The third existing classification system used the method described in C. Chang and C. Lin, *Libsvm: A library for support vector machines*, TIST (2011).

A fourth existing classification system was a graph-based SSL algorithm with the objective function being regularized by graph Laplacian. The fourth existing classification system used the method described in Belkin et al., *On manifold regularization*, AISTATS (2005).

A fifth existing classification system was similar to the fourth existing classification system in terms of regularization by graph Laplacian with a least squared loss as the objective function. The fifth existing classification system used the method described in Belkin et al., *Manifold regularization: A geometric framework for learning from labeled and unlabeled examples*, JMLR, 2399-2434 (2006).

A sixth existing classification system estimated a label mean for unlabeled data based on multiple kernel learning or alternating optimization. The sixth existing classification system used the method described in Li et al., *Semi-supervised learning using label mean*, ICML (2009).

A seventh existing classification system approximated the supervised cost-sensitive support vector machine (SVM) leveraging label means of all the unlabeled data. The sixth existing classification system used the method described in Li et al., *Cost-sensitive semi-supervised support vector machine*, AAAI Conference on Artificial Intelligence (2010).

An eighth existing classification system relied on suppressing the weights and optimizing the model parameter and class distribution of unlabeled data. The eighth existing classification system used the method described in Wang et al., *Large-Scale Adaptive Semi-supervised Learning via Unified Inductive and Transductive Model*, KDD (2014).

A ninth existing classification system and a tenth existing classification system generated pseudo-labels for unlabeled data using a set of weak annotators in semi-supervised learning. The ninth existing classification system used 10 weak annotators, and the tenth existing classification system used 50 weak annotators. The ninth system and tenth existing classification systems used the method described in Yan et al., *Robust Semi-Supervised Learning through Label Aggregation*, AAAI Conference on Artificial Intelligence (2016).

An eleventh existing classification system was an open source software that applied Bayesian optimization to simultaneously select a learning algorithm and set its hyperparameters automatically. The eleventh existing classification system used the method described in Jfeurer et al., *Efficient and Robust Automated Machine Learning*, Neural Information Processing Systems (NIPS) (2015).

A twelfth existing classification system leveraged a large margin separation method to build an automated learning system. The twelfth existing classification system used the method described in Li et al., *Towards Automated Semi-supervised Learning*, AAAI Conference on Artificial Intelligence (2019).

Table I below shows a comparison of the complexity of several of the existing classification systems relative to classification application 122/classification model tuning application 422 where "4" indicates the fourth existing classification system, "5" indicates the fifth existing classification system, etc. and 122/422 indicates classification application 122/classification model tuning application 422. In Table I, n, d, M, T, t, and S represent a total number of observations, a dimension of the data, a number of weak annotators, a number of iterations of the algorithm, a number of anchor points (clusters, N>>t) and a number of worker machines, respectively.

TABLE I

| | Method | | | | | | | |
|---|---|---|---|---|---|---|---|---|
| | 4 | 5 | 6 | 7 | 8 | 9,10 | 2 | 122/422 |
| Complexity O( ) | $n^3d$ | $n^3d$ | $n^2dT$ | $n^2dT$ | $n^2dT$ | $Mnd$ | $(t^2+T)n$ | $(t^2+T)n/S$ |

There are two main stages in classification application 122/classification model tuning application 422: the eigenvector calculation and the coefficient optimization. In the eigenvector calculation, due to the exploitation of the non-linear approximations, the singular value decomposition complexity has been reduced to $O(t^3)(t\ll n)$. With a single worker machine, the time complexity to find the cluster centers, compute W, and compute $V_m$ are $O(tn)$, $O(rtn)$ and $O(t^3+t^2n)$, respectively. Thus, the time complexity for the first stage is $O(t^3+t^2n)$. The total time complexity for the second stage using a single machine is $O((t^2+T)n)$. With the distributed setting, the time complexity can further be reduced to $O((t^2+T)n/S)$.

The second, ninth, and tenth existing classification systems and classification application 122/classification model tuning application 422 have the lowest complexity because they provide a linear time complexity in terms of the total number of observations n. Compared to the ninth and tenth existing classification systems that require training based on multiple label kernel learning, classification application 122/classification model tuning application 422 is a training-free method, which reduces the execution time.

To evaluate the accuracy, seven different datasets were used. Each dataset was randomly sampled and divided into three disjoint subsets including input classified data 124 that included 5% of the observation vectors, input unclassified data 126 that included 75% of the observation vectors, and a test dataset that included 20% of the observation vectors. The second through twelfth existing classification systems were compared to classification system 300. The input hyperparameters for classification system 300 were s=[0.001, 1000, 10], m=[0.001n, 0.1n, 0.01], $\lambda_1$=[0, 1, 0.05], $\lambda_2$=[0, 1, 0.05], t=[0.01n, 0.1n, 0.01n], and r=[0.1t, t, 0.1t]. The LHS sampling followed by GA+GSS based searching was used given the defined ranges of values for the hyperparameters. The distributed computing environment included $N_w$=136 machines where each machine was executing with 64 threads.

Referring to FIG. 13, a first comparison table is shown of accuracy values computed for the seven different datasets using the second through twelfth existing classification systems (existing 2, existing 3, . . . , existing 12) and classification system 300 in accordance with an illustrative embodiment. The training observations were all correctly classified so the noise value was zero. The first dataset included 18 variables, 2 classes, and 560 observations. The second dataset included 856 variables, 9 classes, and 1080 observations. The third dataset included 180 variables, 3 classes, and 3186 observations. The fourth dataset included 126 variables, 3 classes, and 10,000 observations. The fifth dataset included 357 variables, 3 classes, and 24,387 observations. The sixth dataset included 47,236 variables, 38 classes, and 15498 observations. The seventh dataset included 47,236 variables, 40 classes, and 531,920 observations. The results in the first comparison table show the average percent accuracy achieved relative to the total number of observations with the number in parentheses indicating the standard deviation of the results over 20 Monte Carlo runs. A "-" indicates that the existing classification system could not complete the execution because it was computationally too expensive meaning it took more than a day to complete execution.

With no noise, classification system 300 achieved the top performance in terms of the classification accuracy for five out of the seven evaluated datasets. Using the third dataset, classification system 300 achieved a 0.27% lower accuracy value in comparison with the eighth existing classification system. Using the fifth dataset, classification system 300 achieved a 0.21% lower accuracy value in comparison with the twelfth existing classification system. For both the third and fifth datasets, classification system 300 achieved the second best classification accuracy that was greater than 1% relative the remaining existing classification systems. The superior performance of classification system 300 can be attributed to the utilization of the distributed elastic net graph to capture the correlation between variables in the learning process as well as the automatic selection of hyperparameters.

Figure 14A:
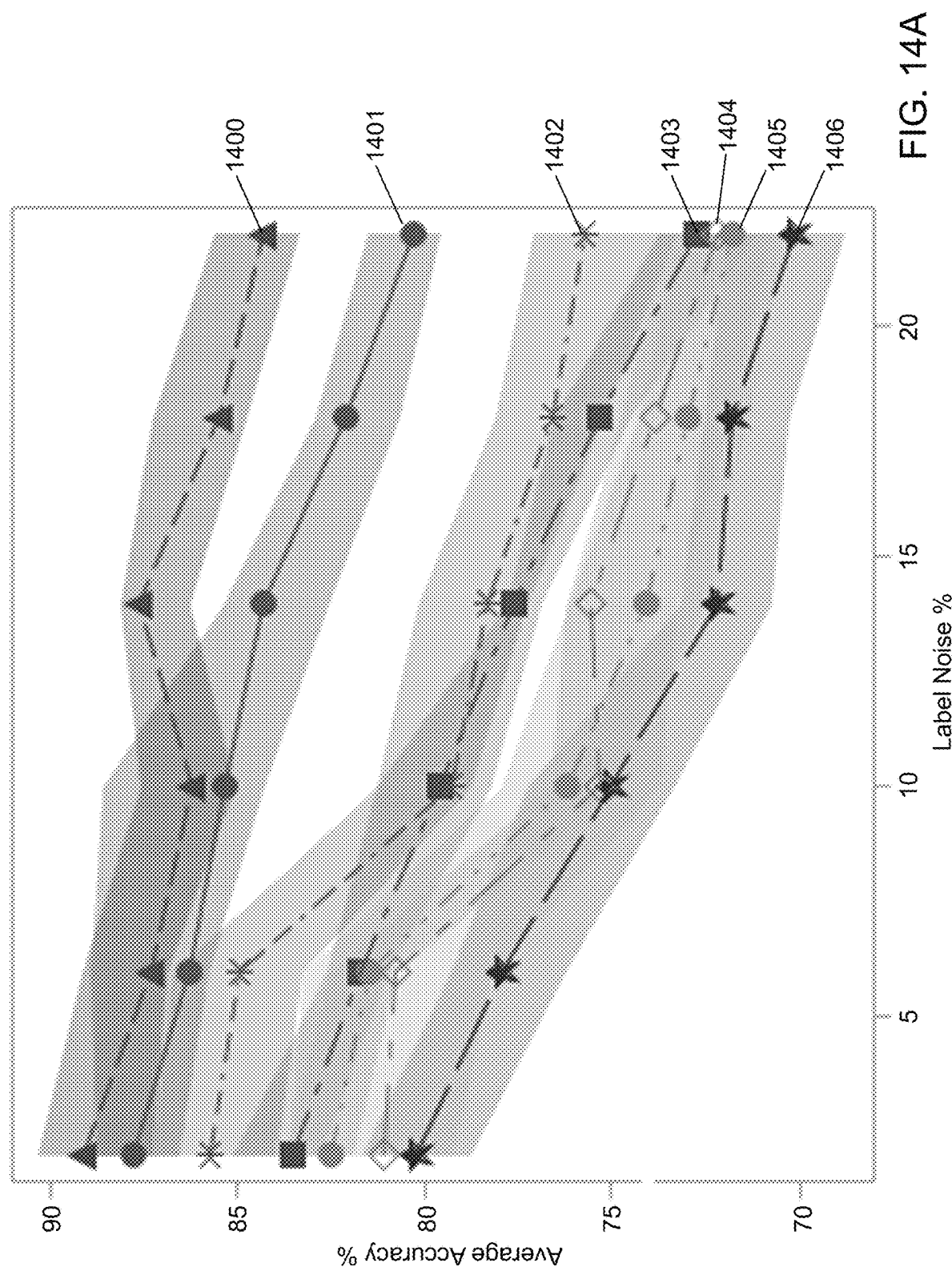
FIG. 14A shows a graph of average accuracy values as a function of label noise computed for a second dataset using seven different classification systems in accordance with an illustrative embodiment.

Referring to FIG. 14A, a first graph of average accuracy values as a function of a label noise value computed for the second dataset using seven of the existing classification systems is shown in accordance with an illustrative embodiment. The results show the average percent accuracy achieved relative to the total number of observations over 10 Monte Carlo runs. 95% confidence intervals are shown for each classification system. A first accuracy curve 1400 for the second dataset shows the results using classification system 300. A second accuracy curve 1401 for the second dataset shows the results using the second existing classification system. A third accuracy curve 1402 for the second dataset shows the results using the ninth existing classification system. A fourth accuracy curve 1403 for the second dataset shows the results using the seventh existing classification system. A fifth accuracy curve 1404 for the second dataset shows the results using the fifth existing classification system. A sixth accuracy curve 1405 for the second dataset shows the results using the eighth existing classification system. A seventh accuracy curve 1406 for the second dataset shows the results using the sixth existing classification system.

Figure 14B:
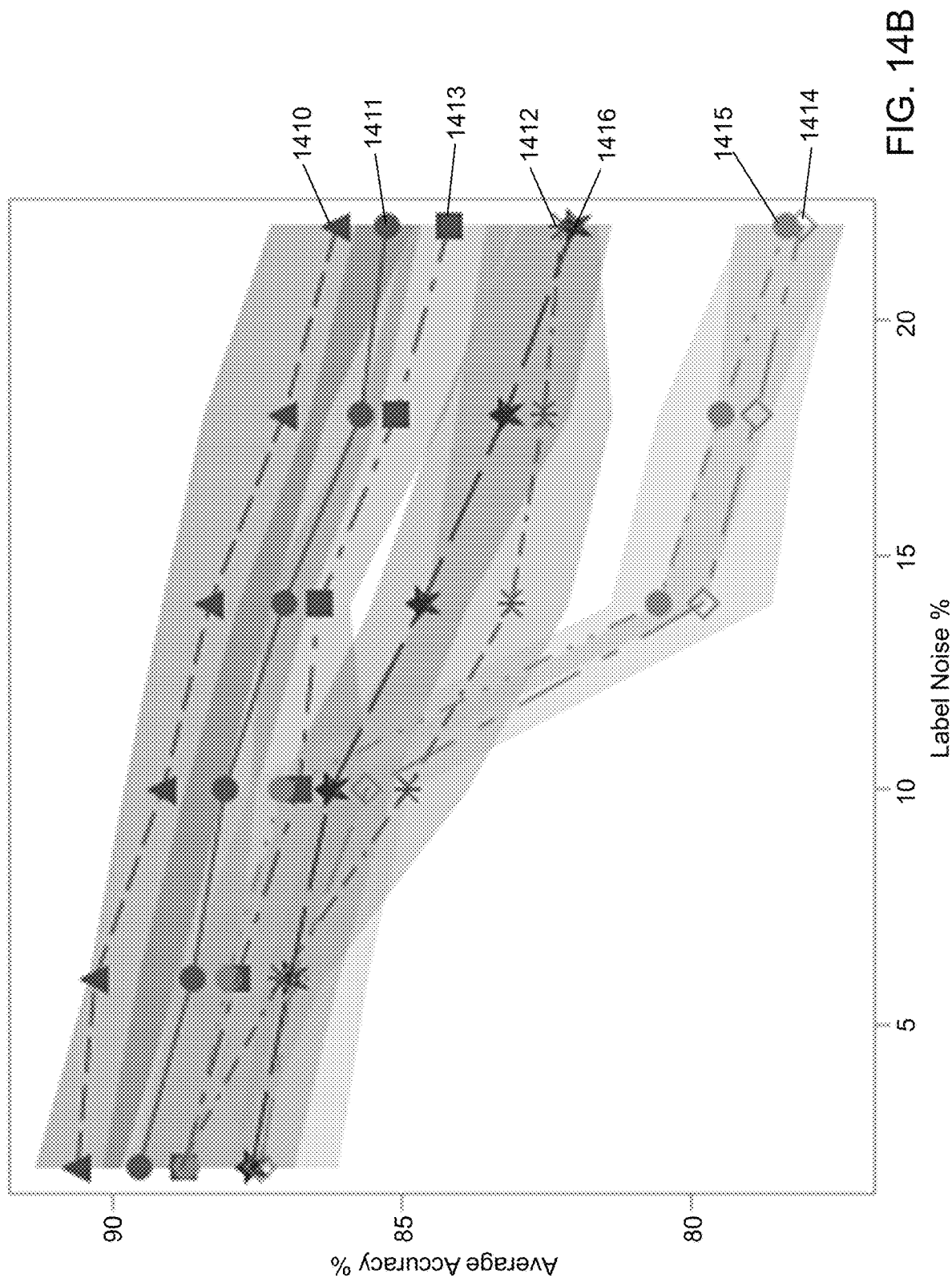
FIG. 14B shows a graph of average accuracy values as a function of label noise computed for a third dataset using the seven different classification systems in accordance with an illustrative embodiment.

Referring to FIG. 14B, a second graph of average accuracy values as a function of label noise value computed for the third dataset using the same seven existing classification systems is shown in accordance with an illustrative embodiment. The results show the average percent accuracy achieved relative to the total number of observations over 10 Monte Carlo runs. 95% confidence intervals are shown for each classification system. A first accuracy curve 1410 for the third dataset shows the results using classification system 300. A second accuracy curve 1411 for the third dataset shows the results using the second existing classification system. A third accuracy curve 1412 for the third dataset shows the results using the ninth existing classification system. A fourth accuracy curve 1413 for the third dataset shows the results using the seventh existing classification system. A fifth accuracy curve 1414 for the third dataset shows the results using the fifth existing classification system. A sixth accuracy curve 1415 for the third dataset shows the results using the eighth existing classification system. A seventh accuracy curve 1416 for the third dataset shows the results using the sixth existing classification system.

Though all of the compared classification systems exhibit performance degradations as expected in the presence of noisy input classified data 126, the degradation using classification system 300 was the least demonstrating the robustness of classification system 300. Typically, when the noise level was greater than 10%, classification system 300 still maintained a robust performance while all of the other classification systems suffered a significant reduction in the classification accuracy. The main reason that classification system 300 outperforms the ninth existing classification system in the presence of noise is because the ninth existing classification system relies on weak annotators to approximate the ground-truth labels for unclassified data; thus, a large number of noisy labels may penalize the performance by generating many inaccurate pseudo labels. It was also observed that for the third dataset with noisy labels, classification system 300 achieved significantly better classification performance in comparison with the eighth existing classification system which achieved the best performance when there was no noise in input classified data 126. This can be attributed mainly to the fact that the eighth existing classification system is only robust to the boundary points by suppressing the weights of boundary points while classification system 300 takes advantage of sparse reconstruction of the coefficients from correlated variables using the elastic net graphs, which is specifically designed for noisy label reduction. Moreover, using datasets such as the second dataset and the third dataset, where most of the predictors contribute to the response, classification system 300 performed better than the second existing classification system by leveraging the convex combination of the L1 and L2 penalties and determining the optimal regularization parameters through automatic learning. The accuracy performance improvement using classification system 300 increased with increasing label noise up to a label noise value of 30%.

Figure 14C:
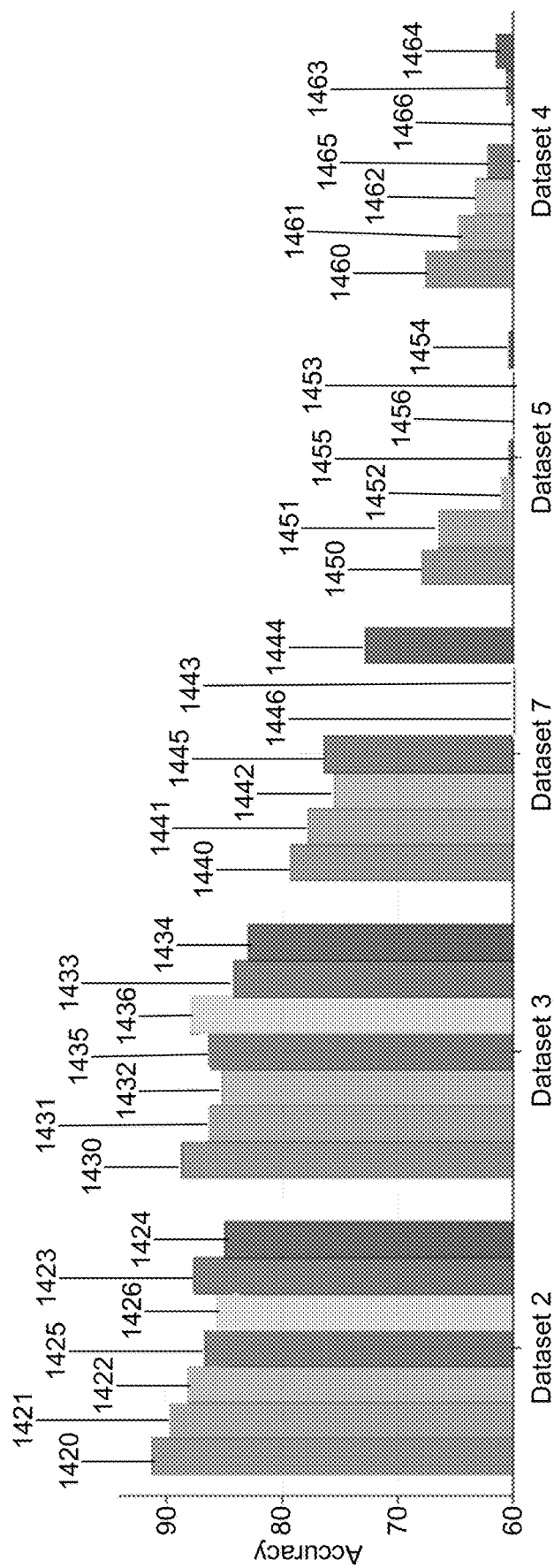
FIG. 14C shows a histogram of average accuracy values for a label noise value of 10 percent computed for five different datasets using the seven different classification systems in accordance with an illustrative embodiment.

Referring to FIG. 14C, a histogram of average accuracy values for a label noise value of 10 percent computed for five different datasets using the same seven existing classification systems is shown in accordance with an illustrative embodiment. A value of zero indicates that the existing classification system could not complete the execution because it was computationally too expensive meaning it took more than a day to complete execution.

A first accuracy bar 1420 for the second dataset shows the results using classification system 300. A second accuracy bar 1421 for the second dataset shows the results using the second existing classification system. A third accuracy bar 1422 for the second dataset shows the results using the ninth existing classification system. A fourth accuracy bar 1423 for the second dataset shows the results using the seventh existing classification system. A fifth accuracy bar 1424 for the second dataset shows the results using the fifth existing classification system. A sixth accuracy bar 1425 for the second dataset shows the results using the eighth existing classification system. A seventh accuracy bar 1426 for the second dataset shows the results using the sixth existing classification system.

A first accuracy bar 1430 for the third dataset shows the results using classification system 300. A second accuracy bar 1431 for the third dataset shows the results using the second existing classification system. A third accuracy bar 1432 for the third dataset shows the results using the ninth existing classification system. A fourth accuracy bar 1433 for the third dataset shows the results using the seventh existing classification system. A fifth accuracy bar 1434 for the third dataset shows the results using the fifth existing classification system. A sixth accuracy bar 1435 for the third dataset shows the results using the eighth existing classification system. A seventh accuracy bar 1436 for the third dataset shows the results using the sixth existing classification system.

A first accuracy bar 1440 for the seventh dataset shows the results using classification system 300. A second accuracy bar 1441 for the seventh dataset shows the results using the second existing classification system. A third accuracy bar 1442 for the seventh dataset shows the results using the ninth existing classification system. A fourth accuracy bar 1443 for the seventh dataset shows the results using the seventh existing classification system. A fifth accuracy bar 1444 for the seventh dataset shows the results using the fifth existing classification system. A sixth accuracy bar 1445 for the seventh dataset shows the results using the eighth existing classification system. A seventh accuracy bar 1446 for the seventh dataset shows the results using the sixth existing classification system.

A first accuracy bar 1450 for the fifth dataset shows the results using classification system 300. A second accuracy bar 1451 for the fifth dataset shows the results using the second existing classification system. A third accuracy bar 1452 for the fifth dataset shows the results using the ninth existing classification system. A fourth accuracy bar 1453 for the fifth dataset shows the results using the seventh existing classification system. A fifth accuracy bar 1454 for the fifth dataset shows the results using the fifth existing classification system. A sixth accuracy bar 1455 for the fifth dataset shows the results using the eighth existing classification system. A seventh accuracy bar 1456 for the fifth dataset shows the results using the sixth existing classification system.

A first accuracy bar 1460 for the fourth dataset shows the results using classification system 300. A second accuracy bar 1461 for the fourth dataset shows the results using the second existing classification system. A third accuracy bar 1462 for the fourth dataset shows the results using the ninth existing classification system. A fourth accuracy bar 1463 for the fourth dataset shows the results using the seventh existing classification system. A fifth accuracy bar 1464 for the fourth dataset shows the results using the fifth existing classification system. A sixth accuracy bar 1465 for the fourth dataset shows the results using the eighth existing classification system. A seventh accuracy bar 1466 for the fourth dataset shows the results using the sixth existing classification system.

Again, classification system 300 outperformed all of the other existing classification systems in the presence of 10% label noise for all five datasets.

Referring to FIG. 15, a second comparison table of accuracy values computed for an eighth dataset and a ninth dataset with varying levels of label noise and using seven different classification systems is shown in accordance with an illustrative embodiment. The eighth dataset was the MNIST dataset that included 70,000 handwritten digit images with 784 variables and 10 classes. Input classified data 124 included 100 labeled images. The ninth dataset was the NUS_WIDE dataset that included 269,000 images of nature with 1500 variables and 81 classes. Input classified data 124 included 405 labeled images. Three noise levels were applied for large-scale semi-supervised image classification including 0%, 15% and 30%. For image classification tasks, classification system 300 was compared to the second existing classification system, the twelfth existing classification system, a thirteenth existing classification system, a fourteenth existing classification system, a fifteenth existing classification system, and a sixteenth existing classification system.

The thirteenth existing classification system used the method described in Zhang et al., *Prototype vector machine for large scale semi-supervised learning*, International Conference on Machine Learning (2009). The fourteenth existing classification system used the method described in Liu et al., *Large graph construction for scalable semisupervised learning*, International Conference on Machine Learning (2010). The fifteenth existing classification system used the method described in Wang et al., *Trend filtering on graphs*, Journal of Machine Learning Research (2016). The sixteenth existing classification system used the method described in Cong et al., *Learning with Inadequate and Incorrect Supervision*, International Conference on Data Mining (2017). The sixteenth existing classification system adapted fifteenth existing classification system to filter out initial noisy labels and then reconstruct the correct labels by emphasizing the leading eigenvectors of a Laplacian matrix associated with small eigenvalues.

Each dataset was randomly sampled and divided into three disjoint subsets including input classified data 124 that included 5% of the observation vectors, input unclassified data 126 that included 75% of the observation vectors, and a test dataset that included 20% of the observation vectors. The input hyperparameters of classification system 300 were s=[0.001, 1000, 10], m=[0.001n, 0.1n, 0.01], $\lambda_1$=[0, 1, 0.05], $\lambda_2$=[0, 1, 0.05], t=[0.01n, 0.1n, 0.01n], and r=[0.1t, t, 0.1t]. The LHS sampling followed by GA+GSS based searching was used given the defined ranges of values for the hyperparameters. The distributed computing environment included $N_w$=136 machines where each machine was executing with 64 threads. The classification results on unlabeled images were averaged over 10 partitions of each dataset. A classified image in the ninth dataset can have multiple labels as it belongs to multiple classes based on what is identified in the image of nature. Therefore, mean average precision was selected as the metric to measure the classification accuracy using the ninth dataset.

Again, classification system 300 achieved the top performances using the average accuracy or mean average precision for five out of six of the tests, which demonstrates the effectiveness and robustness of classification system 300 for large-scale image classification. The only exception was using the ninth dataset with no noise in which the fourteenth existing classification system performed slightly better than classification system 300 that had the second best precision. The performance margin increases with higher levels of label noise, which demonstrates classification system 300 performs robustly to label noise. Classification system 300 achieved a 3.9% and a 3.1% better performance compared to the fourteenth existing classification system with 30% noise level and the eighth and ninth datasets, respectively. The fourteenth existing classification system was the second-best method for both the eighth and ninth datasets. As a result, classification system 300 provided a significant improvement over the fourteenth existing classification system, which is designed to handle noisy labels.

Through elastic net regularization and automation, classification application 122 and classification model tuning application 422 are capable of not only correcting corrupted labeled data but also of achieving a higher classification accuracy on unclassified data as shown in FIGS. 11C to 11F.

The major contributions and desirable properties of classification application 122 and classification model tuning application 422 include increased efficiency, the capability to automate hyperparameter selection, improved accuracy, and scalability based on application in a distributed computing system. Leveraging the elastic net graph to combine L1 and L2 penalties for graph Laplacian regularization, classification application 122 and classification model tuning application 422 take advantage of the correlation between variables to enhance the robustness of the classification performance. Classification application 122 and classification model tuning application 422 can be used in an automatic hyperparameter tuning system through the solver of the elastic net regularization. By minimizing the total graph loss for semi-supervised learning, classification application 122 and classification model tuning application 422 overcome the difficulty of hyperparameter selections in the process of obtaining optimal solutions.

As discussed above, classification application 122 and classification model tuning application 422 provide a considerable improvement in accuracy over state-of-the-art approaches applied to both benchmark datasets and real-world datasets, especially when the noise level for labeled data is greater than 20%. Classification application 122 and classification model tuning application 422 exploit distributed computing resources for scalability to big data. In addition, classification application 122 and classification model tuning application 422 have a linear time and space complexity with respect to the number of observations, which enhances the scalability to large datasets.

The explosion of digital data is generating many opportunities for big data analytics, which in turn provides many opportunities for tuning classification models to capitalize on the information contained in the data—to make better predictions that lead to better decisions. Distributed classification system 300 support better decision making by providing a system that can identify and evaluate many more hyperparameter configurations in parallel by allocating the computing devices of worker system 306 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
- (A) compute a weight matrix using a kernel function applied to a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors;
- (B) perform a decomposition of the computed weight matrix;
- (C) select a predefined number of eigenvectors from the decomposed weight matrix to define a decomposition matrix, wherein the predefined number of eigenvectors have largest eigenvalues relative to other eigenvectors not selected from the decomposed weight matrix;
- (D) compute a gradient value as a function of the defined decomposition matrix, a plurality of sparse coefficients, and a label vector defined from the plurality of observation vectors based on the target variable value, wherein the gradient value includes an L2-norm term computed for the plurality of sparse coefficients based on a first predefined regularization parameter value;
- (E) update a value of each coefficient of the plurality of sparse coefficients based on the computed gradient value and a second predefined regularization parameter value;
- (F) repeat (D) and (E) until a convergence parameter value indicates the plurality of sparse coefficients have converged;
- (G) define a classification matrix using the converged plurality of sparse coefficients;
- (H) determine the target variable value for each observation vector of the plurality of unclassified observation vectors based on the defined classification matrix to update the label vector; and
- (I) output the target variable value for each observation vector of the plurality of unclassified observation vectors, wherein the target variable value selected for each observation vector of the plurality of unclassified observation vectors is defined to represent the label for a respective unclassified observation vector;

wherein the plurality of unclassified observation vectors is distributed across a plurality of computing devices and the plurality of classified observation vectors are stored on each computing device of the plurality of computing devices, wherein (A) through (H) are performed on each computing device of the plurality of computing devices using the plurality of classified observation vectors and the plurality of unclassified observation vectors distributed to each respective computing device.

2. The non-transitory computer-readable medium of claim 1, wherein the computing device is one of the plurality of computing devices.

3. The non-transitory computer-readable medium of claim 1, wherein the $L_2$-norm term is computed $$L_2 = 2\lambda_2 \sum_{ii}^{\frac{1}{2}} \sum_{i=1}^{m} \sum_{ii}^{\frac{1}{2}} a_i,$$

where $L_2$ is the $L_2$-norm term, $\lambda_2$ is the first predefined regularization parameter value, $a_i$ is an $i^{th}$ coefficient of the plurality of sparse coefficients, and m is the predefined number of eigenvectors.

4. The non-transitory computer-readable medium of claim 3, wherein the gradient value is computed using $\nabla_{a_i} = C_{3,i} + L_2$, where $\nabla_{a_i}$ is the gradient value for the $i^{th}$ coefficient of the plurality of sparse coefficients, $C_3 = V_m^\top (V_m a - Y)$ is an m×1 vector, $C_{3,i}$ is an $i^{th}$ element of $C_3$, $V_m$ is the defined decomposition matrix, a is the plurality of sparse coefficients, Y is the label vector, and ⊤ indicates a transpose.

5. The non-transitory computer-readable medium of claim 4, wherein the gradient value is an m×1 vector for a binary target variable value.

6. The non-transitory computer-readable medium of claim 4, wherein the gradient value is an m×c matrix for a target variable value having c possible label values.

7. The non-transitory computer-readable medium of claim 1, wherein the classification matrix is defined using $F = V_m a$, where F is the classification matrix, $V_m$ is the defined decomposition matrix, and a is the plurality of sparse coefficients.

8. The non-transitory computer-readable medium of claim 7, wherein the classification matrix is an N×1 matrix for a binary target variable value or is an N×c matrix for a label set having c possible label values, where N is a number of the plurality of observation vectors.

9. The non-transitory computer-readable medium of claim 1, wherein the label vector is defined using $Y_i = k$ if $x_i$ is labeled as $y_i = k$, otherwise $Y_i = 0$, where $k = 1, \ldots, c$, Y is the label vector, $x_i$ is an $i^{th}$ observation vector of the plurality of observation vectors, $y_i$ is the target variable value of the $i^{th}$ observation vector of the plurality of observation vectors, and c is a number of unique values for the target variable value.

10. The non-transitory computer-readable medium of claim 1, wherein the label vector is defined using $Y_i = 1$ if $y_i$ indicates true, $Y_i = -1$ if $y_i$ indicates false, otherwise $Y_i = 0$, where Y is the label vector, and $y_i$ is the target variable value of an $i^{th}$ observation vector of the plurality of observation vectors.

11. The non-transitory computer-readable medium of claim 1, wherein the decomposition of the computed weight matrix is a singular value decomposition.

12. The non-transitory computer-readable medium of claim 1, wherein computing the weight matrix comprises:
- computing a first matrix using the kernel function and the plurality of observation vectors; and
- computing a diagonal matrix by summing each row of the computed first matrix, wherein the sum of each row is stored in a diagonal of a respective row with zeroes in remaining positions of the respective row;
- wherein the weight matrix is computed using the computed first matrix and the computed diagonal matrix.

13. The non-transitory computer-readable medium of claim 12, wherein the decomposition of the computed weight matrix is computed using $\hat{Z} = V\Sigma U^\top$, where $W = \hat{Z}\hat{Z}^\top = ZD^{-0.5}D^{-0.5}Z^\top$, W is the computed weight matrix, ⊤ indicates a transpose, D is the computed diagonal matrix, Z is the computed first matrix, each column of U is an eigenvector of $\hat{Z}^\top \hat{Z}$, each column of V is an eigenvector of W, and $\Sigma$ is a second diagonal matrix whose diagonal entries are eigenvalues of W.

14. The non-transitory computer-readable medium of claim 13, wherein the first matrix is computed using $$z_{ij} = \frac{\exp\left(\frac{-\|x_i - u_j\|^2}{2s^2}\right)}{\sum_{k \in N_r(i)} \exp\left(\frac{-\|x_i - u_k\|^2}{2s^2}\right)}, i = 1, 2, \ldots, N$$

and $j=1, 2, \ldots, t$,
where $z_{ij}$ is an i, $j^{th}$ entry of the first matrix, s is a predefined kernel parameter value, $x_i$ is an $i^{th}$ observation vector of the plurality of observation vectors, r is a predefined number of nearest cluster centers, $N_r(i)$ is an index to a nearest cluster center to $x_i$ of the predefined number of nearest cluster centers, t is a predefined number of cluster centers, $u_1$ is a $j^{th}$ cluster center selected from the t cluster centers, and N is a number of the plurality of observation vectors.

15. The non-transitory computer-readable medium of claim 14, wherein a cluster center for each of the predefined number of cluster centers is determined using a k-means clustering algorithm to cluster the plurality of observation vectors.

16. The non-transitory computer-readable medium of claim 1, wherein the convergence parameter value is a number of iterations of (F) and convergence is determined after a predefined maximum number of iterations of (F).

17. The non-transitory computer-readable medium of claim 1, wherein the convergence parameter value is computed using the updated value of each coefficient of the plurality of sparse coefficients.

18. The non-transitory computer-readable medium of claim 17, wherein the convergence parameter value is a sum of a difference between the value updated in (F) and the value prior to the update in (F) for each coefficient of the plurality of sparse coefficients.

19. The non-transitory computer-readable medium of claim 1, wherein updating the value of each coefficient of the plurality of sparse coefficients comprises:
computing a difference value using the defined decomposition matrix and the computed gradient value;
wherein the value is updated using $$a_k = \max\left\{|\Delta_k| - \frac{\lambda_1}{\|V_m\|_s}, 0\right\},$$

where $a_k$ is a $k^{th}$ coefficient of the plurality of sparse coefficients, $\Delta_k$ is the computed difference value for the $k^{th}$ coefficient of the plurality of sparse coefficients, $\lambda_1$ is the second predefined regularization parameter value, $V_m$ is the defined decomposition matrix, $|\Delta_k|$ indicates an absolute value of $\Delta_k$, and $\|V_m\|_s$ indicates a spectral norm of $V_m$.

20. The non-transitory computer-readable medium of claim 19, wherein the difference value is computed using $$\Delta_k = a_k - \frac{\nabla_{a_k}(c_1(a_k))}{\|V_m\|_s^2},$$

where $\nabla_{a_k}(C_1(a_k))$ is the gradient value for the $k^{th}$ coefficient of the plurality of sparse coefficients.

21. The non-transitory computer-readable medium of claim 1, wherein determining the target variable value comprises $$y_i = \underset{j \leq c}{\mathrm{argmax}} F_{ij}.$$

where $y_i$ is the target variable value of an $i^{th}$ observation vector of the plurality of observation vectors, F is the defined classification matrix, $F_{ij}$ is a probability value of the $i^{th}$ observation vector for a $j^{th}$ class, and c is a number of unique values for the target variable value.

22. The non-transitory computer-readable medium of claim 1, wherein, before (I), the computer-readable instructions further cause the computing device to:
(J) compute a total loss value from a loss value computed by each computing device of the plurality of computing devices after (A) through (H);
(K) define a total label vector from the updated label vector defined by each computing device of the plurality of computing devices after (A) through (H);
(L) store the computed total loss value in association with values for $\lambda_i$ and $\lambda_2$, where $\lambda_1$ is the second predefined regularization parameter value, and $\lambda_2$ is the first predefined regularization parameter value;
(M) repeat (A) to (L) with a plurality of different values for at least one of $\lambda_1$ and $\lambda_2$;
(N) after (M), select a value for $\lambda_1$ and $\lambda_2$ based on an extremum value of the computed total loss value associated with the selected value for $\lambda_1$ and $\lambda_2$ relative to other values of the $\lambda_1$ and $\lambda_2$; and
(O) output the selected value for $\lambda_i$ and $\lambda_2$,
wherein the target variable value output for each observation vector of the plurality of unclassified observation vectors in (I) is selected from the defined total label vector associated with the selected value for $\lambda_1$ and $\lambda_2$.

23. The non-transitory computer-readable medium of claim 22, wherein the loss value is computed using $$C = 0.5\|V_m a - Y\|_2^2 + \lambda_1 \sum_{i=1}^{m} \frac{1}{ii} |a_i| + \lambda_2 \left(\sum_{i=1}^{m} \frac{1}{ii} a_i\right)^2,$$

where $V_m$ is the defined decomposition matrix, a is the plurality of sparse coefficients, Y is the label vector, $a_i$ is an $i^{th}$ coefficient of the plurality of sparse coefficients, and m is the predefined number of eigenvectors.

24. The non-transitory computer-readable medium of claim 23, wherein in (L), the computed total loss value is further stored in association with values for m, wherein in (M), (A) to (L) is further repeated with a plurality of different values for m, wherein in (N), a value for m is further selected based on the extremum value of the computed total loss value associated with the selected value for $\lambda_1$, $\lambda_2$, and m relative to other values of the $\lambda_1$, $\lambda_2$, and m, wherein in (O), the selected value for m is further output, and wherein in (I), the target variable value output for each observation vector of the plurality of unclassified observation vectors is selected from the defined total label vector associated with the selected value for $\lambda_1$, $\lambda_2$, and m.

25. The non-transitory computer-readable medium of claim 22, wherein in (L), the computed total loss value is further stored in association with values for s, where s is a predefined kernel parameter value of the kernel function, wherein in (M), (A) to (L) is further repeated with a plurality of different values for s, wherein in (N), a value for s is further selected based on the extremum value of the computed total loss value associated with the selected value for $\lambda_1$, $\lambda_2$, and s relative to other values of the $\lambda_1$, $\lambda_2$, and s, wherein in (O), the selected value for s is further output, and wherein in (I), the target variable value output for each observation vector of the plurality of unclassified observation vectors is selected from the defined total label vector associated with the selected value for $\lambda_1$, $\lambda_2$, and s.

26. The non-transitory computer-readable medium of claim 25, wherein computing the weight matrix comprises computing a first matrix using $$z_{ij} = \frac{\exp\left(\frac{-\|x_i - u_j\|^2}{2s^2}\right)}{\sum_{k \in N_r(i)} \exp\left(\frac{-\|x_i - u_k\|^2}{2s^2}\right)}, i = 1, 2, \ldots, N$$

and j=1, 2, . . . , t,
where $z_{ij}$ is an i, $j^{th}$ entry of the first matrix, $x_i$ is an $i^{th}$ observation vector of the plurality of observation vectors, r is a predefined number of nearest cluster centers, $N_r(i)$ is an index to a nearest cluster center to $x_i$ of the predefined number of nearest cluster centers, t is a predefined number of cluster centers, $u_1$ is a $j^{th}$ cluster center selected from the t cluster centers, and N is a number of the plurality of observation vectors.

27. The non-transitory computer-readable medium of claim 22, wherein in (L), the computed total loss value is further stored in association with values for t and r, where r is a predefined number of nearest cluster centers, and t is a predefined number of cluster centers, wherein in (M), (A) to (L) is further repeated with a plurality of different values for at least one of t and r, wherein in (N), a value for t and r is further selected based on the extremum value of the computed total loss value associated with the selected value for $\lambda_1$, $\lambda_2$, t and r relative to other values of the $\lambda_1$, $\lambda_2$, t and r, wherein in (O), the selected value for t and r is further output, and wherein in (I), the target variable value output for each observation vector of the plurality of unclassified observation vectors is selected from the defined total label vector associated with the selected value for $\lambda_i$, $\lambda_2$, t and r.

28. The non-transitory computer-readable medium of claim 27, wherein computing the weight matrix comprises computing a first matrix using $$z_{ij} = \frac{\exp\left(\frac{-\|x_i - u_j\|^2}{2s^2}\right)}{\sum_{k \in N_r(i)} \exp\left(\frac{-\|x_i - u_k\|^2}{2s^2}\right)}, i = 1, 2, \ldots, N$$

and j=1, 2, . . . , t,
where $z_{ij}$ is an i, $j^{th}$ entry of the first matrix, s is a predefined kernel parameter value, $x_i$ is an $i^{th}$ observation vector of the plurality of observation vectors, $N_r(i)$ is an index to a nearest cluster center to $x_i$ of the predefined number of nearest cluster centers, $u_j$ is a $j^{th}$ cluster center selected from the t cluster centers, and N is a number of the plurality of observation vectors.

29. A computing device comprising:
a processor; and
a computer-readable medium operably coupled to the processor, the computer-readable medium having computer-readable instructions stored thereon that, when executed by the processor, cause the computing device to
(A) compute a weight matrix using a kernel function applied to a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors;
(B) perform a decomposition of the computed weight matrix;
(C) select a predefined number of eigenvectors from the decomposed weight matrix to define a decomposition matrix, wherein the predefined number of eigenvectors have smallest eigenvalues relative to other eigenvectors not selected from the decomposed weight matrix;
(D) compute a gradient value as a function of the defined decomposition matrix, a plurality of sparse coefficients, and a label vector defined from the plurality of observation vectors based on the target variable value, wherein the gradient value includes an $L_2$-norm term computed for the plurality of sparse coefficients based on a first predefined regularization parameter value;
(E) update a value of each coefficient of the plurality of sparse coefficients based on the computed gradient value and a second predefined regularization parameter value;
(F) repeat (D) and (E) until a convergence parameter value indicates the plurality of sparse coefficients have converged;
(G) define a classification matrix using the converged plurality of sparse coefficients;
(H) determine the target variable value for each observation vector of the plurality of unclassified observation vectors based on the defined classification matrix to update the label vector; and
(I) output the target variable value for each observation vector of the plurality of unclassified observation vectors, wherein the target variable value selected for each observation vector of the plurality of unclassified observation vectors is defined to represent the label for a respective unclassified observation vector,
wherein the plurality of unclassified observation vectors is distributed across a plurality of computing devices and the plurality of classified observation vectors are stored on each computing device of the plurality of computing devices,
wherein (A) through (H) are performed on each computing device of the plurality of computing devices using the plurality of classified observation vectors and the plurality of unclassified observation vectors distributed to each respective computing device.

30. A method of classifying data using semi-supervised data, the method comprising:

(A) computing, by a computing device, a weight matrix using a kernel function applied to a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors;

(B) performing, by the computing device, a decomposition of the computed weight matrix;

(C) selecting, by the computing device, a predefined number of eigenvectors from the decomposed weight matrix to define a decomposition matrix, wherein the predefined number of eigenvectors have smallest eigenvalues relative to other eigenvectors not selected from the decomposed weight matrix;

(D) computing, by the computing device, a gradient value as a function of the defined decomposition matrix, a plurality of sparse coefficients, and a label vector defined from the plurality of observation vectors based on the target variable value, wherein the gradient value includes an $L_2$-norm term computed for the plurality of sparse coefficients based on a first predefined regularization parameter value;

(E) updating, by the computing device, a value of each coefficient of the plurality of sparse coefficients based on the computed gradient value and a second predefined regularization parameter value;

(F) repeating (D) and (E), by the computing device, until a convergence parameter value indicates the plurality of sparse coefficients have converged;

(G) defining, by the computing device, a classification matrix using the converged plurality of sparse coefficients;

(H) determining, by the computing device, the target variable value for each observation vector of the plurality of unclassified observation vectors based on the defined classification matrix to update the label vector; and (I) outputting, by the computing device, the target variable value for each observation vector of the plurality of unclassified observation vectors, wherein the target variable value selected for each observation vector of the plurality of unclassified observation vectors is defined to represent the label for a respective unclassified observation vector, wherein the plurality of unclassified observation vectors is distributed across a plurality of computing devices and the plurality of classified observation vectors are stored on each computing device of the plurality of computing devices, wherein (A) through (H) are performed on each computing device of the plurality of computing devices using the plurality of classified observation vectors and the plurality of unclassified observation vectors distributed to each respective computing device.

* * * * *

UNITED STATES PATENT AND TRADEMARK OFFICE
CERTIFICATE OF CORRECTION

PATENT NO. : 10,956,825 B1
APPLICATION NO. : 16/904818
DATED : March 23, 2021
INVENTOR(S) : Xu Chen et al.

It is certified that error appears in the above-identified patent and that said Letters Patent is hereby corrected as shown below:

In the Specification

Column 13, Line 54:
Delete the phrase "$u_1$ is a $j^{th}$ cluster center" and replace with --$u_j$ is a $j^{th}$ cluster center--.

Column 13, Line 59:
Delete the phrase "$D_{jj} = \sum_{i=1}^{N} z_{ij}$," and replace with --$D_{jj} = \sum_{i=1}^{N} z_{ij}$,--.

Column 13, Line 63:
Delete the phrase "T indicates a transpose." and replace with --T indicates a transpose.--.

Column 13, Line 65:
Delete the phrase "applied to $\hat{Z}^T \hat{Z}$ to obtain $V$ based on $\hat{Z}^T \hat{Z} = U\Sigma\Sigma U^T$," and replace with --applied to $\hat{Z}^T\hat{Z}$ to obtain $V$ based on $\hat{Z}^T\hat{Z} = U\Sigma\Sigma U^T$,--.

Column 13, Lines 66-67:
Delete the phrase "an eigenvector of $\hat{Z}^T \hat{Z}$," and replace with --an eigenvector of $\hat{Z}^T\hat{Z}$,--.

Column 14, Line 34:
Delete the phrase "$0.5\|V_m a - Y\|_2^2$," and replace with --$0.5\|V_m a - Y\|_2^2$,--.

Column 15, Line 7:
Delete the phrase "$C_3 = V_m{}^T(V_m a - Y)$" and replace with --$C_3 = V_m^T(V_m a - Y)$--.

Column 15, Line 8:
Delete the phrase "$\nabla_{a_i}(C_i(a_i))$" and replace with --$\nabla_{a_i}(C_1(a_i))$--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,956,825 B1

Column 15, Line 29:
Delete the phrase "c = c + $a_k$ − $a_k$′, where $a_k$′" and replace with --$c = c + a_k - a'_k$, where $a'_k$--.

Column 15, Line 58:
Delete the phrase "if $F_i$ < 0," and replace with --if $F_i \leq 0$,--.

Column 23, Line 41:
Delete the phrase "one or more values fors" and replace with --one or more values for $s$--.

Column 26, Line 26:
Delete the phrase "added to the value of N." and replace with --added to the value of $N_s$.--.

Column 26, Line 40:
Delete the phrase "$N_s$ < $2N_w$/M" and replace with --$N_s \leq 2N_w/M$--.

Column 28, Lines 26-27:
Delete the phrase "using the initial step size value A," and replace with --using the initial step size value $\Delta$,--.

Column 28, Line 29:
Delete the phrase "a number of search centers n" and replace with --a number of search centers $n_c$--.

Column 28, Line 35:
Delete the phrase "includes n, number of configurations" and replace with --includes $n_c$ number of configurations--.

Column 29, Line 65:
Delete the phrase "initial step size value A," and replace with --initial step size value $\Delta$,--.

Column 30, Line 11:
Delete the phrase "indicated by $\mathcal{T}_{p,p}$," and replace with --indicated by $\mathcal{T}_p$,--.

Column 30, Line 52:
Delete the phrase "{$s^o$, $m^o$, $\lambda_1^o$, $\lambda_2^o$, $t^o$, $r^o$}" and replace with --$s^o, m^o, \lambda_1^o, \lambda_2^o, t^o, r^o$--.

Column 30, Line 57:
Delete the phrase "{$s^o$, $m^o$, $\lambda_1^o$, $\lambda_2^o$, $t^o$, $r^o$}" and replace with --$s^o, m^o, \lambda_1^o, \lambda_2^o, t^o, r^o$--.

Column 30, Line 67:
Delete the phrase "{$s^o$, $m^o$, $\lambda_1^o$, $\lambda_2^o$, $t^o$, $r^o$}" and replace with --$s^o, m^o, \lambda_1^o, \lambda_2^o, t^o, r^o$--.

Column 32, Line 44:
Delete the phrase "$u_1$ is a $j^{th}$ cluster center" and replace with --$u_j$ is a $j^{th}$ cluster center--.

CERTIFICATE OF CORRECTION (continued)
U.S. Pat. No. 10,956,825 B1

Column 32, Line 61:
Delete the phrase "$\hat{Z}^\top \hat{Z}$" and replace with --$\hat{Z}^\top\hat{Z}$--.

Column 33, Lines 27-28:
Delete the phrase "c = $c + a_k - a_k'$, where $a_k'$ is a value of $a_k$" and replace with
--c = $c + a_k - a_k'$, where $a_k'$ is a value of $a_k$--.

Column 33, Line 44:
Delete the phrase "If c < $c_{th}$ or $I$ > $I_{max}$," and replace with --If c ≤ $c_{th}$ or $I$ ≥ $I_{max}$,--.

In the Claims

Claim 4, Column 46, Line 14:
Delete the phrase "$C_3 = V_m{}^\top(V_m a - Y)$" and replace with --$C_3 = V_m^\top(V_m a - Y)$--.

Claim 13, Column 46, Line 66:
Delete the phrase "T indicates a transpose," and replace with --T indicates a transpose,--.

Claim 14, Column 47, Lines 21-22:
Delete the phrase "$u_1$ is a $j^{th}$ cluster center" and replace with --$u_j$ is a $j^{th}$ cluster center--.

Claim 22, Column 48, Line 37:
Delete the phrase "output the selected value for $\lambda_i$ and $\lambda_2$," and replace with --output the selected value for $\lambda_1$ and $\lambda_2$,--.

Claim 26, Column 49, Line 33:
Delete the phrase "$u_1$ is a $j^{th}$ cluster center" and replace with --$u_j$ is a $j^{th}$ cluster center--.